US009661074B2

(12) United States Patent
Peake

(10) Patent No.: US 9,661,074 B2
(45) Date of Patent: May 23, 2017

(54) UPDATING DE-DUPLICATION TRACKING DATA FOR A DISPERSED STORAGE NETWORK

(71) Applicant: CLEVERSAFE, INC., Chicago, IL (US)

(72) Inventor: Andrew George Peake, Chicago, IL (US)

(73) Assignee: INTERNATIONAL BUSINESS MACHINES CORPORATIONS, Armond, NY (US)

(*) Notice: Subject to any disclaimer, the term of this patent is extended or adjusted under 35 U.S.C. 154(b) by 262 days.

(21) Appl. No.: 14/320,547

(22) Filed: Jun. 30, 2014

(65) Prior Publication Data

US 2015/0066875 A1 Mar. 5, 2015

Related U.S. Application Data

(60) Provisional application No. 61/871,833, filed on Aug. 29, 2013.

(51) Int. Cl.

*G06F 17/30* (2006.01)
*H04L 29/08* (2006.01)
*G06F 3/06* (2006.01)

(52) U.S. Cl.

CPC .......... *H04L 67/1097* (2013.01); *G06F 3/067* (2013.01); *G06F 3/0608* (2013.01);
(Continued)

(58) Field of Classification Search

CPC ............... G06F 17/30371; G06F 17/30; G06F 17/30321; G06F 17/30336; G06F 11/10;
(Continued)

(56) References Cited

U.S. PATENT DOCUMENTS 4,092,732 A 5/1978 Ouchi
4,631,673 A * 12/1986 Haas ................ G06F 17/30595 707/E17.104

(Continued)

OTHER PUBLICATIONS

M A Redfern, 0 Usta and G Fielding—"Protection Against Loss of Utility Grid Supply for a Dispersed Storage and Generation Unit"—IEEE Transactions on Power Delivery, vol. 8, No. 3, Jul. 1993—pp. 948-954.*

(Continued)

*Primary Examiner* — Anh Ly
(74) *Attorney, Agent, or Firm* — Garlick & Markison; Timothy W. Markison; Kelly H. Hale

(57) ABSTRACT

A method begins by a dispersed storage (DS) processing module of a dispersed storage network (DSN) determining whether a change has occurred to a data object of a set of data objects. When a change has occurred, the method continues with the DS processing module accessing de-duplication tracking data for the set of data objects. When the change is deletion of an identified data object of the set of data objects, the method continues with the DS processing module determining whether the identified data object is the only data object in the set of data objects. When the identified data object is not the only data object in the set of data objects, the method continues with the DS processing module updating the linking information to delete linking the identified data object to addressing information.

18 Claims, 55 Drawing Sheets

(52) U.S. Cl.
CPC .......... *G06F 3/0614* (2013.01); *G06F 3/0641* (2013.01); *G06F 3/0644* (2013.01); *G06F 17/30371* (2013.01); *G06F 2003/0695* (2013.01)

(58) Field of Classification Search
CPC ............... G06F 11/16; G06F 17/30961; G06F 11/1076; G06F 11/1004; G06F 3/0614; G06F 3/0619; G06F 3/0641; G06F 3/064; G06F 3/0652; G06F 3/067; G06F 12/00; G06F 2003/0695; G06F 3/0608; G06F 3/0644; G06F 17/30716; H04L 67/1097
See application file for complete search history.

(56) References Cited

U.S. PATENT DOCUMENTS 5,454,101 A * 9/1995 Mackay ............ G06F 17/30952 707/E17.037
5,485,474 A 1/1996 Rabin
5,774,643 A 6/1998 Lubbers et al.
5,802,364 A 9/1998 Senator et al.
5,809,285 A 9/1998 Hilland
5,890,156 A 3/1999 Rekieta et al.
5,987,622 A 11/1999 Lo Verso et al.
5,991,414 A 11/1999 Garay et al.
6,012,159 A 1/2000 Fischer et al.
6,058,454 A 5/2000 Gerlach et al.
6,128,277 A 10/2000 Bruck et al.
6,175,571 B1 1/2001 Haddock et al.
6,192,472 B1 2/2001 Garay et al.
6,256,688 B1 7/2001 Suetaka et al.
6,272,658 B1 8/2001 Steele et al.
6,301,604 B1 10/2001 Nojima
6,356,949 B1 3/2002 Katsandres et al.
6,366,995 B1 4/2002 Vilkov et al.
6,374,336 B1 4/2002 Peters et al.
6,415,373 B1 7/2002 Peters et al.
6,418,539 B1 7/2002 Walker
6,449,688 B1 9/2002 Peters et al.
6,567,948 B2 5/2003 Steele et al.
6,571,282 B1 5/2003 Bowman-Amuah
6,609,223 B1 8/2003 Wolfgang
6,718,361 B1 4/2004 Basani et al.
6,760,808 B2 7/2004 Peters et al.
6,785,768 B2 8/2004 Peters et al.
6,785,783 B2 8/2004 Buckland
6,826,711 B2 11/2004 Moulton et al.
6,879,596 B1 4/2005 Dooply
7,003,688 B1 2/2006 Pittelkow et al.
7,024,451 B2 4/2006 Jorgenson
7,024,609 B2 4/2006 Wolfgang et al.
7,080,101 B1 7/2006 Watson et al.
7,103,824 B2 9/2006 Halford
7,103,915 B2 9/2006 Redlich et al.
7,111,115 B2 9/2006 Peters et al.
7,140,044 B2 11/2006 Redlich et al.
7,146,644 B2 12/2006 Redlich et al.
7,171,493 B2 1/2007 Shu et al.
7,222,133 B1 5/2007 Raipurkar et al.
7,240,236 B2 7/2007 Cutts et al.
7,272,613 B2 9/2007 Sim et al.
7,636,724 B2 12/2009 de la Torre et al.
7,814,074 B2 * 10/2010 Anglin ................ G06F 11/1453 707/640
9,223,653 B2 * 12/2015 Storm ..................... G06F 3/067
9,430,336 B2 * 8/2016 Motwani ............... G06F 3/0617 707/E17.105
2002/0062422 A1 5/2002 Butterworth et al.
2002/0166079 A1 11/2002 Ulrich et al.
2003/0018927 A1 1/2003 Gadir et al.
2003/0037261 A1 2/2003 Meffert et al.
2003/0065617 A1 4/2003 Watkins et al.
2003/0084020 A1 5/2003 Shu
2004/0024963 A1 2/2004 Talagala et al.
2004/0122917 A1 6/2004 Menon et al.
2004/0215998 A1 10/2004 Buxton et al.
2004/0228493 A1 11/2004 Ma et al.
2005/0100022 A1 5/2005 Ramprashad
2005/0114594 A1 5/2005 Corbett et al.
2005/0125593 A1 6/2005 Karpoff et al.
2005/0131993 A1 6/2005 Fatula, Jr.
2005/0132070 A1 6/2005 Redlich et al.
2005/0144382 A1 6/2005 Schmisseur
2005/0229069 A1 10/2005 Hassner
2006/0047907 A1 3/2006 Shiga et al.
2006/0136448 A1 6/2006 Cialini et al.
2006/0156059 A1 7/2006 Kitamura
2006/0224603 A1 10/2006 Correll, Jr.
2006/0259587 A1* 11/2006 Ackerman ......... G06Q 20/3678 707/E17.01
2007/0079081 A1* 4/2007 Gladwin ............. G06F 21/6227 711/154
2007/0079082 A1 4/2007 Gladwin et al.
2007/0079083 A1 4/2007 Gladwin et al.
2007/0088970 A1 4/2007 Buxton et al.
2007/0174192 A1 7/2007 Gladwin et al.
2007/0214285 A1 9/2007 Au et al.
2007/0226402 A1* 9/2007 Kohinata .............. G06F 3/0616 711/103
2007/0234110 A1 10/2007 Soran et al.
2007/0283167 A1 12/2007 Venters, III et al.
2008/0016063 A1* 1/2008 Fuerst ............... G06F 17/30489 707/E17.032
2009/0094251 A1 4/2009 Gladwin et al.
2009/0094318 A1 4/2009 Gladwin et al.
2009/0254601 A1* 10/2009 Moeller .................. G06F 9/542 709/201
2010/0023524 A1 1/2010 Gladwin et al.
2010/0332751 A1* 12/2010 Quigley .................. H04L 69/08 711/114
2011/0072321 A1* 3/2011 Dhuse ................. G06F 11/1076 714/55
2011/0126026 A1* 5/2011 Gladwin ........... G06F 17/30067 713/193
2011/0161679 A1* 6/2011 Grube ................. G06F 11/1076 713/193
2011/0161681 A1* 6/2011 Dhuse ................. G06F 11/1092 711/E12.092
2011/0184912 A1* 7/2011 Baptist ................ G06F 11/1448 707/639
2011/0185141 A1* 7/2011 Dhuse ................. H04L 67/1097 711/165
2012/0166487 A1* 6/2012 Stougie ............... G06F 11/1076 707/792
2012/0278512 A1* 11/2012 Alatorre ................ G06F 3/0605 710/33
2013/0031155 A1* 1/2013 Terrano ............... H04L 67/1063 709/201
2013/0138902 A1* 5/2013 Haustein ............... G06F 3/0605 711/162
2013/0232503 A1* 9/2013 Volvovski ........... G06F 11/1044 8/104
2014/0270536 A1* 9/2014 Amtrup .............. G06K 9/00442 382/195
2016/0098320 A1* 4/2016 Grube ................. G06F 11/2094 714/766

OTHER PUBLICATIONS

R. C. Dugan et al.—"Integrating Dispersed Storage and Generation (DSG) With an Automated Distribution System"—IEEE Transactions on Power Apparatus and Systems, vol. PAS-103, No. 6, Jun. 1984—pp. 1142-1146.*
Shamir; How to Share a Secret; Communications of the ACM; vol. 22, No. 11; Nov. 1979; pp. 612-613.
Rabin; Efficient Dispersal of information for Security, Load Balancing, and Fault Tolerance: Journal of the Association for Computer Machinery; vol. 36, No. 2; Apr. 1989; pp. 335-348.
Chung; An Automatic Data Segmentation Method for 3D Measured Data Points; National Taiwan University, pp. 1-8; 1998.

(56) References Cited

OTHER PUBLICATIONS

Plank, T1: Erasure Codes for Storage Applications; FAST2005., 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006, pp. 1-50.
Zeilenga; Lightweight Directory Access Protocol (LDAP): Internationalized String Preparation, IETF Network Working Group; RFC 4518; Jun. 2006; pp. 1-14.
Smith, Lightweight Directory Access Protocol (LDAP); Uniform ResourceLocator; IETF Network Wockrng Group; RFC 4516 Jun. 2006; pp. 1-15.
Smith; Lightweight Directory Access Protocol (LDAP): String Representation of Search Filters; IETF Network Working Group; RFC 4515, Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working RFC 4519; Jun. 2006, pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

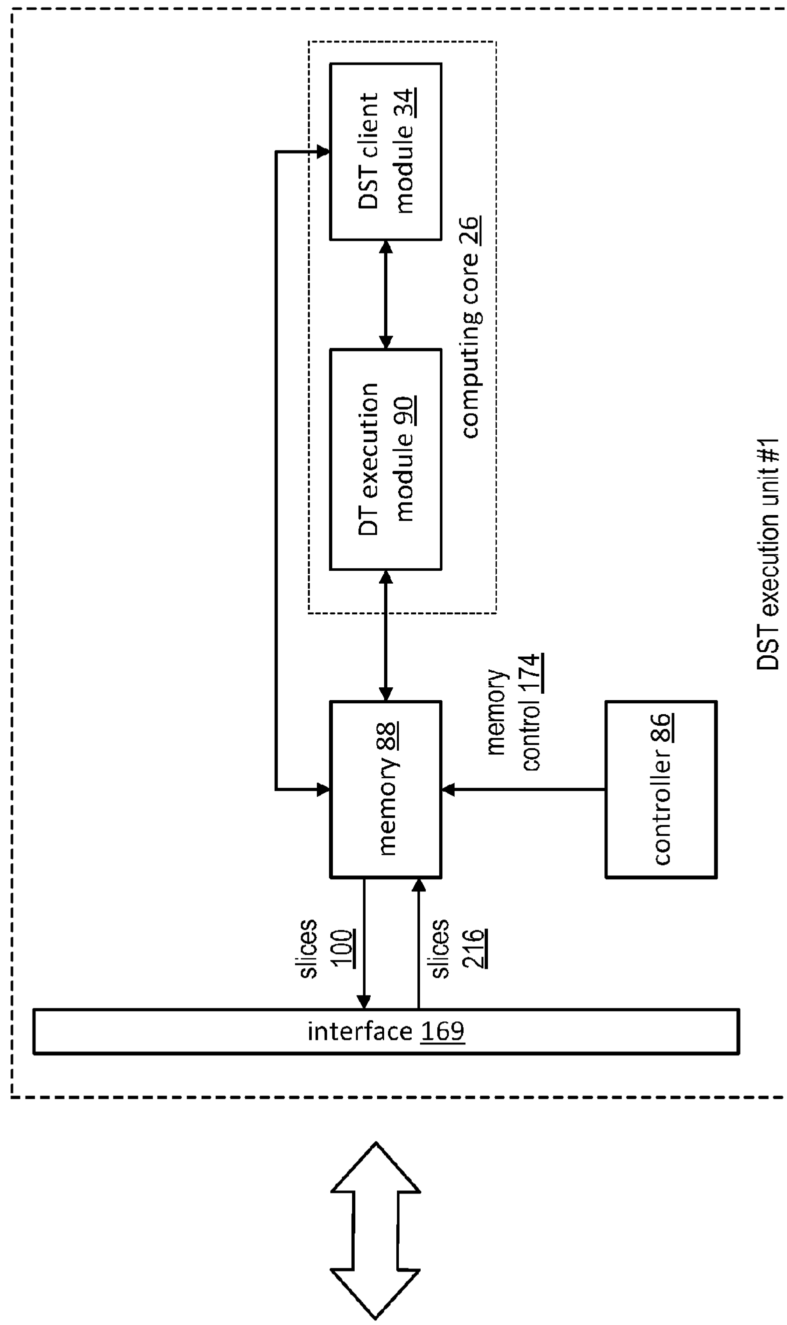
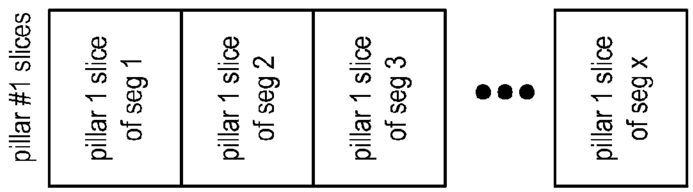
FIG. 24

DST allocation info 242 data partition info 320: data ID; No. of partitions; Addr. info for each partition; format conversion indication

| task execution info 322 | | | | intermediate result info 324 | | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

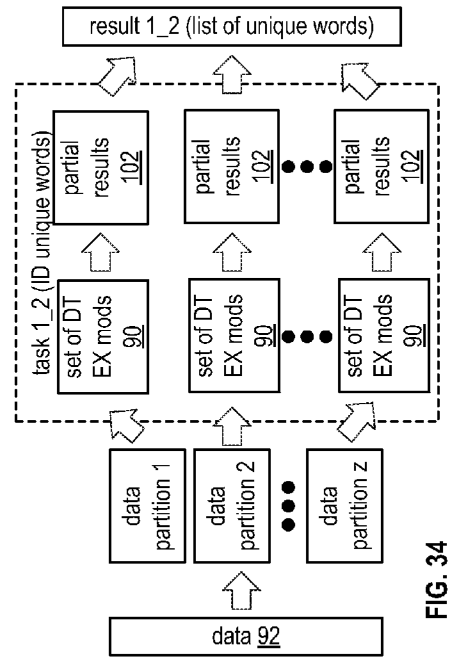
FIG. 34
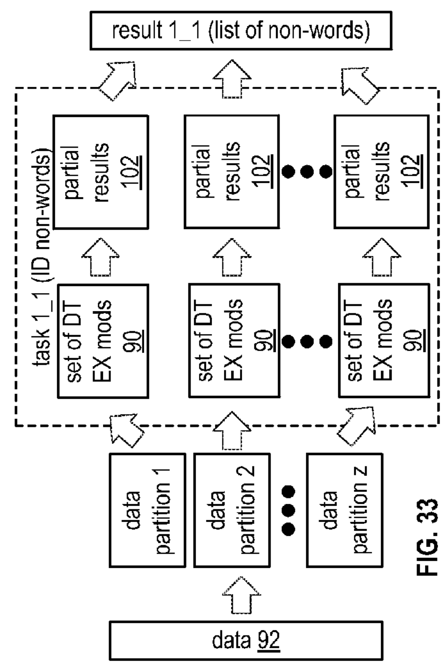
FIG. 33
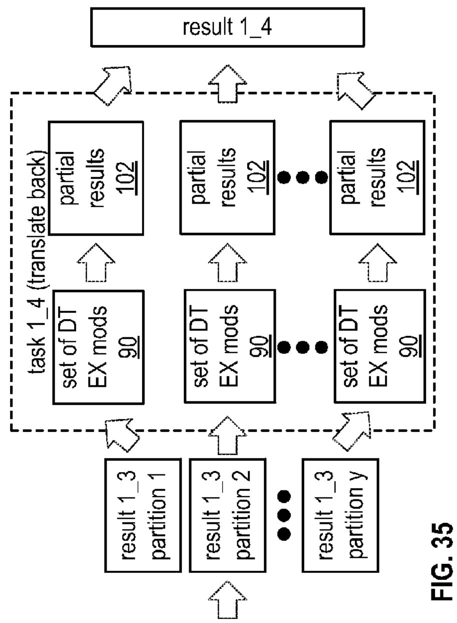
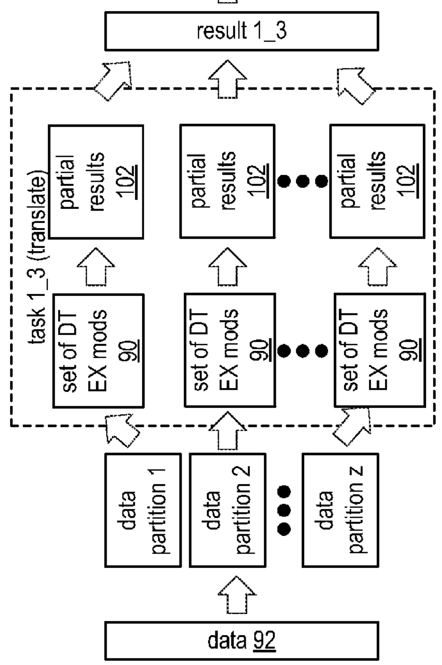
FIG. 35

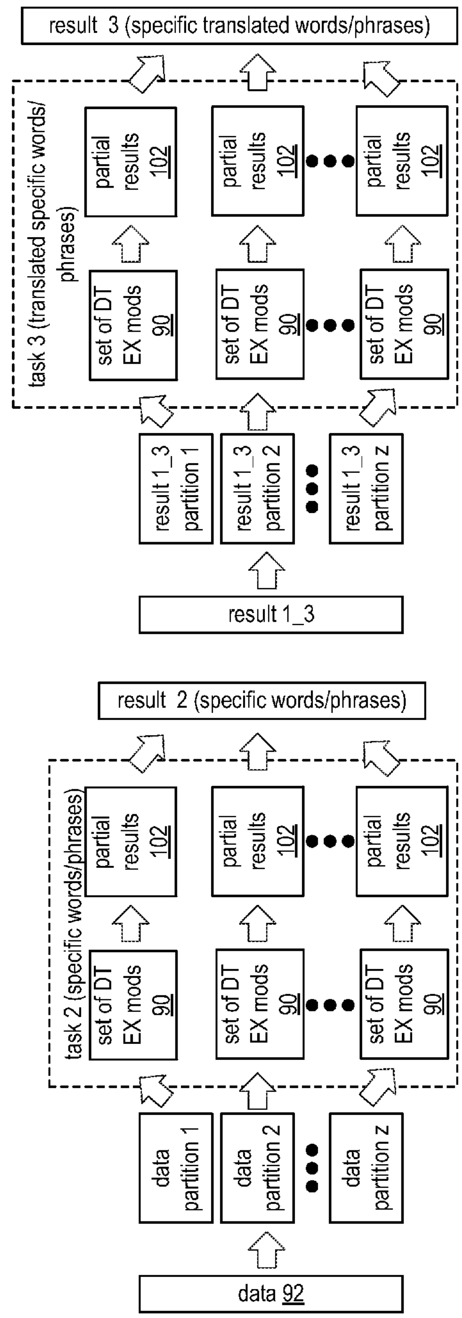
FIG. 37
FIG. 38
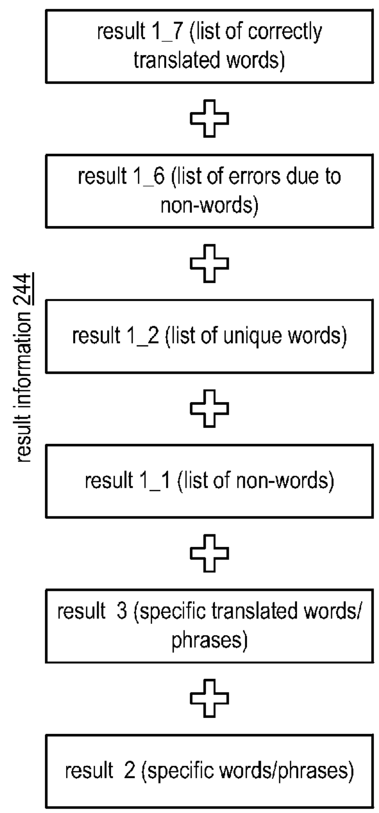
FIG. 39

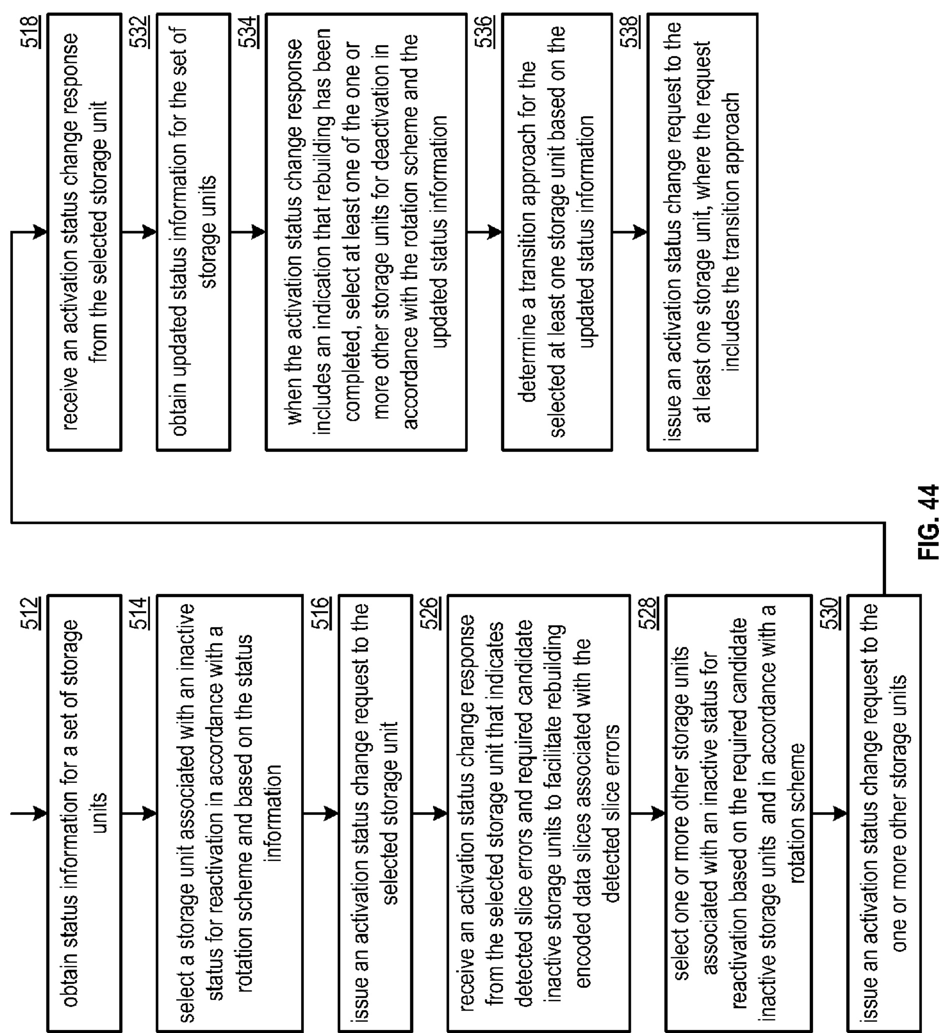
512
obtain status information for a set of storage units
514
select a storage unit associated with an inactive status for reactivation in accordance with a rotation scheme and based on the status information
516
issue an activation status change request to the selected storage unit
526
receive an activation status change response from the selected storage unit that indicates detected slice errors and required candidate inactive storage units to facilitate rebuilding encoded data slices associated with the detected slice errors
528
select one or more other storage units associated with an inactive status for reactivation based on the required candidate inactive storage units and in accordance with a rotation scheme
530
issue an activation status change request to the one or more other storage units
518
receive an activation status change response from the selected storage unit
532
obtain updated status information for the set of storage units
534
when the activation status change response includes an indication that rebuilding has been completed, select at least one of the one or more other storage units for deactivation in accordance with the rotation scheme and the updated status information
536
determine a transition approach for the selected at least one storage unit based on the updated status information
538
issue an activation status change request to the at least one storage unit, where the request includes the transition approach
FIG. 44

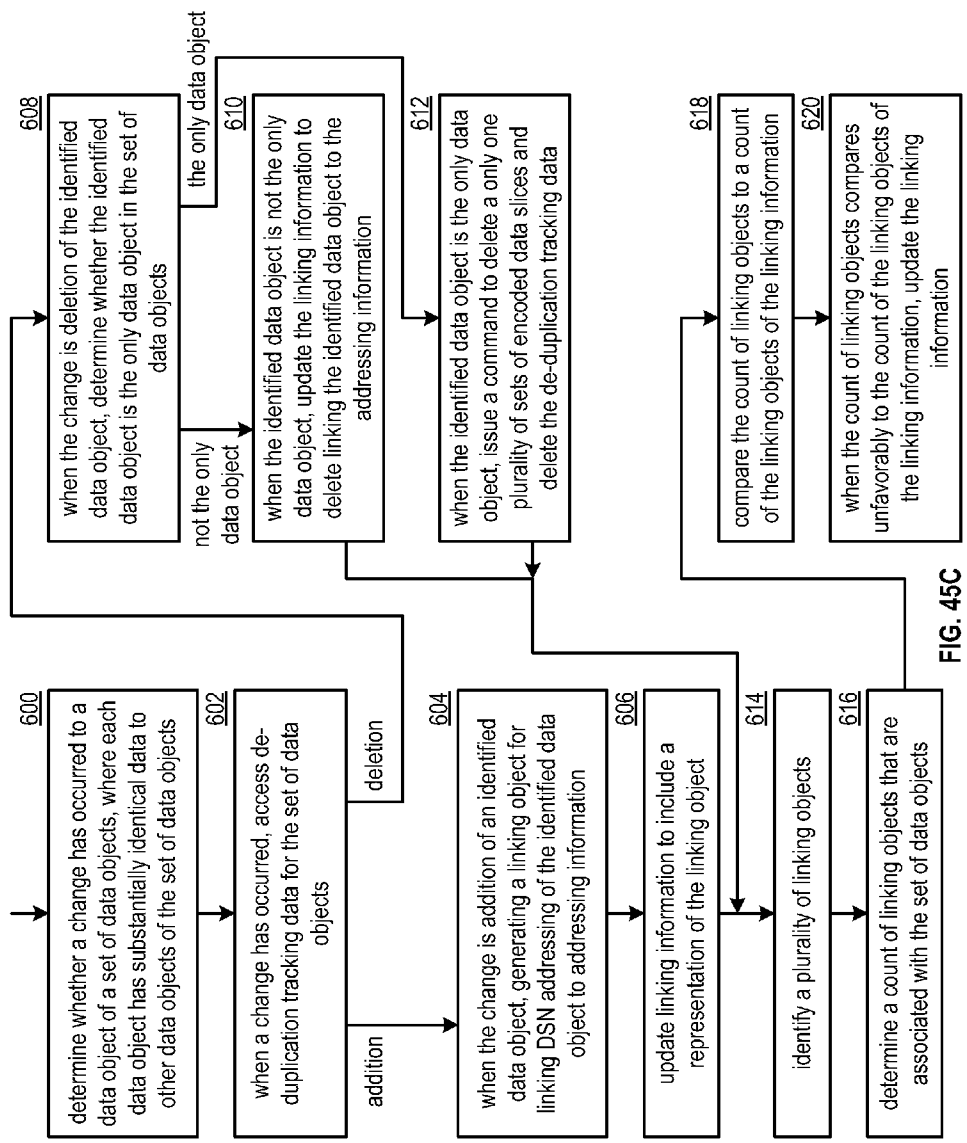
determine whether a change has occurred to a data object of a set of data objects, where each data object has substantially identical data to other data objects of the set of data objects
600
when a change has occurred, access de-duplication tracking data for the set of data objects
602
deletion
addition
when the change is addition of an identified data object, generating a linking object for linking DSN addressing of the identified data object to addressing information
604
update linking information to include a representation of the linking object
606
identify a plurality of linking objects
614
determine a count of linking objects that are associated with the set of data objects
616
when the change is deletion of the identified data object, determine whether the identified data object is the only data object in the set of data objects
608
the only data object
not the only data object
when the identified data object is not the only data object, update the linking information to delete linking the identified data object to the addressing information
610
when the identified data object is the only data object, issue a command to delete a only one plurality of sets of encoded data slices and delete the de-duplication tracking data
612
compare the count of linking objects to a count of the linking objects of the linking information
618
when the count of linking objects compares unfavorably to the count of the linking objects of the linking information, update the linking information
620
FIG. 45C

UPDATING DE-DUPLICATION TRACKING DATA FOR A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/871,833, entitled "PRIORITIZING DATA RETENTION IN A DISPERSED STORAGE NETWORK", filed Aug. 29, 2013, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 44 is a flowchart illustrating an example of enabling slice rebuilding in accordance with the present invention;

FIG. 45C is a flowchart illustrating an example of updating de-duplication tracking data in accordance with the present invention;

DETAILED DESCRIPTION OF THE INVENTION

Figure 1:
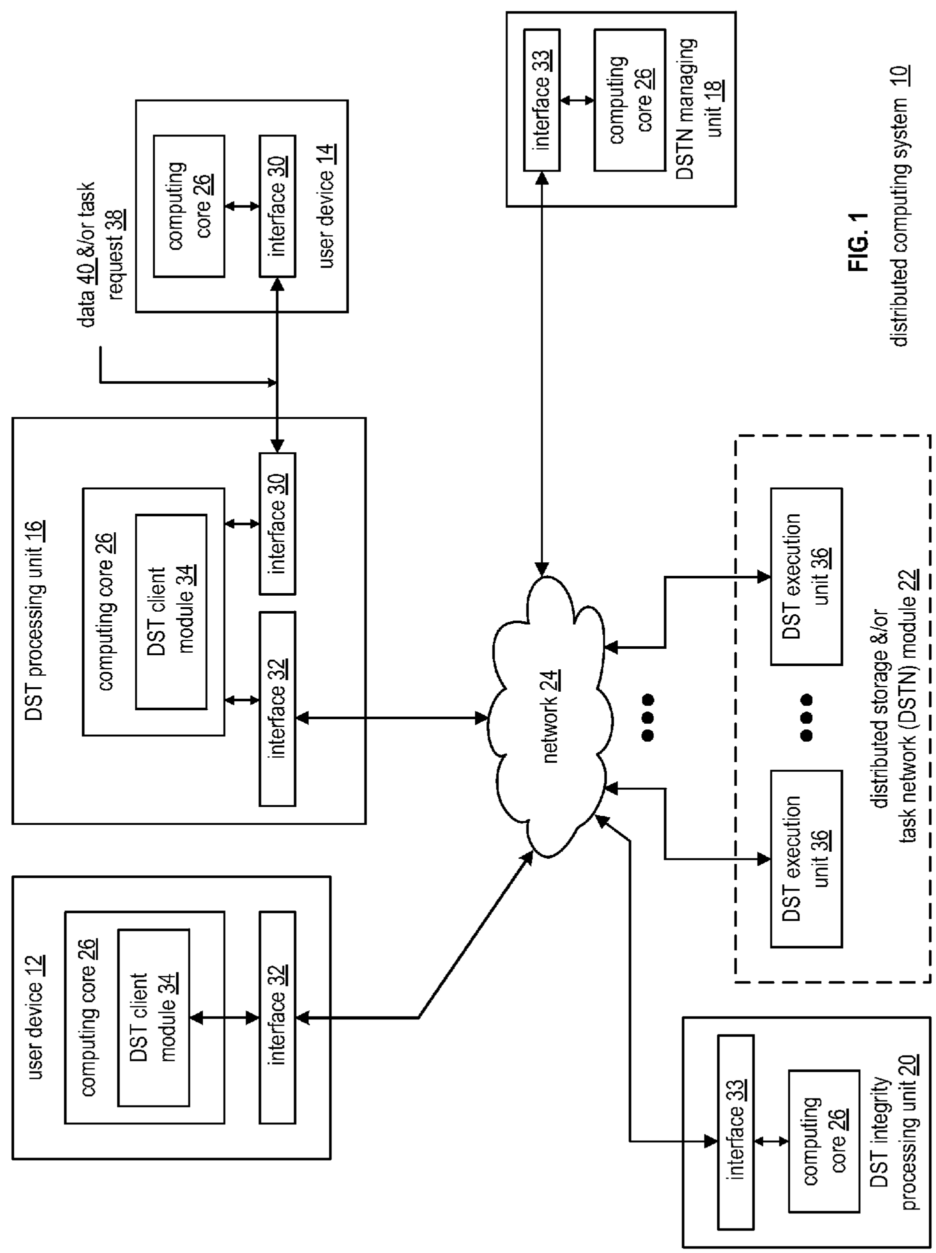
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
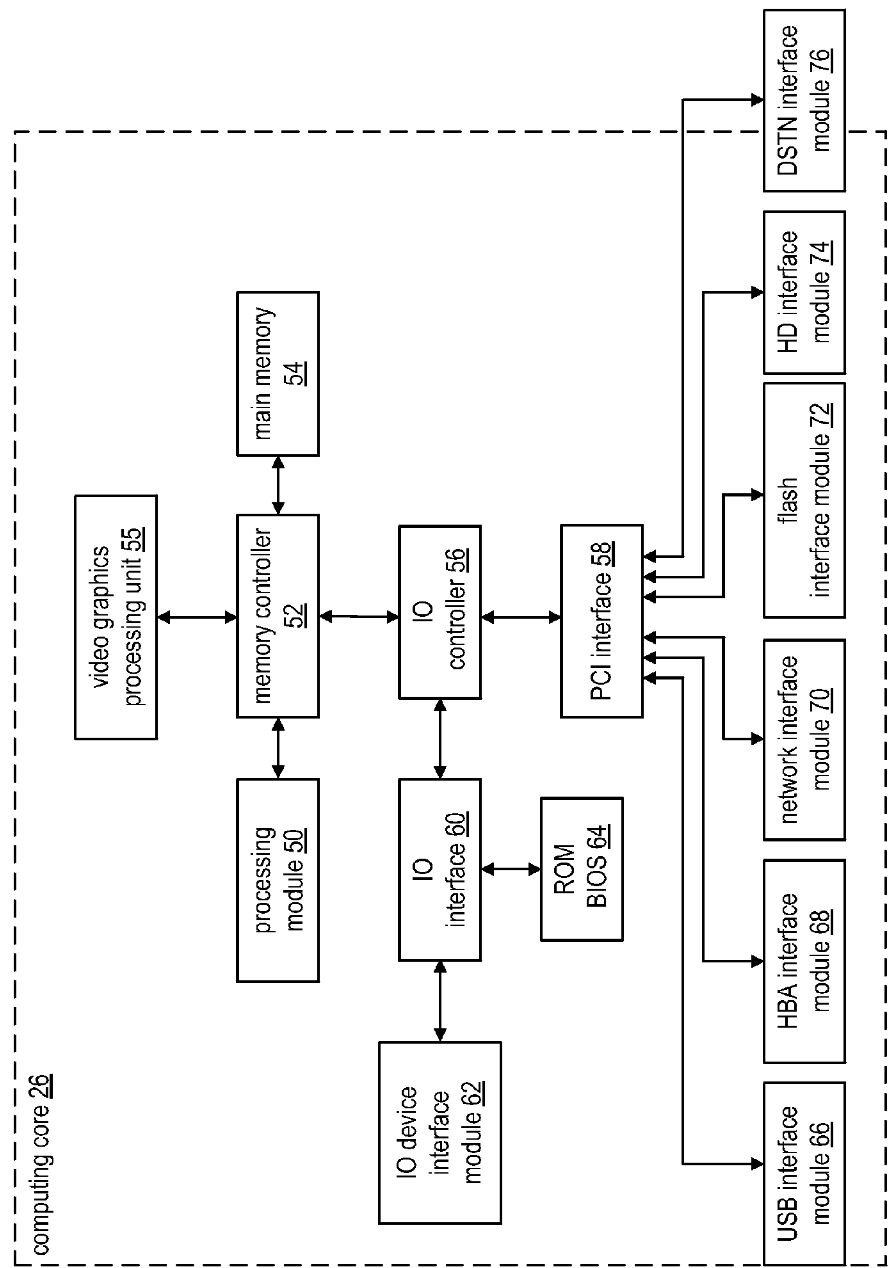
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN i0nterface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
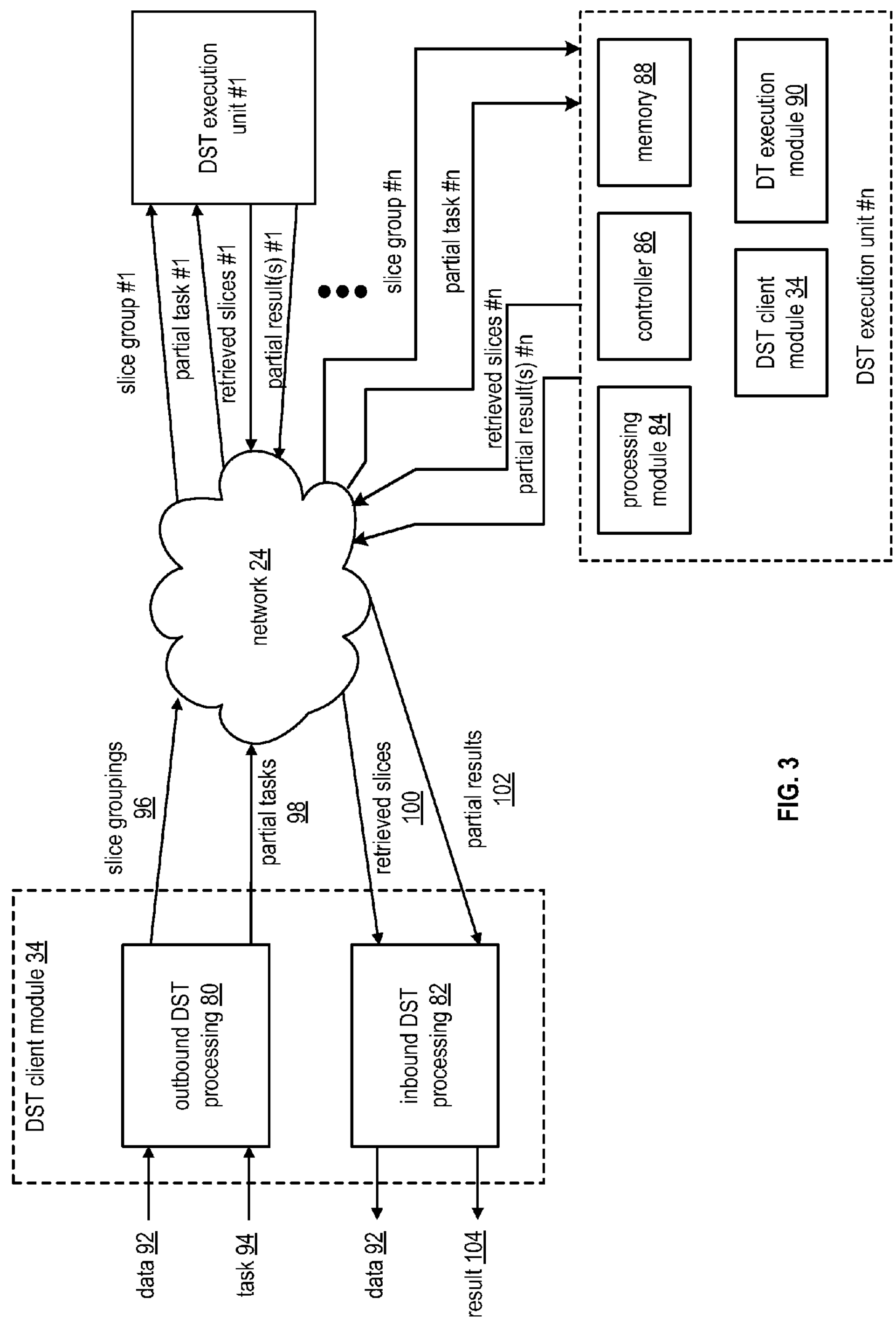
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the 0data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count.

In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
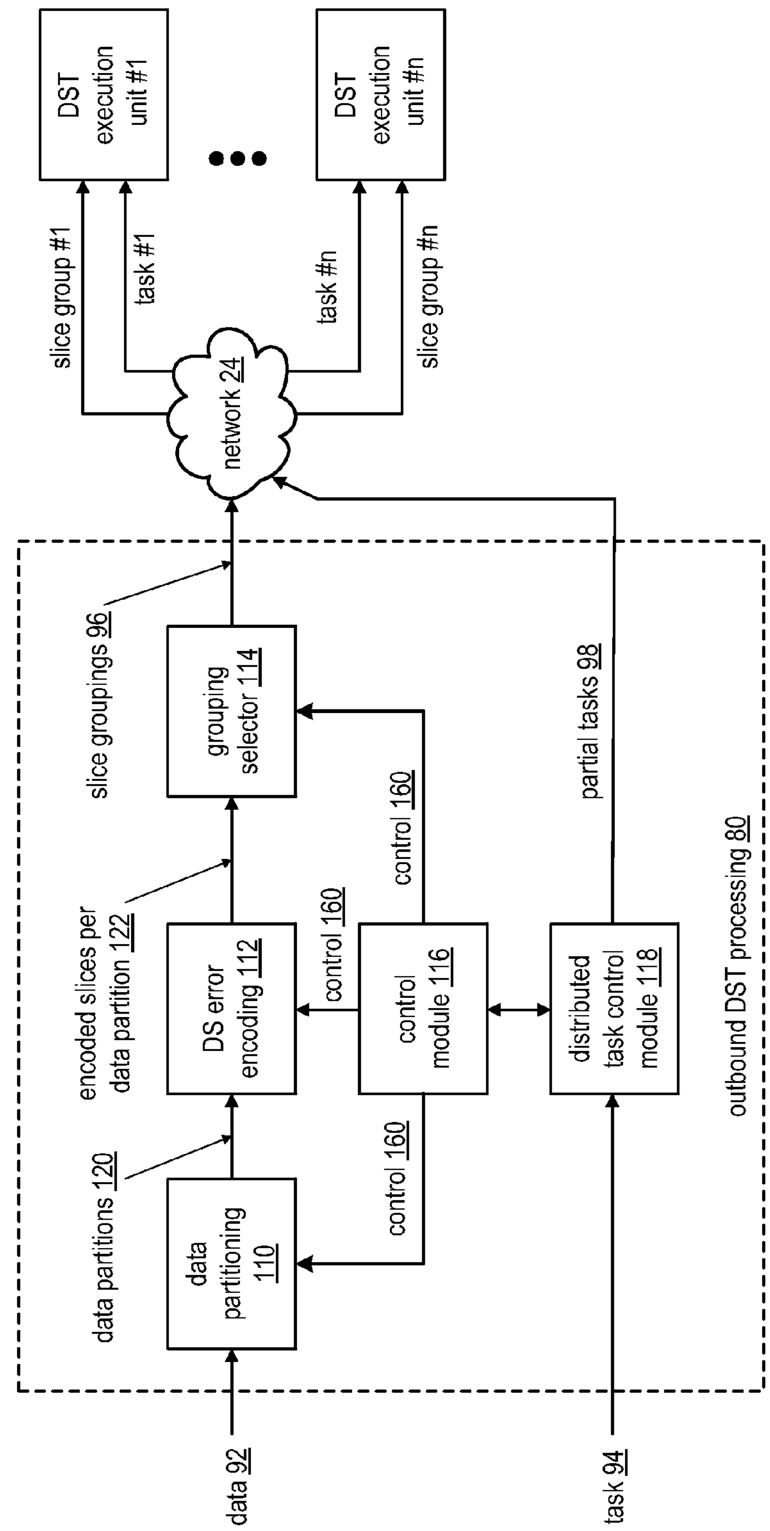
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
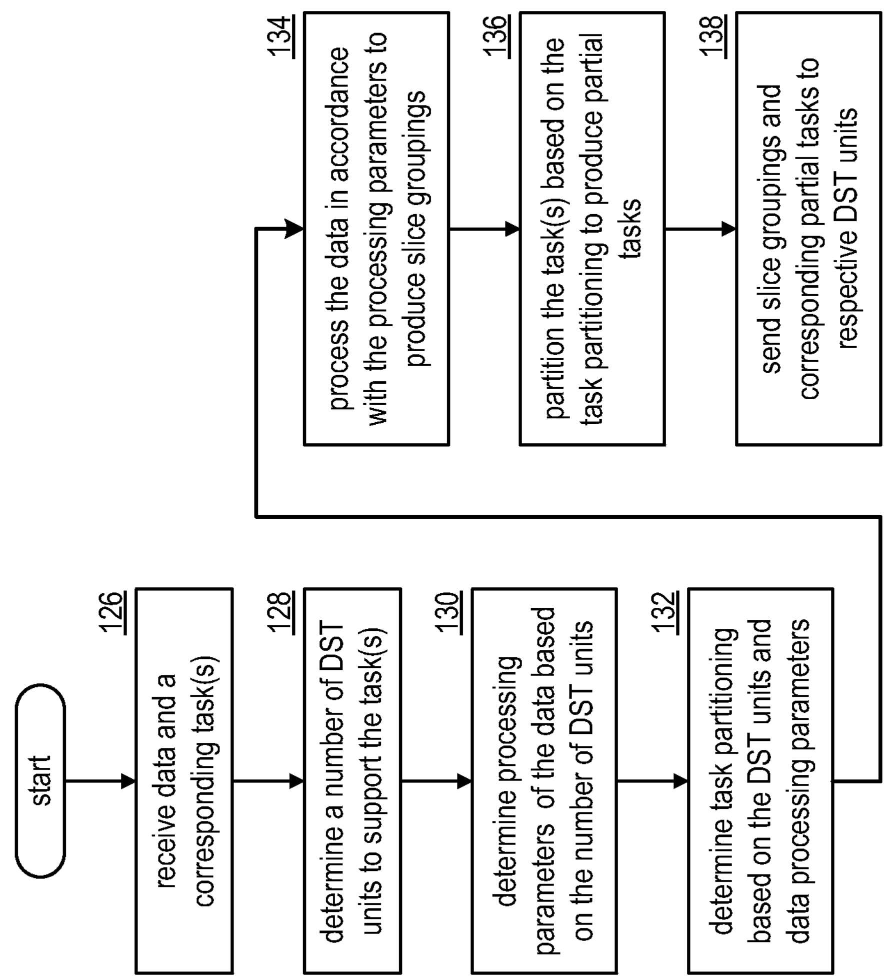
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
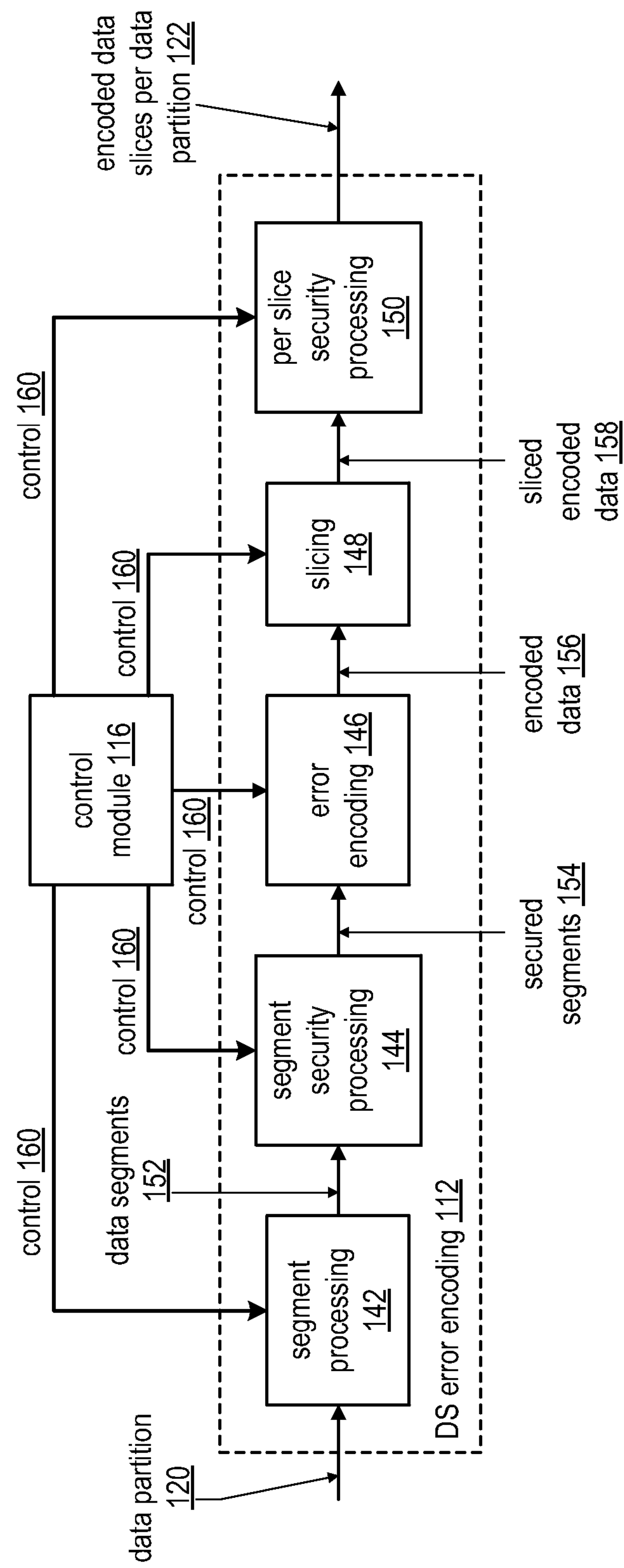
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
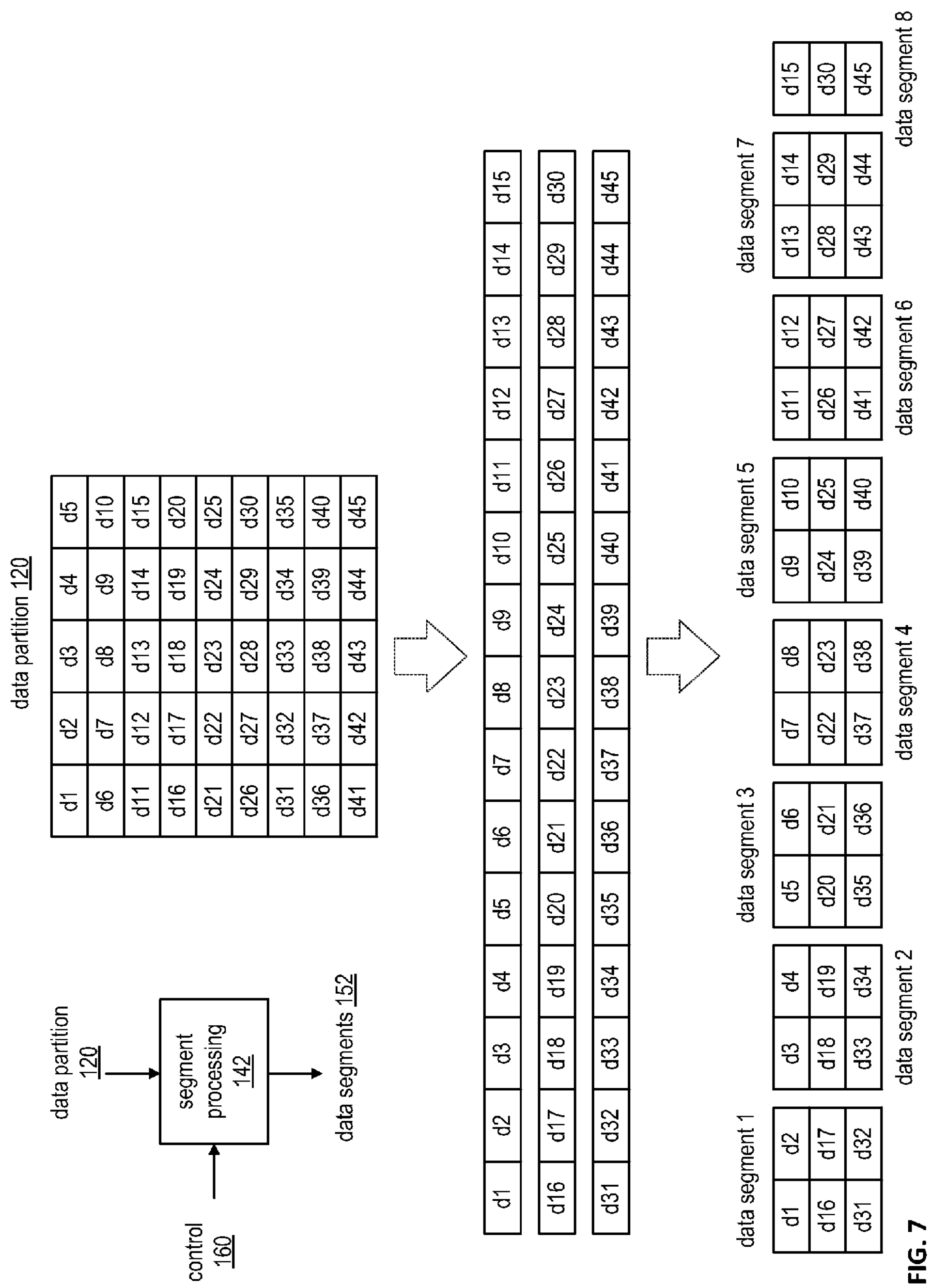
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential o order of the second 15 data blocks; and the third row of the 8 data segments in seq rder, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential uential order of the last 15 data blocks. Note that the number of data blocks, the grouping of the data blocks into segments, and size of the data blocks may vary to accommodate the desired distributed task processing function.

Figure 8:
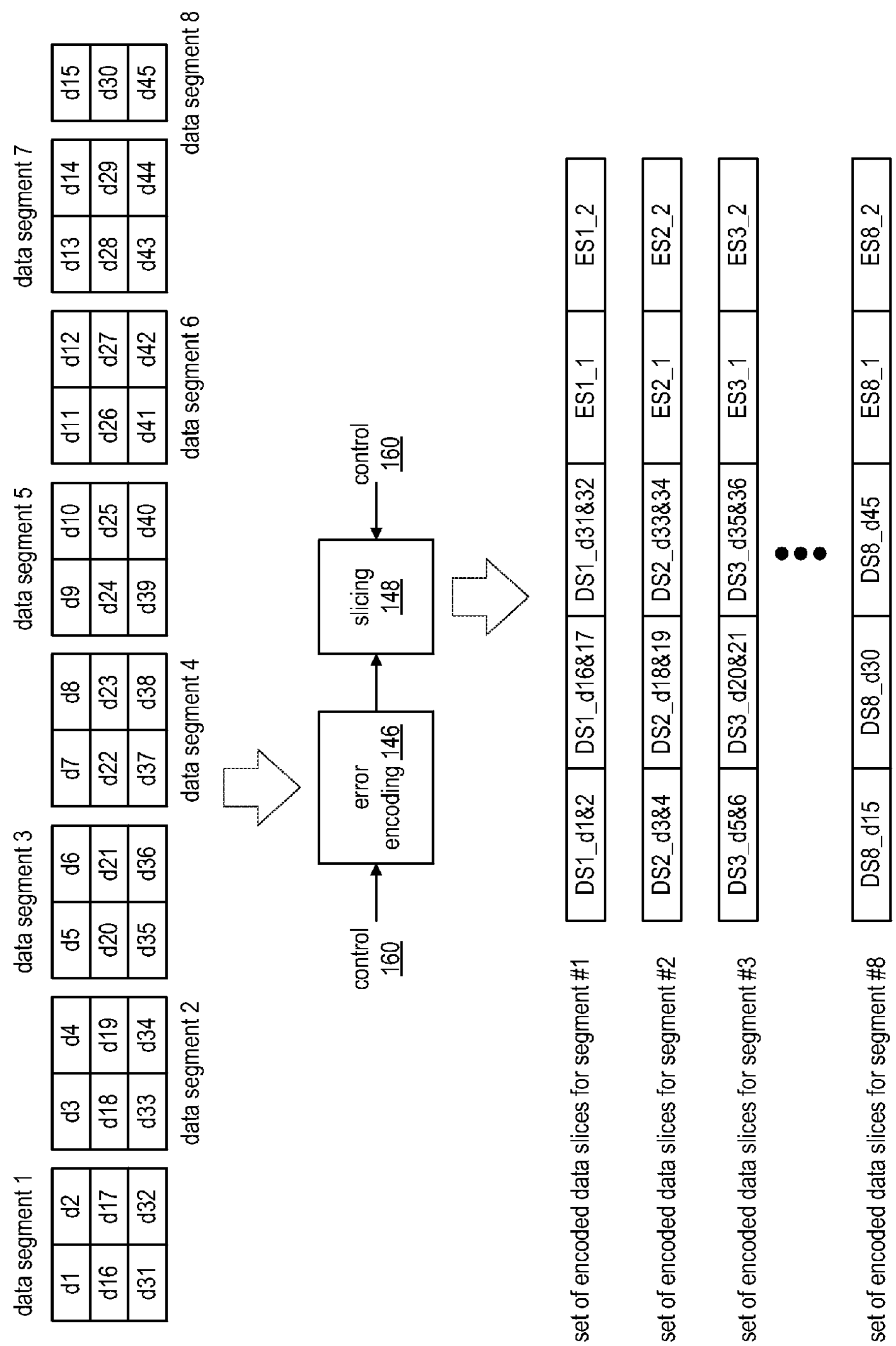
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1&d2); the content of the second encoded data slice (DS1_d16&17) of the first set of encoded data slices is substantially similar to content of the second word (e.g., d16&d17); and the content of the third encoded data slice (DS1_d31&32) of the first set of encoded data slices is substantially similar to content of the third word (e.g., d31&d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3&d4); the content of the second encoded data slice (DS2_d18&19) of the second set of encoded data slices is substantially similar to content of the second word (e.g., d18&d19); and the content of the third encoded data slice (DS2_d33&34) of the second set of encoded data slices is substantially similar to content of the third word (e.g., d33&d34). The content of the fourth and fifth encoded data slices (e.g., ES1_1 and ES1_2) of the second set of encoded data slices includes error correction data based on the first-third words of the second data segment.

Figure 9:
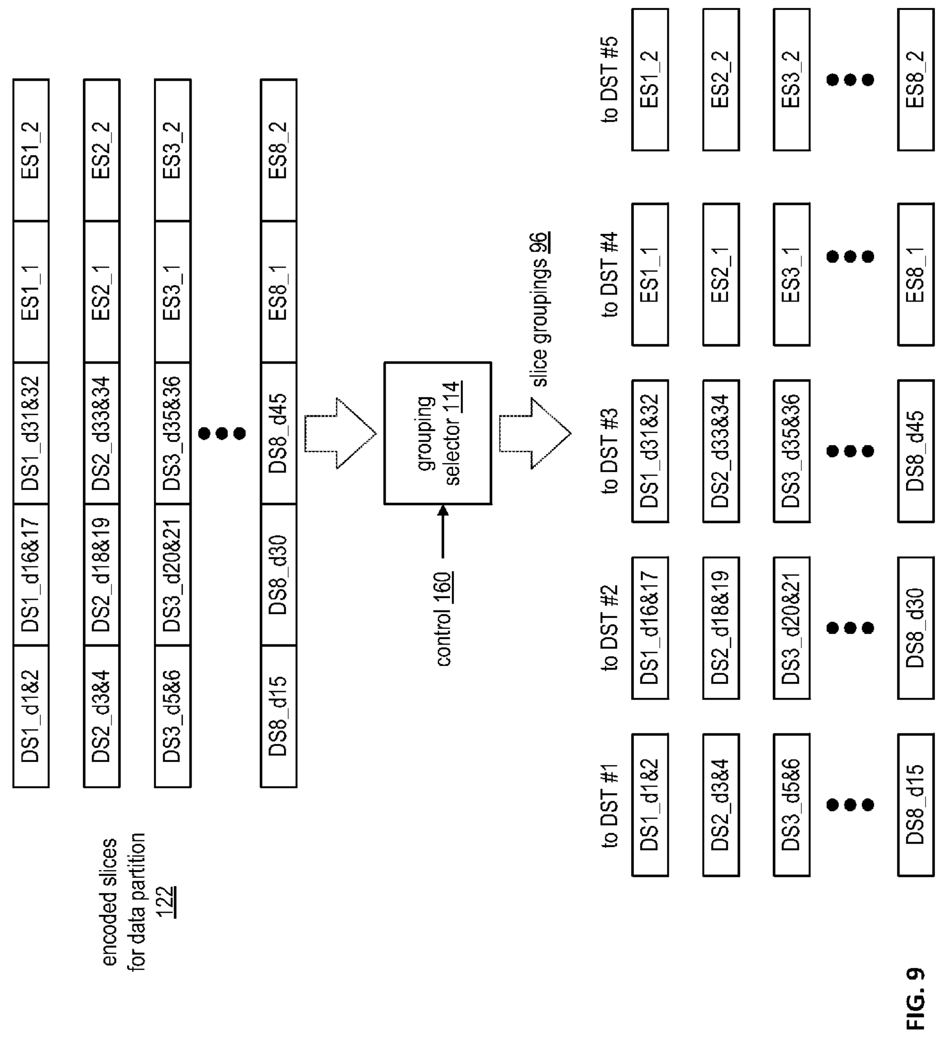
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
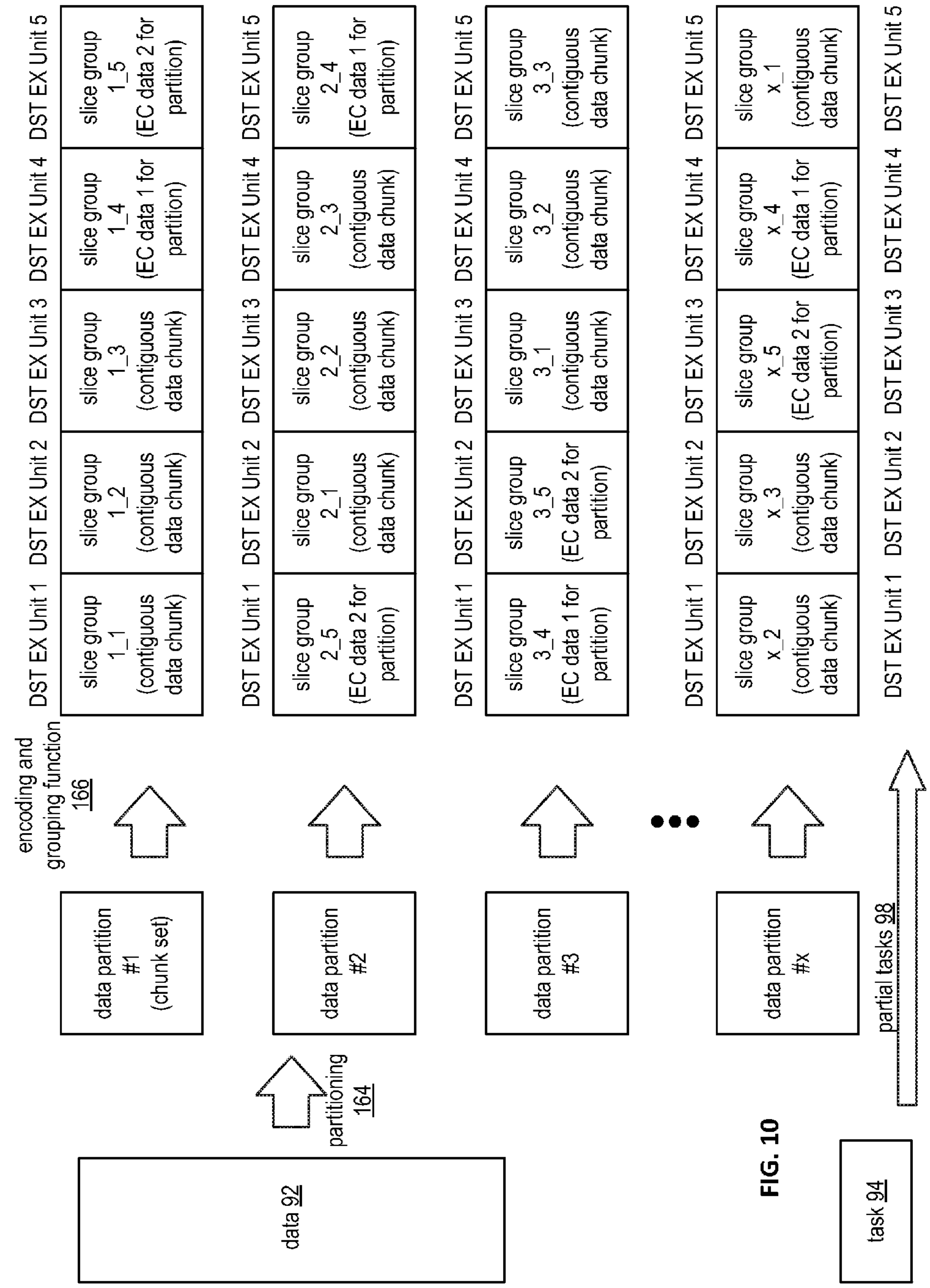
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1–x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
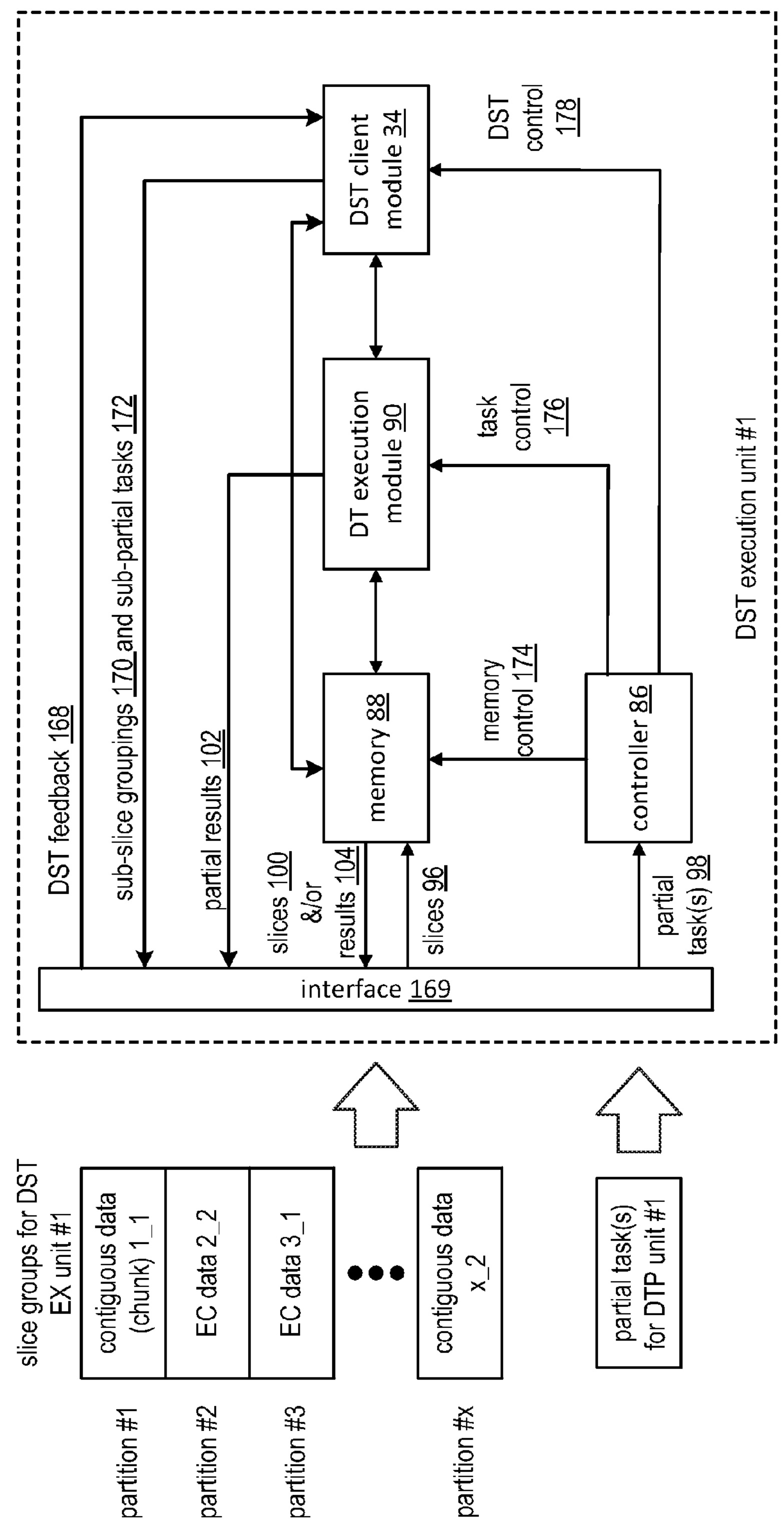
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
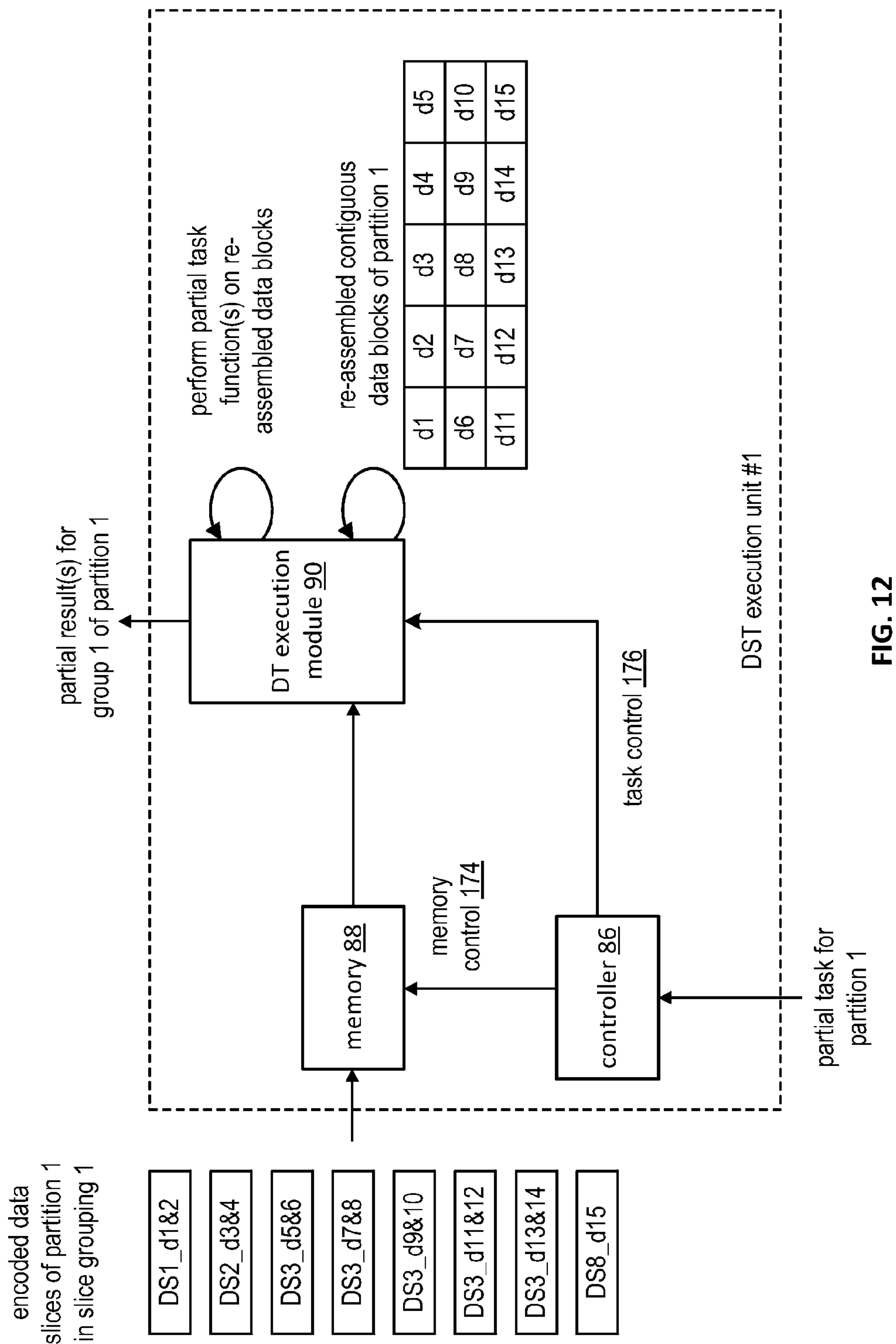
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
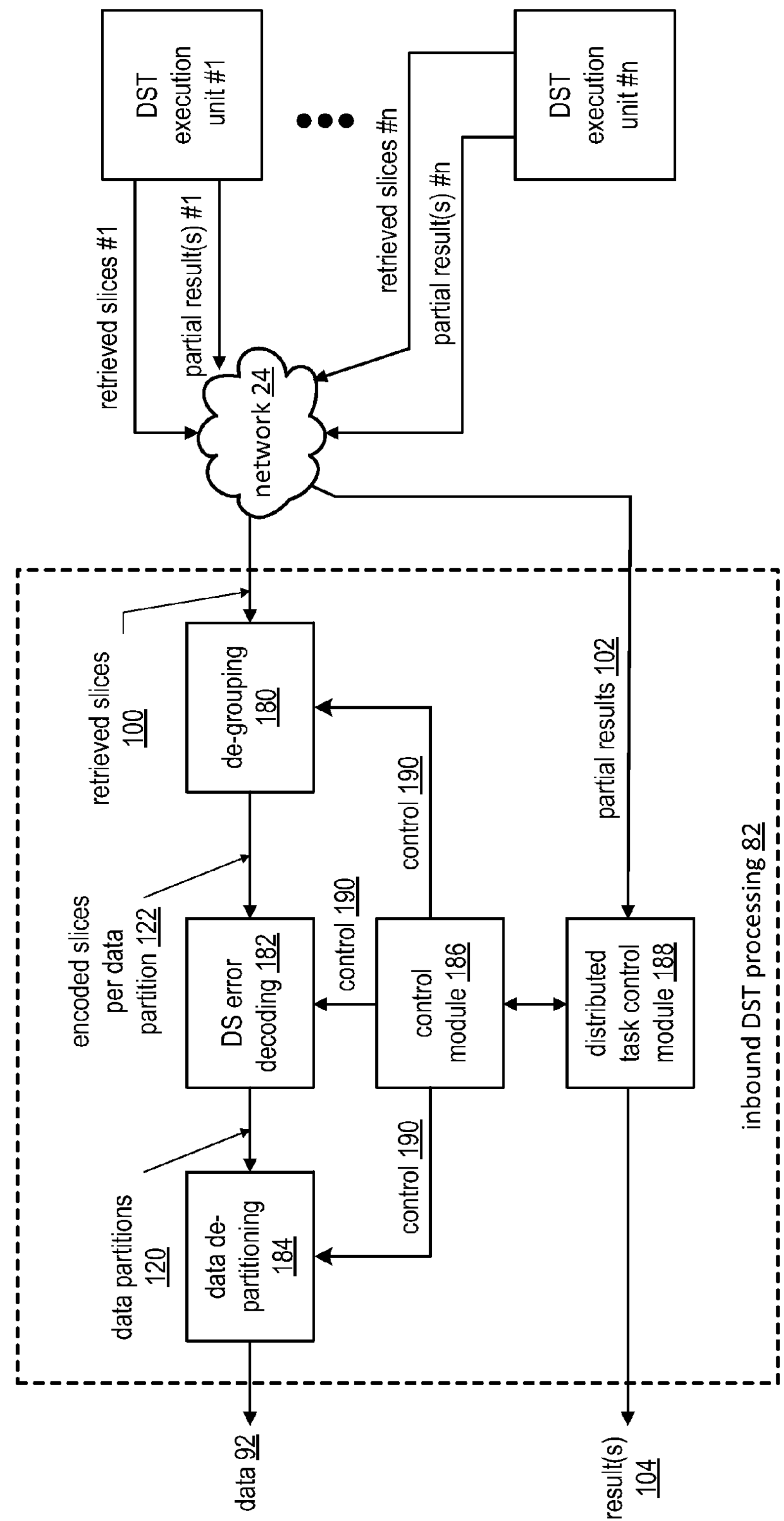
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
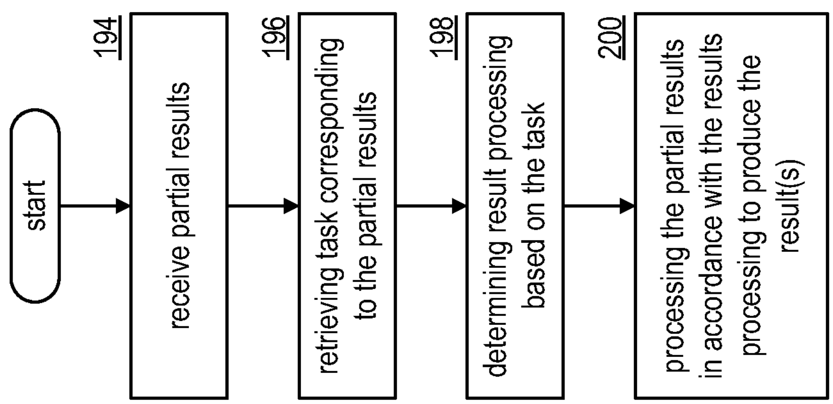
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
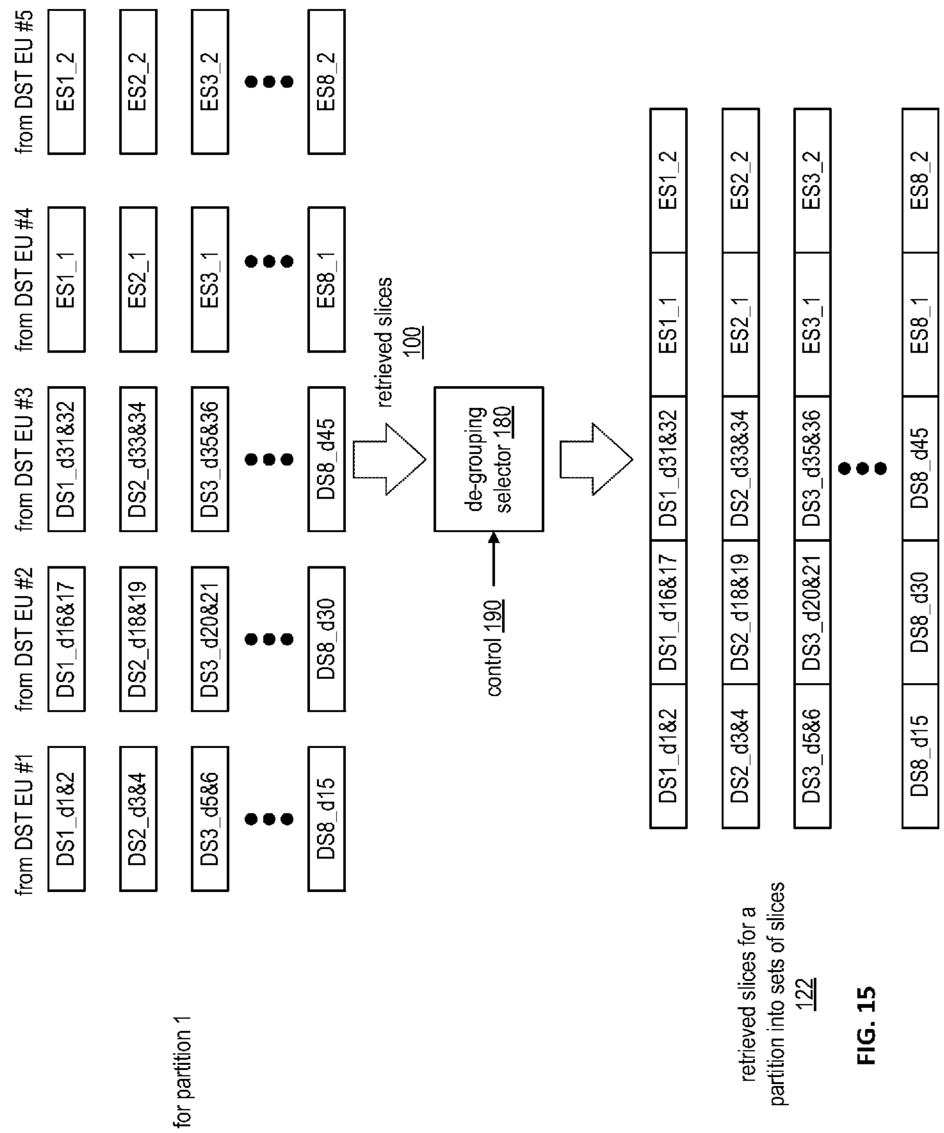
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
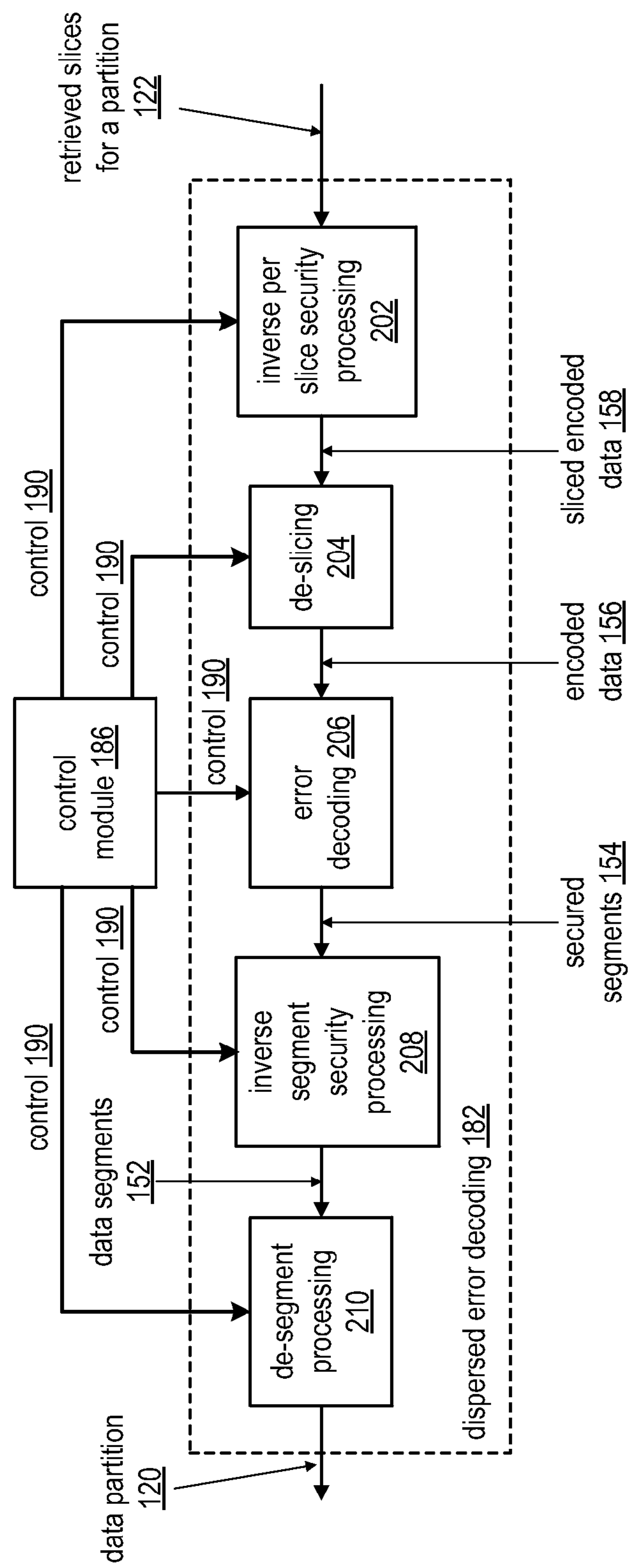
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
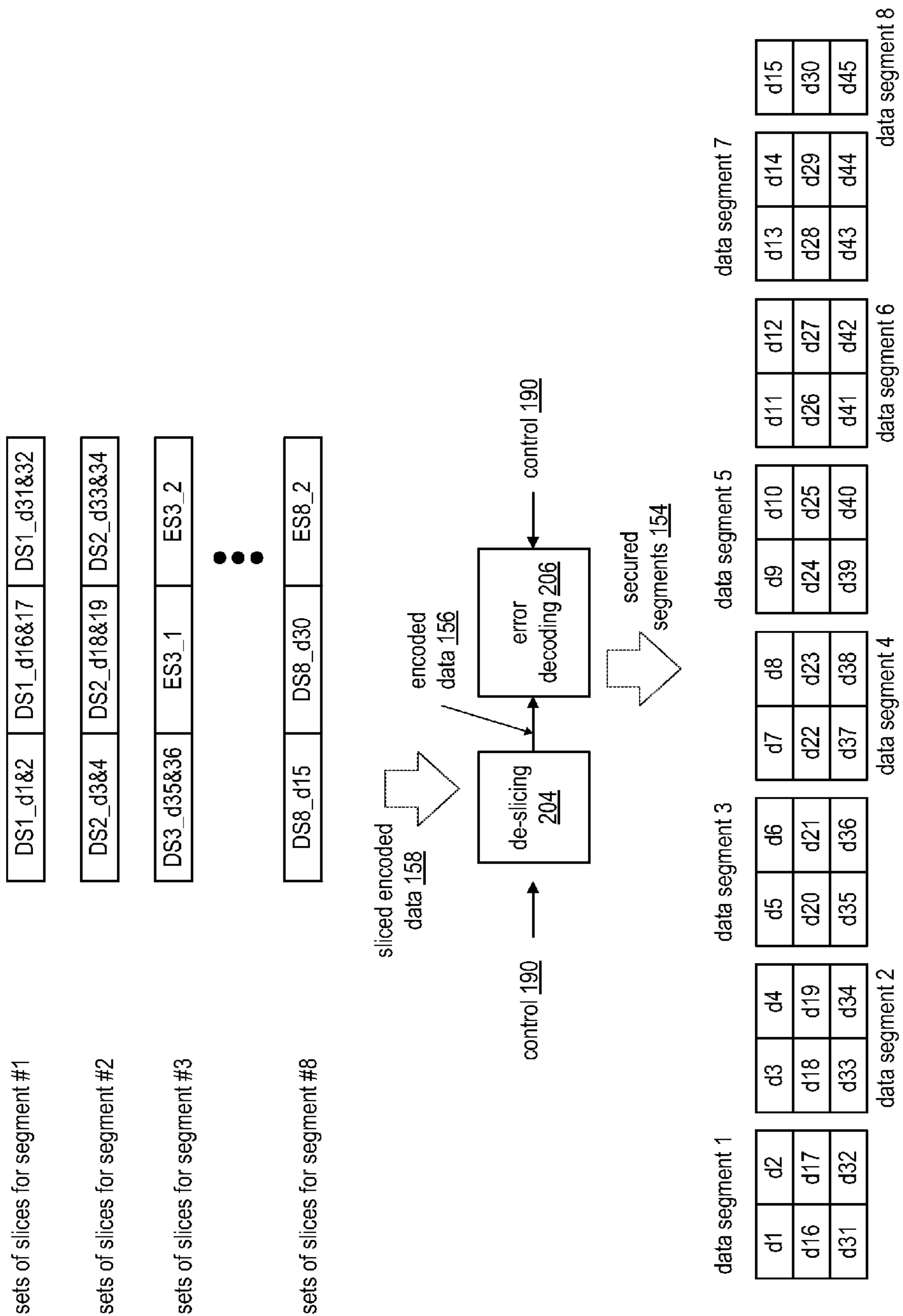
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
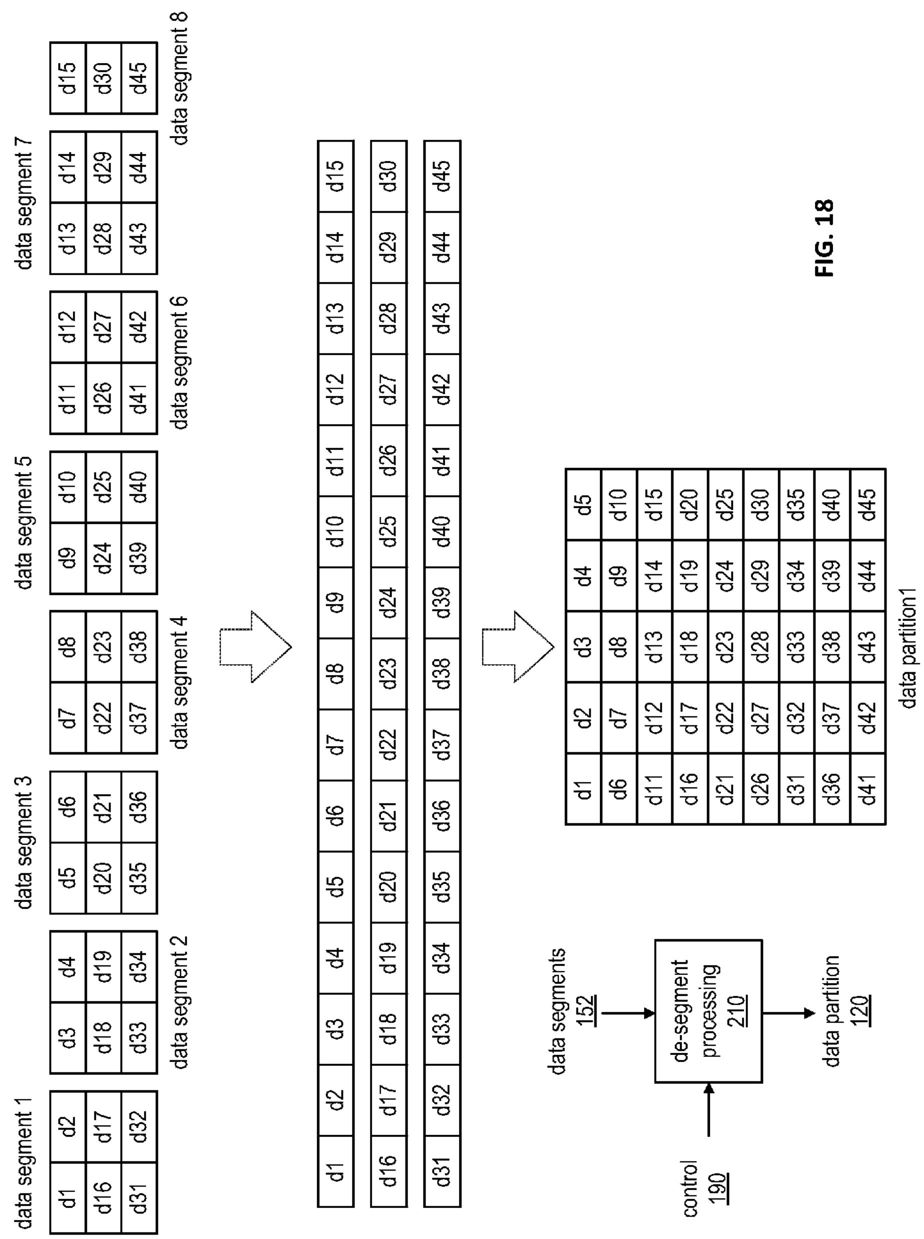
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
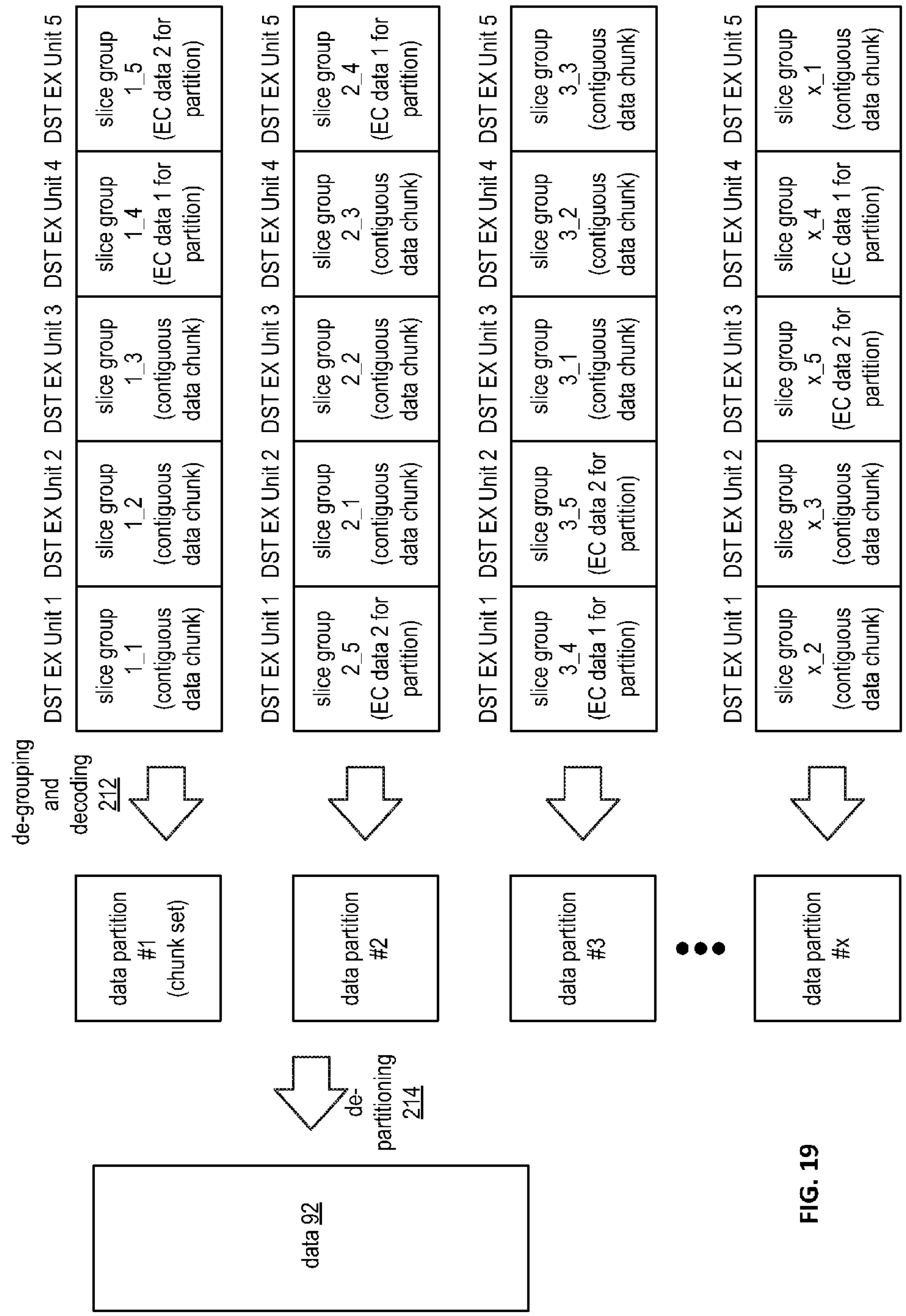
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1–x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
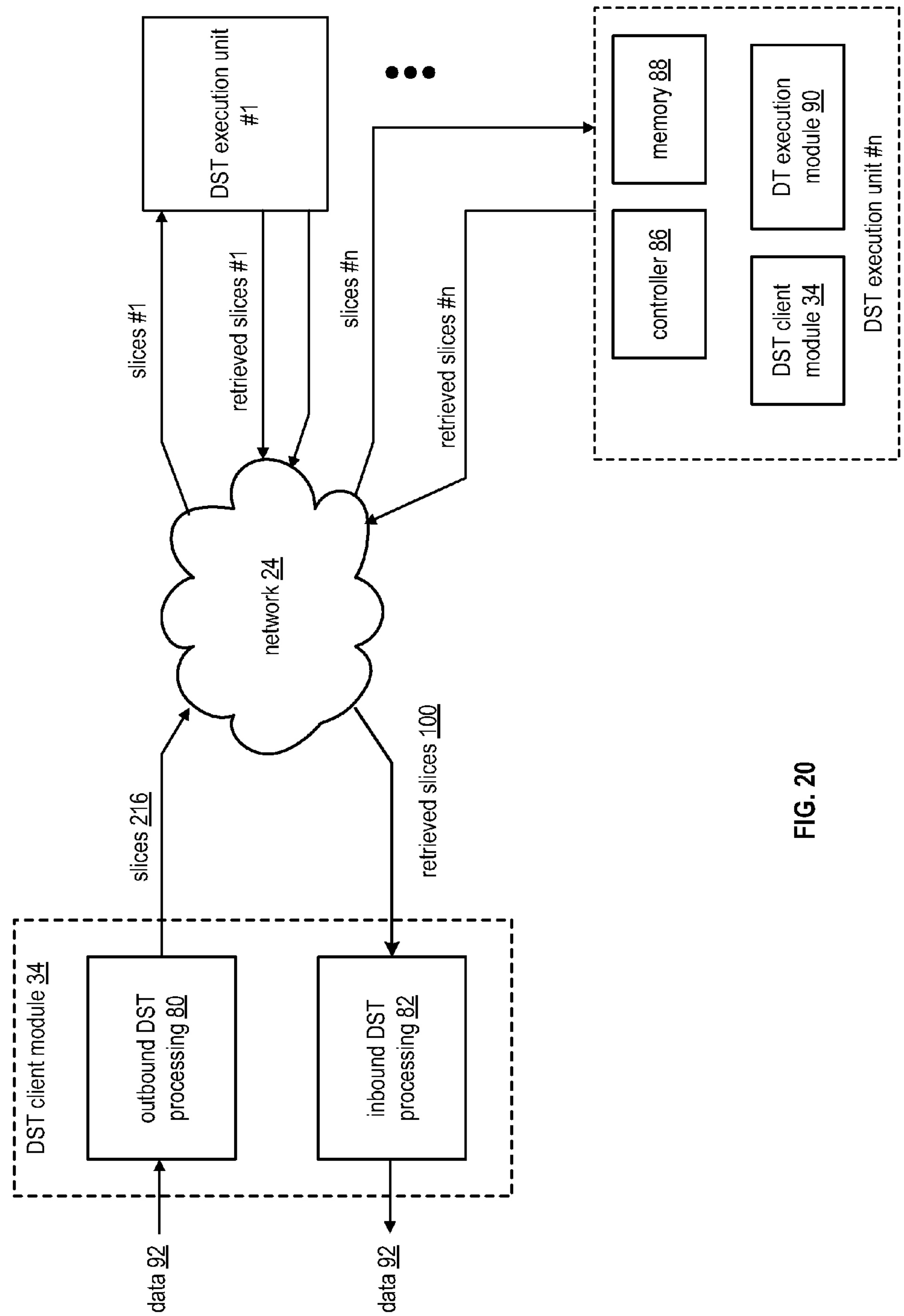
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
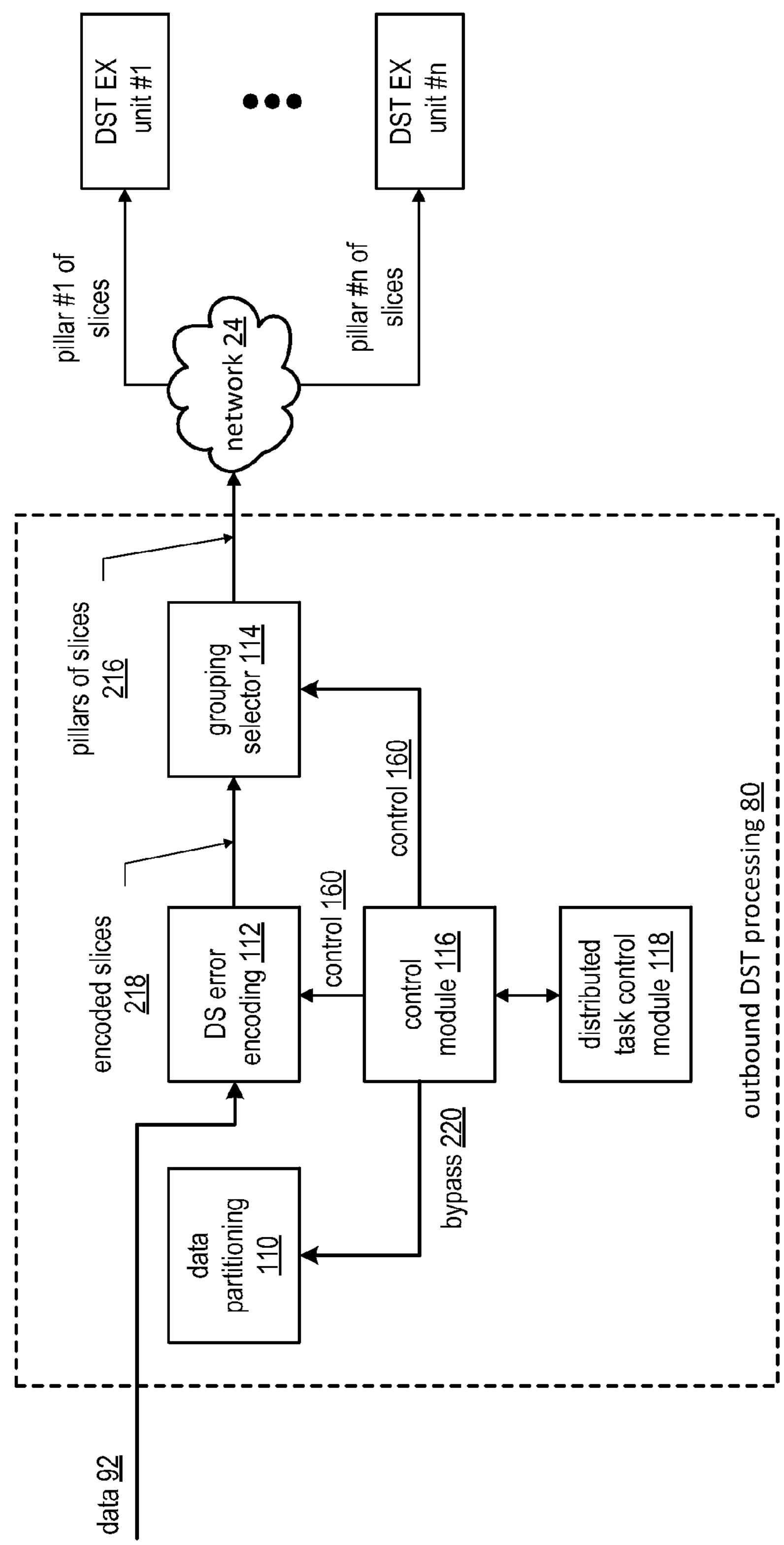
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
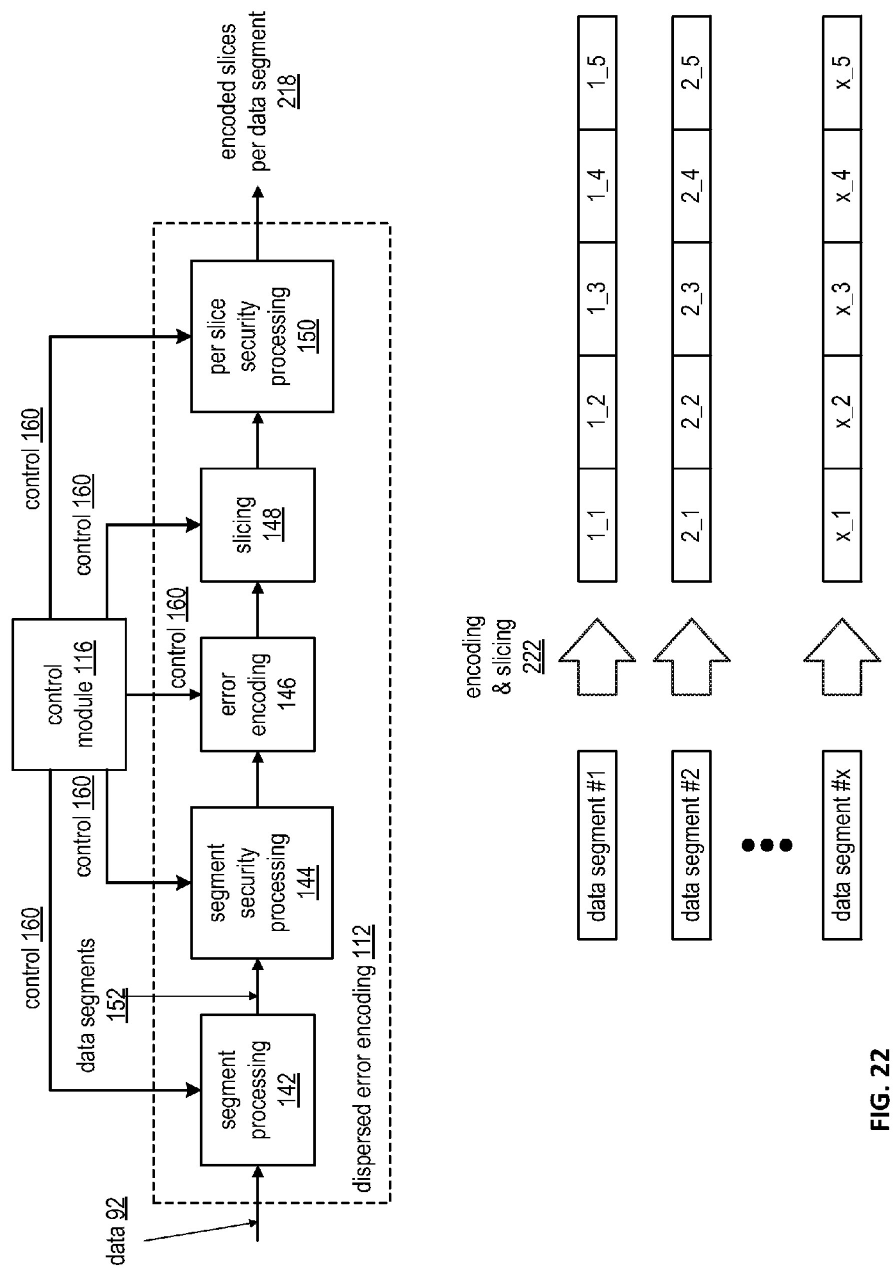
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
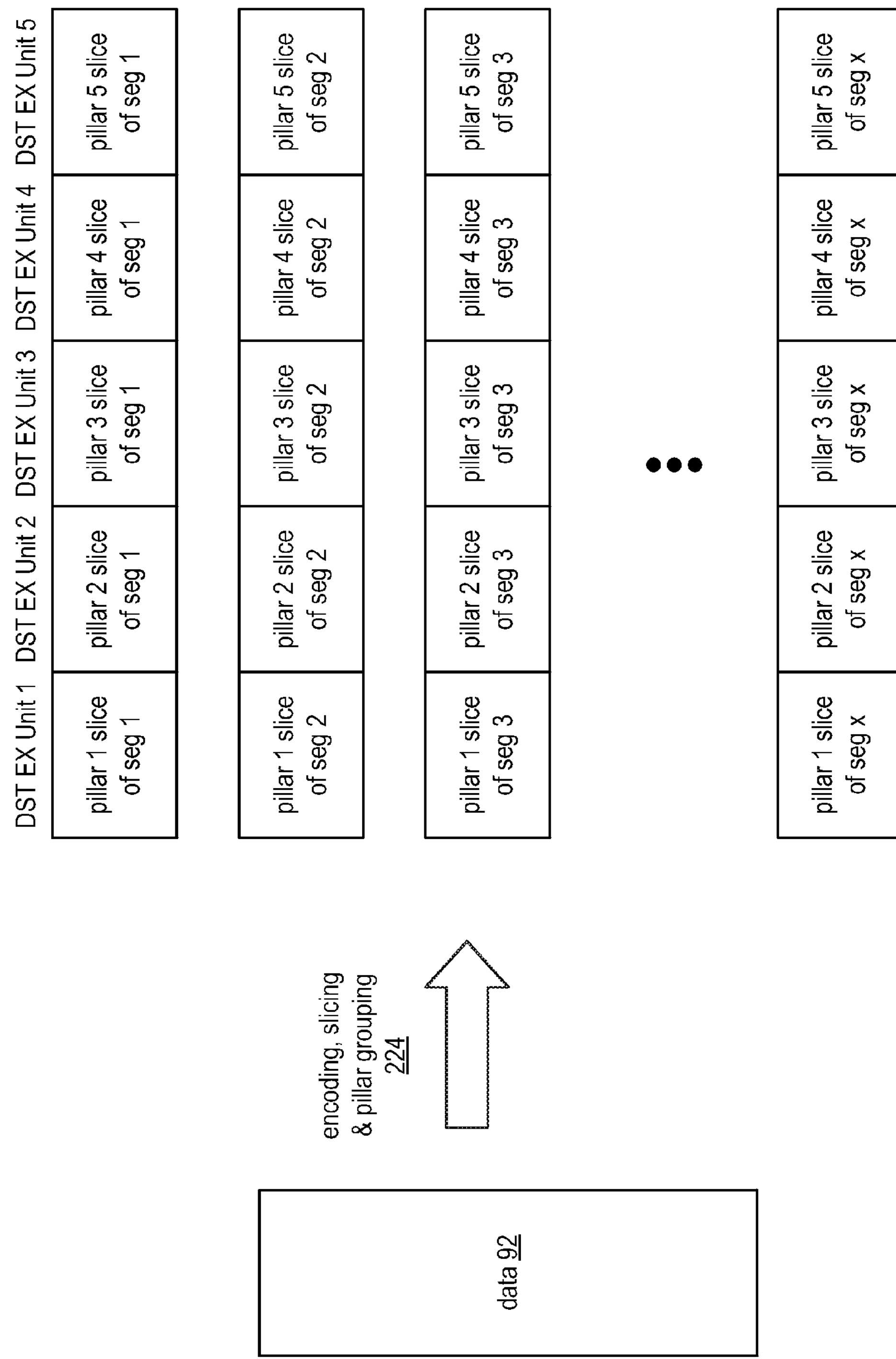
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
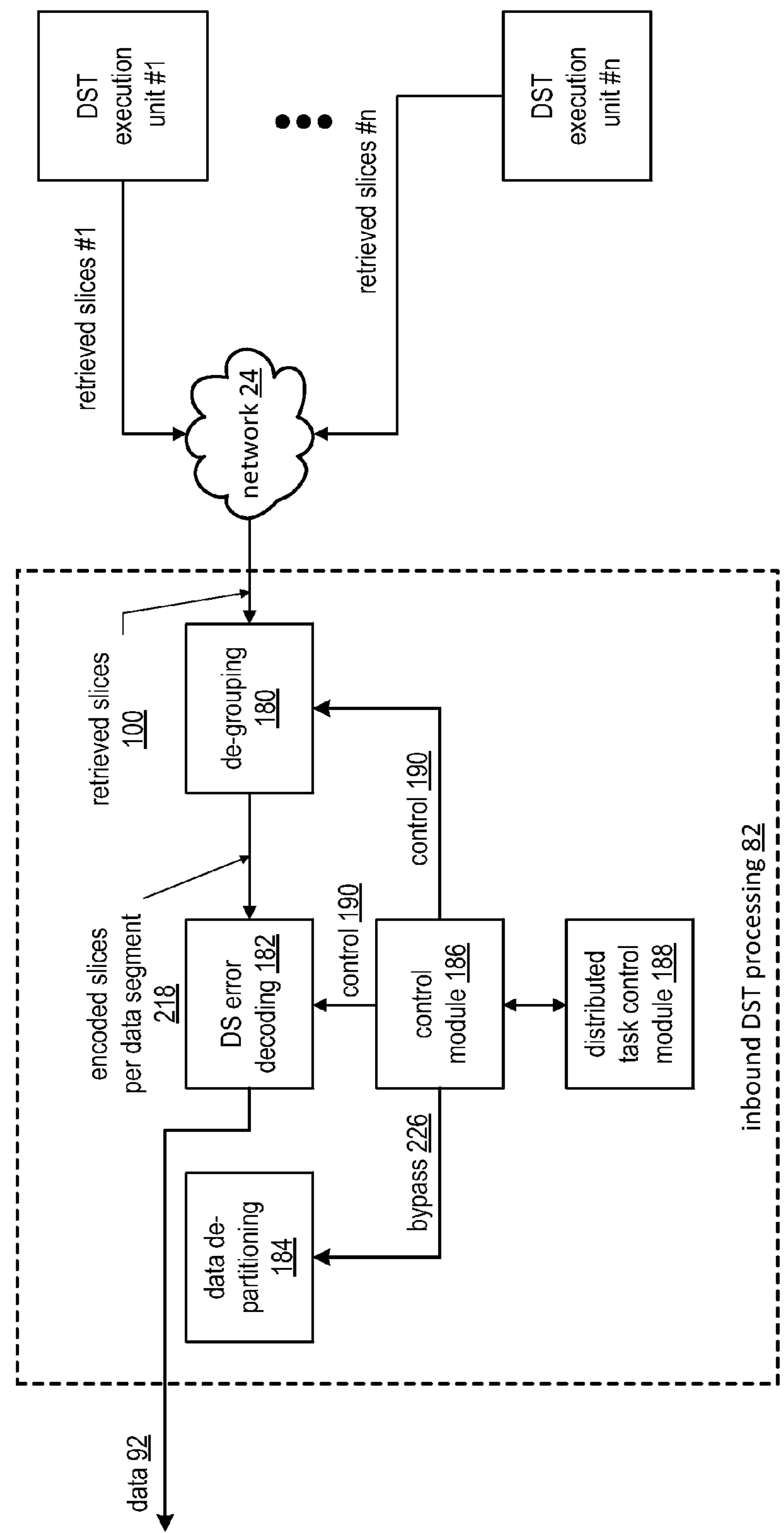
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
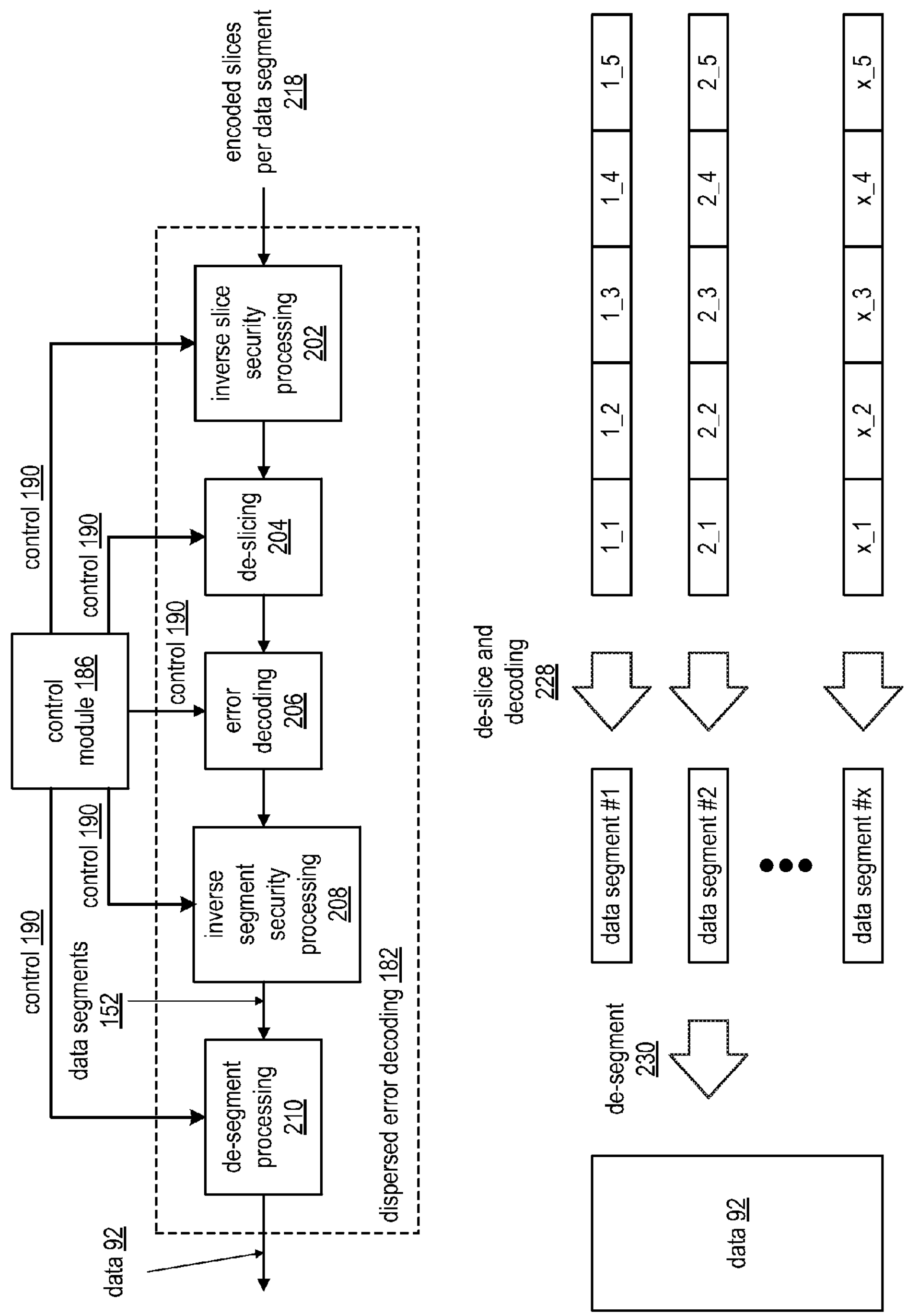
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment

218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
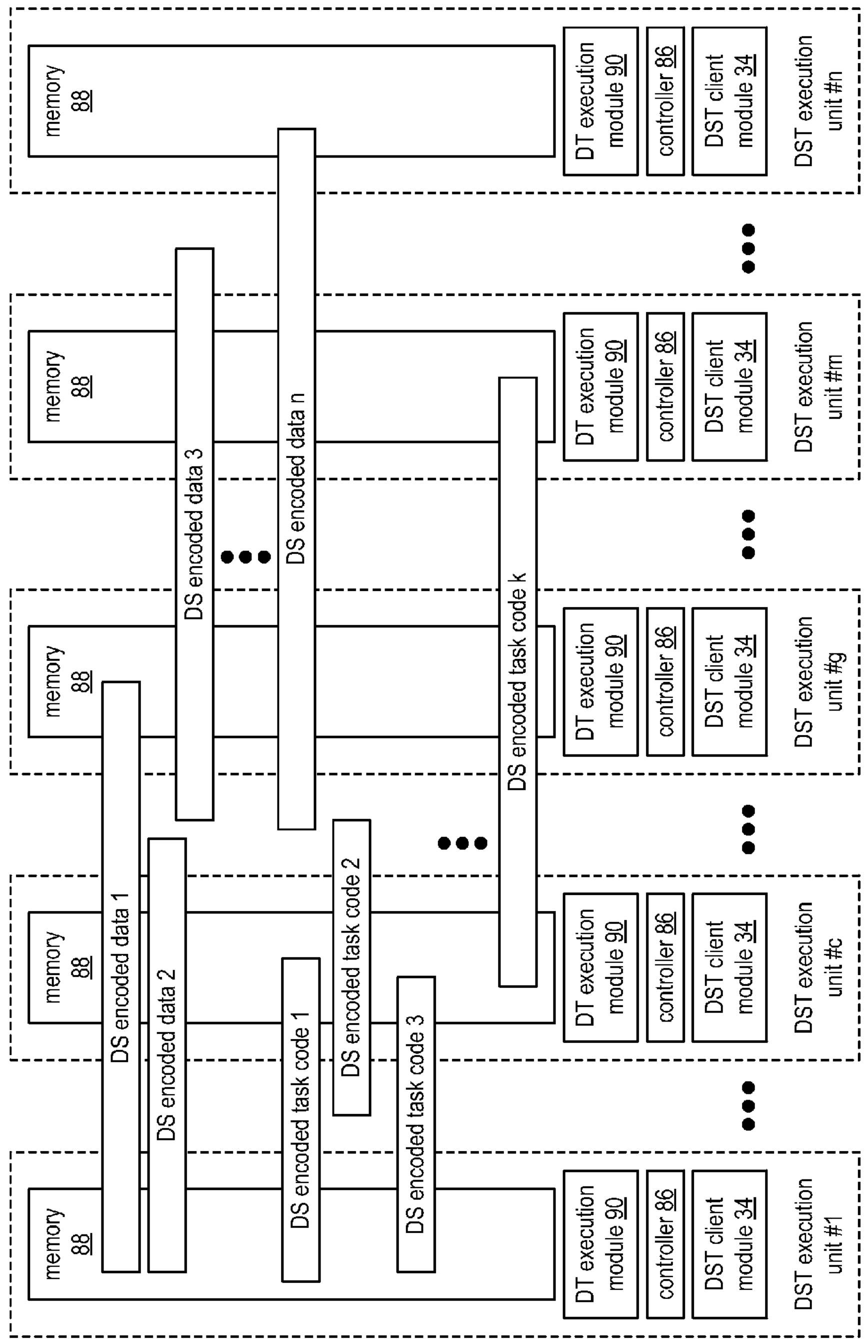
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
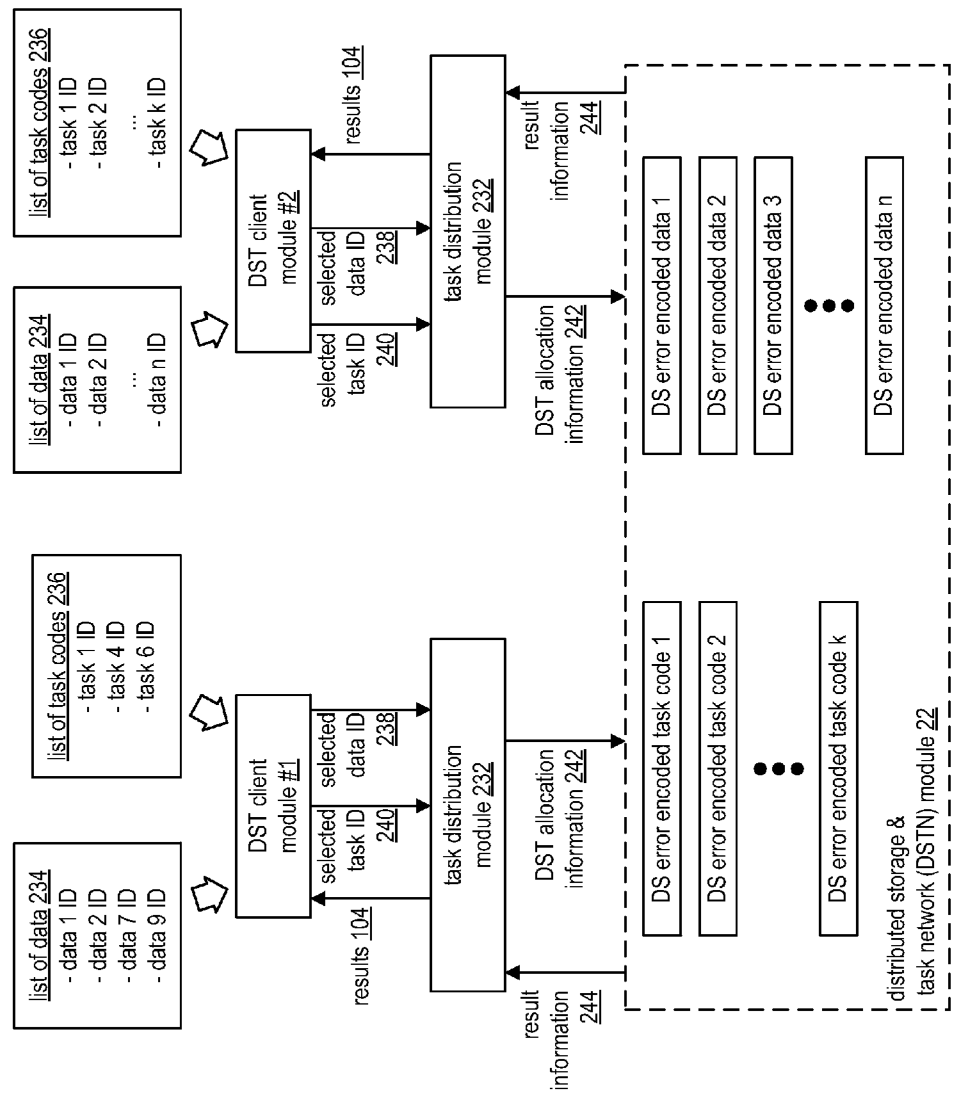
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
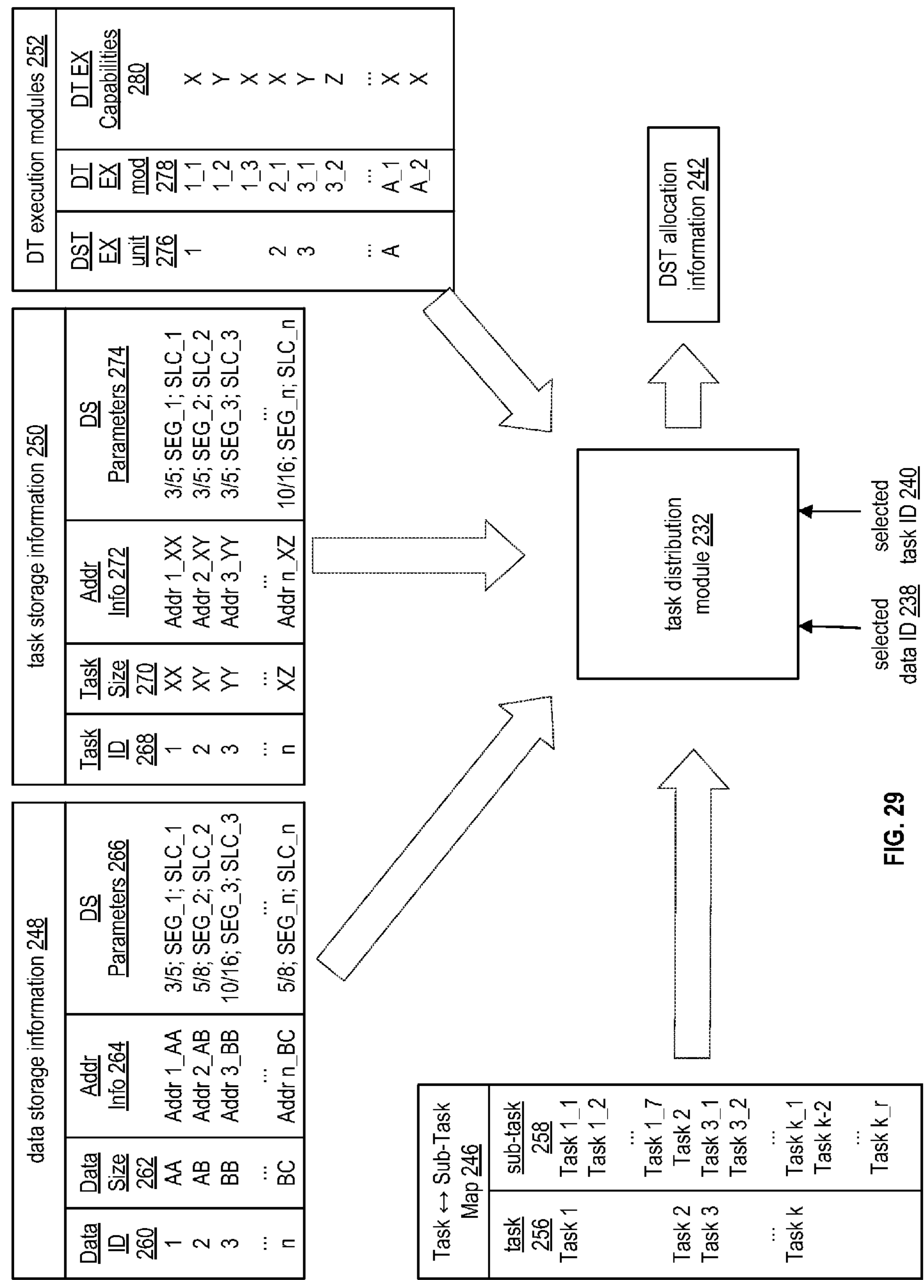
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
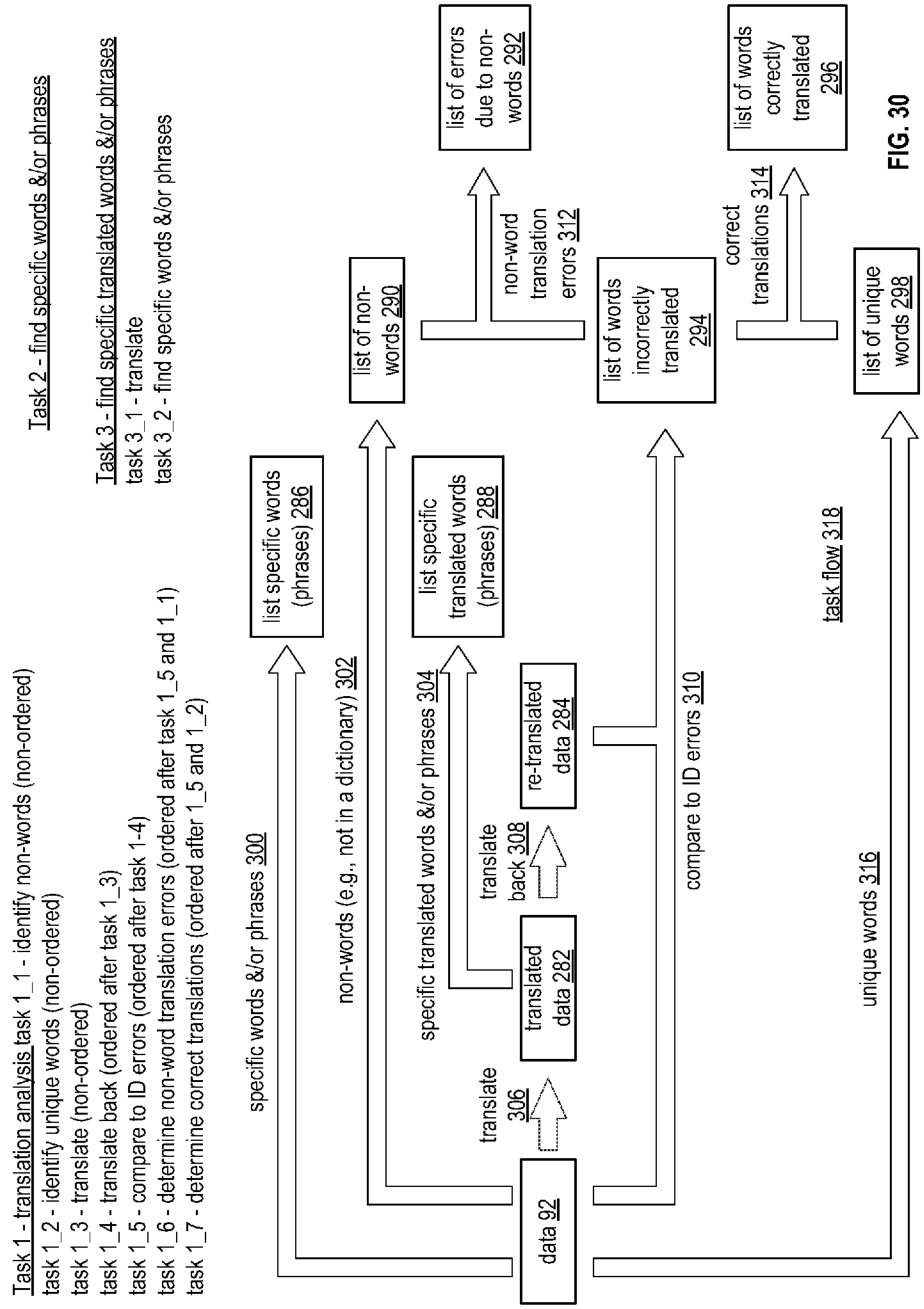
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4-translate back (ordered after task 1_3); task 1_5—compare to ID errors (ordered after task 1-4); task 1_6—determine non-word translation errors (ordered after task 1_5 and 1_1); and task 1_7-determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.), may include the word and/or phrase, how many times it is used, where in the data it is used, and/or any other information requested regarding a word and/or phrase.

Figure 31:
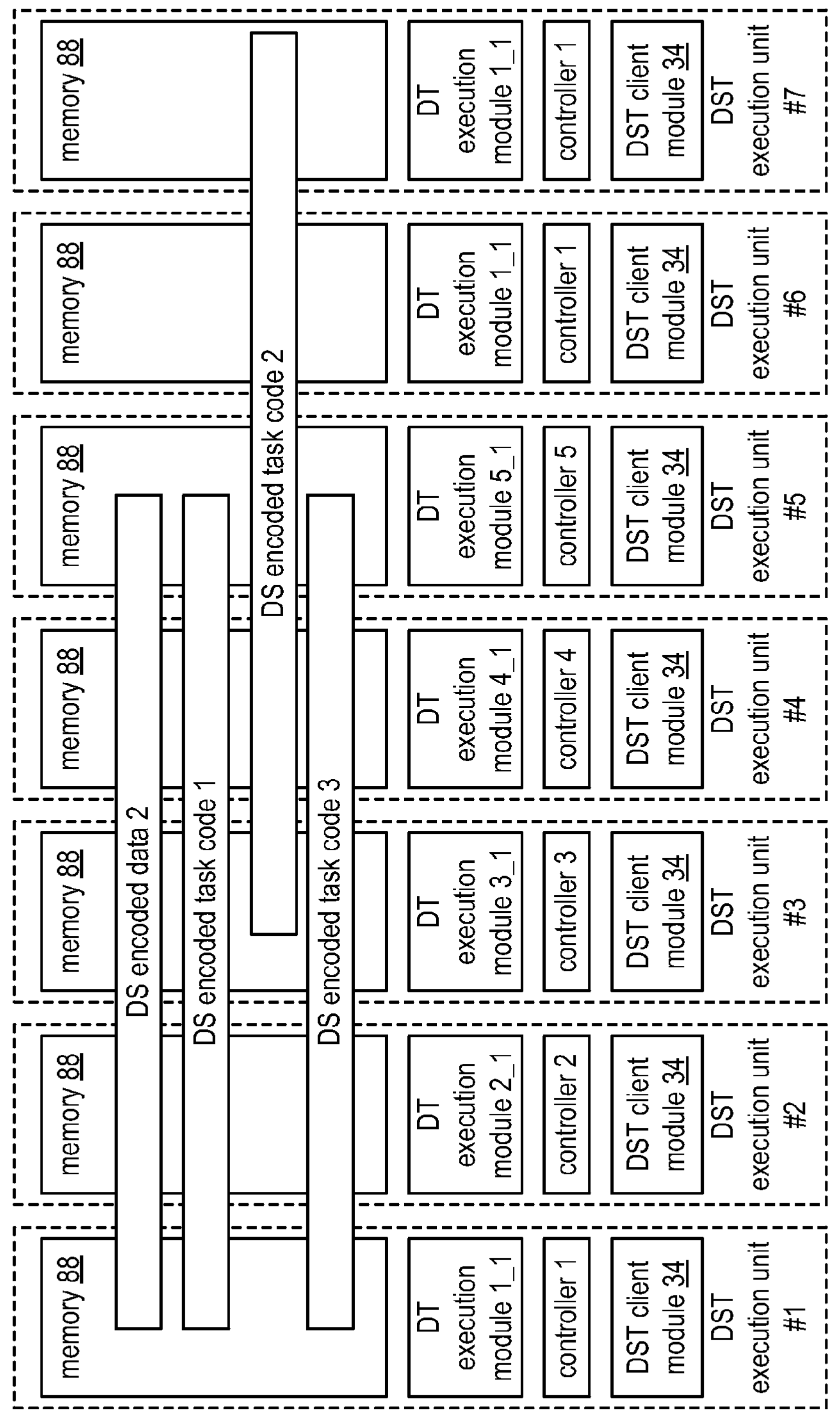
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through _z) and addressing information for each partition.

The task distribution module generates an entry in the task execution information section for each sub-task to be performed. For example, task 1_ (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1- 3_z to produce task 1-4 intermediate results (R1-4, which is the translated back data).

Task 1_5 (e.g., compare data and translated data to identify translation errors) is ordered after task 1_4 and is to be executed on task 1_4 's intermediate results (R 4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1- 1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1 ), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task _2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1–z in accordance with the DST allocation information or it may use the data partitions of task1$__{1}$ if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1$__{3}$ to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1- 3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
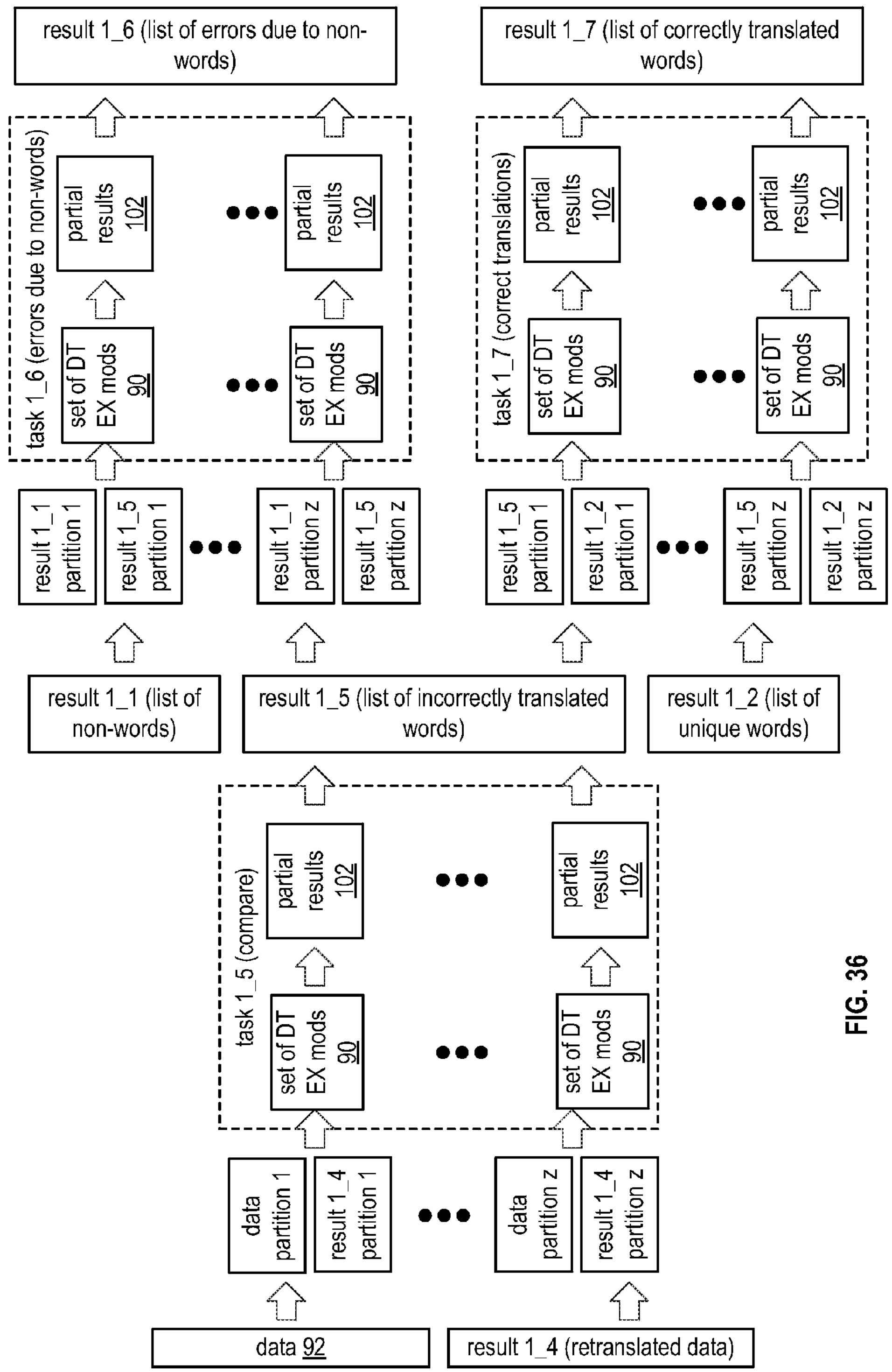

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, _1, 3_1, 4_1, and 5_1 ). For each pair of partitions, the allocated set of DT execution modules executes task 1_5 to produce partial results 102 (e.g., 1st through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1- 5 ), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5 ) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1 ). For each pair of partitions, the allocated set of DT execution modules executes task 1_6 to produce partial results 102 (e.g., 1st through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
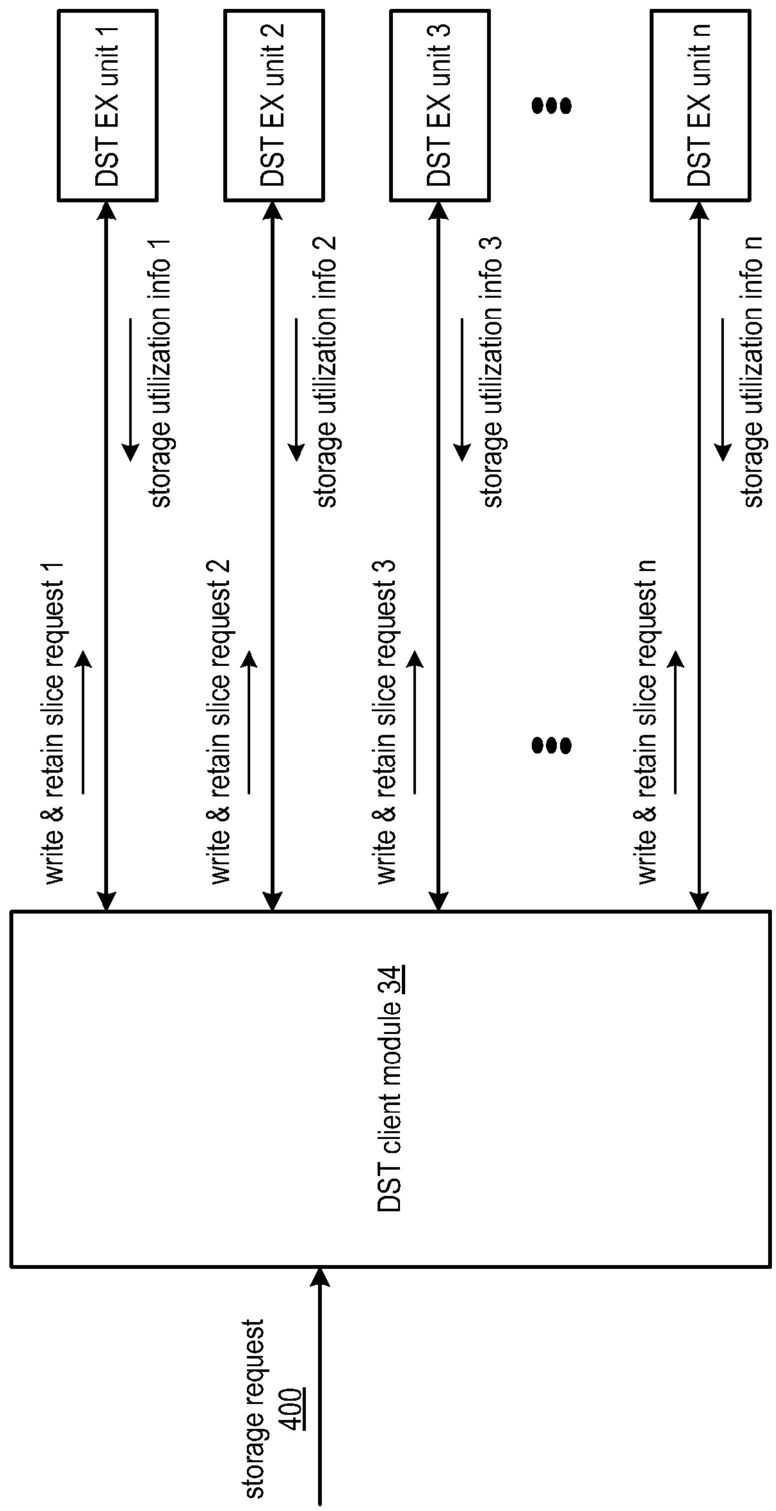
FIG. 40A is a schematic block diagram of an embodiment of a dispersed storage network in accordance with the present invention.

FIG. 40A is a schematic block diagram of an embodiment of a dispersed storage network that includes the distributed storage and task (DST) client module 34 of FIG. 1 and a set of DST execution units 1-n. Each DST execution unit may be implemented with the DST execution unit 36 of FIG. 1. Hereafter, each DST execution unit may be referred to interchangeably as a storage unit of a set of storage units.

In an embodiment, a dispersed storage and task (DST) processing unit 16 of FIG. 1 includes the DST client module 34, when operable within a computing device, causes the computing device to perform a series of steps. In an example of operation of the steps, the DST client module 34 receives a storage request 400 to store a low retention priority data object in the DSN (e.g., receives a write facilitating request). The storage request 400 may include one or more of the low retention priority data object, a retention priority level associated with the low retention priority data object, a data name, a requesting entity identifier, a data owner identifier, and a storage indicator. The low retention priority data object may include any data that requires temporary storage (e.g., scratchpad data). Having received the storage request 400, DST client module 34 sends a set of low retention priority write requests (e.g., write and retain slice requests 1-n) to storage units of the DSN. As a specific example, the DST client module 34 generates each low retention priority write request of the set of low retention priority write requests to include a low retention priority query. For instance, the DST client module 34 generates the low retention priority query to include queries regarding different levels of low retention priority data.

As another specific example of sending the set of low retention priority write requests, the DST client module 34 includes a set of encoded data slices within the set of low retention priority write requests when sending the set of low retention priority write requests, where a data segment of a low retention priority data object is dispersed storage error encoded to produce the set of encoded data slices.

For each storage unit of the storage units that receives a low retention priority write request of the set of low retention priority write requests, the storage unit determines a low retention priority response (e.g., storage utilization information) regarding availability for storing low retention priority data based on current storage of low priority data objects and available memory for storing the low retention priority data. As a specific example, each storage unit determines whether there is available memory for storing the low retention priority data. For instance, the storage unit determines total available memory within the storage unit, determines a level of storage of higher priority data objects, and determines whether there is available memory for storing the low retention priority data based on the total available memory and the level of storage of the higher priority data objects.

When there is not available memory for storing the low retention priority data, the storage unit compares retention priority of an encoded data slice of another low retention priority data object of the current storage of low priority data objects with a retention priority of an encoded data slice of the set of encoded data slices. When the retention priority of the encoded data slice of the set of encoded data slices compares favorably to the retention priority of the encoded data slice of the other low retention priority data object (e.g., priority of encoded data slice greater than priority of other low retention priority data object), the storage unit overwrites the encoded data slice of the other low retention priority data object with the encoded data slice of the set of encoded data slices and generates a write response to indicate storage of the encoded data slice.

Having determined the low retention priority response, the storage unit sends the low retention priority response to the DST client module 34 (e.g., the DST execution units issue storage utilization information 1-n). As a specific example, the storage unit sends the write response.

When a threshold number (e.g., a write threshold number) of favorable low retention priority responses have been received, the DST client module 34 facilitates storage of the low retention priority data object. As a specific example, the DST client module 34 sends a set of write commit requests to each storage unit sending the write response. As another specific example, when generating the low retention priority query to include the queries regarding the different levels of low retention priority data, for a given low retention priority level of the low retention priority data object to be stored, the DST client module 34 determines whether the threshold number of favorable low retention priority responses have been received. When the threshold number of favorable low retention priority responses have been received for the given low retention priority level, the DST client module 34 facilitates the storage of the low retention priority data object.

As yet another specific example of facilitating the storage of the low retention priority data object, the DST client module 34 sends, for storage, the set of encoded data slices to the storage units providing the favorable low retention priority response, where the data segment of the low retention priority data object is dispersed storage error encoded to produce the set of encoded data slices. For each storage unit receiving an encoded data slice of the set of encoded data slices, the storage unit determines whether there is low retention priority memory currently available.

When the low retention priority memory is not currently available, the storage unit compares retention priority of an encoded data slice of another low retention priority data object of the current storage of low priority data objects with a retention priority of an encoded data slice of the set of encoded data slices. When the retention priority of the encoded data slice of the set of encoded data slices compares favorably to the retention priority of the encoded data slice of the other low retention priority data object, the storage unit overwrites the encoded data slice of the other low retention priority data object with the encoded data slice of the set of encoded data slices and sends a write response.

The method described above in conjunction with a DST processing unit 16 can alternatively be performed by other modules of a dispersed storage network, of a distributed storage and task network or by other devices. In addition, at least one memory section that stores operational instructions that can, when executed by one or more processing modules of one or more computing devices of a dispersed storage network (DSN), cause the one or more computing devices to perform any or all of the method steps described above.

In another example of operation, the DST client module 34 receives storage utilization information 1-n from the set of DST execution units 1-n. The set of DST execution units 1-n issues the storage utilization information 1-n based on one or more of receiving a request, in accordance with a schedule, and when detecting a storage utilization change.

The storage utilization information includes one or more of a total amount of storage capacity, a total amount of storage capacity utilized, a total amount of remaining storage capacity, and storage utilization by retention priority level. The retention priority level indicates under which conditions an associated encoded data slice is to be retained or not retained by an associated DST execution unit storing the encoded data slice. The retention priority level includes any number of levels. For example, the associated encoded data slice is never to be deleted by the DST execution unit when the retention priority level indicates retain indefinitely. As another example, a first encoded data slice associated with a first retention priority level shall not be deleted before a second encoded data slice associated with a second retention priority level when the first retention priority level indicates a greater requirement for retention than the second priority level.

The DST client module 34 receives the storage request 400, where the data storage request 400 may further include one or more of a requested data retention priority level, data for storage, a data identifier, a data type indicator, a data size indicator, a data owner identifier (ID), a vault ID, and a storage request type (e.g., write, read). The DST client module 34 encodes the data of a write storage request using a dispersed storage error coding function into sets of encoded data slices. For each set of encoded data slices, the DST client module 34 determines an associated retention priority level for at least a write threshold number of encoded data slices of the set of encoded data slices. The determining may be based on one or more of the received requested data retention priority level, the data type indicator the data identifier, the data size indicator, the data owner ID, and the vault ID. As a specific example, the DST client module 34 determines the retention priority level to be indefinitely retain the write threshold number of encoded data slices when the requested data retention priority level includes indefinitely retain and the data owner ID is included in a high priority data owner list. As another specific example, the DST client module 34 determines the retention priority level to be a lowest retention level when the data ID matches a list of data IDs of redundantly stored data (e.g., other copies exist).

When at least a write threshold number of DST execution units report storage utilization information that indicates that each DST execution unit has sufficient available storage capacity for storage of encoded data slices of the write threshold number of encoded data slices, the DST client module generates a write threshold number of write and retrain slice requests of a set of write and retain slice requests 1-n. The DST client module 34 determines whether the DST execution unit has sufficient available storage capacity by comparing an available storage capacity utilization of the storage utilization information to a size of a corresponding encoded data slice. The write and retain request includes one or more corresponding encoded data slices (e.g., for one or more sets) and the determined retention priority level. The DST client module 34 sends the write threshold number of write and retain slice requests to a corresponding write threshold number of DST execution units of the set of DST execution units.

The DST execution unit receives a corresponding write and retain slice request. The DST execution unit determines whether sufficient available storage capacity exists to store each encoded data slice of the request. The sufficient available storage capacity includes one of sufficient available unused storage capacity or sufficient available reclaimable storage capacity (e.g., by deleting slices of a lower retention priority level). The DST execution unit indicates that the sufficient available unused storage capacity exists when an amount of unused storage capacity is greater than required storage capacity (e.g. based on size of received slices). The DST execution unit indicates that the sufficient available reclaimable storage capacity exists when the sufficient available unused storage capacity does not exist and an amount of the sufficient available reclaimable storage capacity associated with storage of slices of the lower retention priority level than the retention priority level is greater than the required storage capacity.

When the DST execution unit indicates the sufficient available reclaimable storage capacity, the DST execution unit selects the slices of the lower retention priority level than the retention priority level to produce selected slices for deletion. Next, the DST execution unit deletes the selected slices for deletion and stores each encoded data slice of the request. The DST execution unit indicates that sufficient available storage capacity is not available when the sufficient available unused storage capacity does not exist and the sufficient available reclaimable storage capacity does not exist. As a specific example, the DST execution unit indicates that sufficient available storage capacity is not available when the sufficient available unused storage capacity does not exist and all stored slices are associated with higher retention priority levels than the retention priority level of each encoded data slice of the request. When the sufficient available storage capacity is not available, the DST execution unit issues a rejection response to the DST client module 34.

Figure 40B:
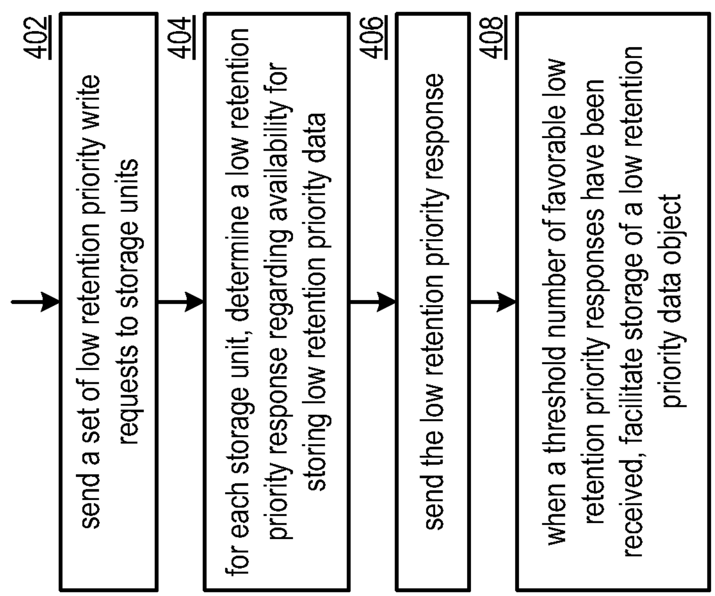
FIG. 40B is a flowchart illustrating an example of prioritizing data retention in accordance with the present invention.

FIG. 40B is a flowchart illustrating an example of prioritizing data retention. The method includes step 402 where a processing module (e.g., of one or more processing modules of a dispersed storage network (DSN)) sends a set of low retention priority write requests to storage units of the DSN. Each low retention priority write request of the set of low retention priority write requests includes a low retention priority query, where generating the low retention priority query may include queries regarding different levels of low retention priority data. Alternatively, the processing module includes a set of encoded data slices within the set of low retention priority write requests when sending the set of low retention priority write requests, where a data segment of a low retention priority data object is dispersed storage error encoded to produce the set of encoded data slices.

For each storage unit of the storage units that receives a low retention priority write request of the set of low retention priority write requests, the method continues at step 404 where the storage unit determines a low retention priority response regarding availability for storing low retention priority data based on current storage of low priority data objects and available memory for storing the low retention priority data. As a specific example, the processing module determines whether there is available memory for storing the low retention priority data. For instance, the processing module determines total available memory within the storage unit, determines a level of storage of higher priority data objects, and determines whether there is available memory for storing the low retention priority data based on the total available memory and the level of storage the higher priority data objects.

When there is not available memory for storing the low retention priority data, the processing module compares retention priority of an encoded data slice of another low retention priority data object of the current storage of low priority data objects with a retention priority of an encoded data slice of the set of encoded data slices. When the retention priority of the encoded data slice of the set of encoded data slices compares favorably to the retention priority of the encoded data slice of the other low retention priority data object, the processing module overwrites the encoded data slice of the other low retention priority data object with the encoded data slice of the set of encoded data slices and generates a write response.

The method continues at step 406 where the processing module sends the low retention priority response. As a specific example, the processing module sends the write response. When a threshold number (e.g., a write threshold number) of favorable low retention priority responses have been received, the method continues at step 408 where the processing module facilitates storage of a low retention priority data object. As a specific example, the processing module sends a set of write commit requests to each storage unit sending the write response.

As another specific example, when generating the low retention priority query to include queries regarding different levels of low retention priority data, for a given low retention priority level of the low retention priority data object to be stored, the processing module determines whether the threshold number of favorable low retention priority responses have been received. When the threshold number of favorable low retention priority responses have been received for the given low retention priority level, the processing module facilitates the storage of the low retention priority data object.

As yet another example of the facilitating of the storage of the low retention priority data object, the processing module sends, for storage, a set of encoded data slices to the storage units providing the favorable low retention priority response, where the data segment of the low retention priority data object is dispersed storage error encoded to produce the set of encoded data slices. For each storage unit receiving an encoded data slice of the set of encoded data slices, the processing module determines whether there is low retention priority memory currently available.

When the low retention priority memory is not currently available, the processing module compares retention priority of an encoded data slice of another low retention priority data object of the current storage of low priority data objects with a retention priority of an encoded data slice of the set of encoded data slices. When the retention priority of the encoded data slice of the set of encoded data slices compares favorably to the retention priority of the encoded data slice of the other low retention priority data object, the processing module overwrites the encoded data slice of the other low retention priority data object with the encoded data slice of the set of encoded data slices and sends a write response.

Figure 41A:
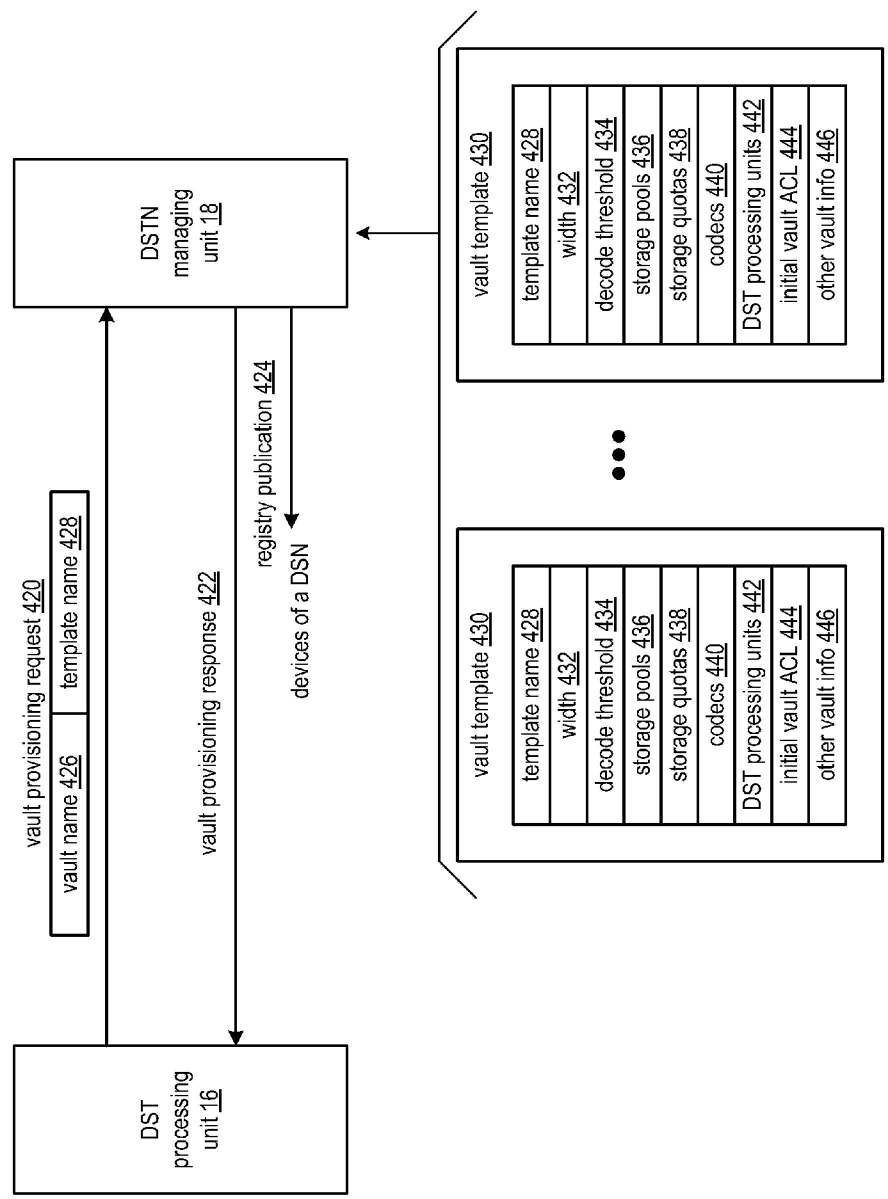
FIG. 41A is a schematic block diagram of another embodiment of a dispersed storage network in accordance with the present invention.

FIG. 41A is a schematic block diagram of another embodiment of a dispersed storage network (DSN) that includes the distributed storage and task (DST) processing unit 16 of FIG. 1 and the distributed storage and task network (DSTN) managing unit 18 of FIG. 1. The DSN functions to provision a vault. In an example of operation, the DSTN managing unit 18 generates a plurality of vault templates 430 based on one or more of a manager input, a previous vault, DSN network configuration information, DSN capabilities, a vault list, and an expected vault list. As a specific example, the DSTN managing unit 18 updates a previous vault template based on the DSN network configuration information to produce a first vault template.

Each vault template 430 includes a plurality of fields, where each field includes one or more entries. The plurality of fields includes a template name field 428 that includes a name entry for the template, a width field 432 that includes a width entry (e.g., dispersed storage pillar width parameter), a decode threshold field 434 that includes a decode threshold entry (e.g., dispersed storage decode threshold parameter), a storage pools field 436 that includes entries of identifiers of storage units of one or more storage pools, a storage quotas field 438 that includes entries of storage quota maximums associated with one or more users of the vault, a codecs field 440 that includes one or more entries of codecs utilized in dispersed storage error coding (e.g., a compression algorithm identifier, a encoding algorithm identifier, a integrity check algorithm identifier, etc.), a DST processing units field 442 that includes entries of identifiers of one or more DST processing units, and initial vault access control list (ACL) field 444 that includes one or more entries of access control information (e.g., permissions), and another vault information field 446 that includes one or more other vault information entries (e.g., any other common vault information required to support operation of the vault).

The operational example continues where the DSTN managing unit 18 receives a vault provisioning request 420 from a device (e.g., the DST processing unit 16) of the DSN, where the request 420 includes a vault name 426 (e.g., a new vault name) and a template name 428. The DSTN managing unit 18 verifies that the device is authorized to request provisioning of a vault (e.g., verifying with an access control list). When verified, the DSTN managing unit 18 obtains a vault template 430 that corresponds to the template name 428 of the vault provisioning request 420 (e.g., match template name entry of the vault template to the template name received in the vault provisioning request).

The DSTN managing unit 18 generates a new vault using the vault template by signing the vault name 426 of the vault provisioning request 420 and updating an access control list field 444 in accordance with the initial vault access control list and identifier of the device. As a specific example, the DSTN managing unit 18 enables the DST processing unit 16 to fully utilize and modify the vault as indicated in the ACL of the vault. The DSTN managing unit 18 activates the new vault. As a specific example, the DSTN managing unit 18 stores the new vault in a registry and publishes the registry to devices of the DSN as a registry publication 424. The DSTN managing unit 18 issues a vault provisioning response 422 to the device, where the response includes an indicator that the new vault of the vault name has been activated.

Figure 41B:
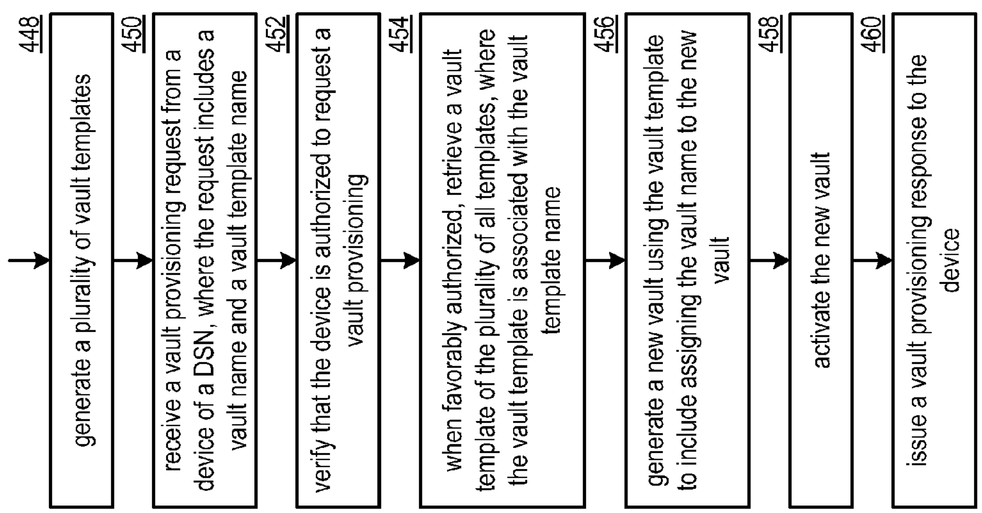
FIG. 41B is a flowchart illustrating an example of activating a new dispersed storage network vault in accordance with the present invention.

FIG. 41B is a flowchart illustrating an example of activating a new dispersed storage network vault. The method continues at step 448 where a processing module (e.g., of a distributed storage and task network (DSTN) managing unit) generates a plurality of vault templates. The method continues at step 450 where the processing module receives a vault provisioning request from a device of a dispersed storage network (DSN), where the vault provisioning request includes a vault name and a vault template name. The method continues at step 452 where the processing module verifies that the device is authorized to request a vault provisioning. As a specific example, the processing module accesses a current access control list of current registry information to determine whether the device has been assigned rights to request the vault provisioning.

When favorably authorized, the method continues at step 454 where the processing module retrieves a vault template of the plurality of all templates, where the vault template is associated with the vault template name. The method continues at step 456 where the processing module generates a new vault using the vault template to include assigning the vault name to the new vault. The generating further includes updating an access control list field of the new vault in accordance with the initial vault access control list and an identifier of the device. The method continues at step 458 where the processing module activates the new vault. The method continues at step 460 where the processing module issues a vault provisioning response to the device, where the response includes one or more of the vault name, an indicator that the new vault has been activated, and a plurality of entries of the new vault.

Figure 42A:
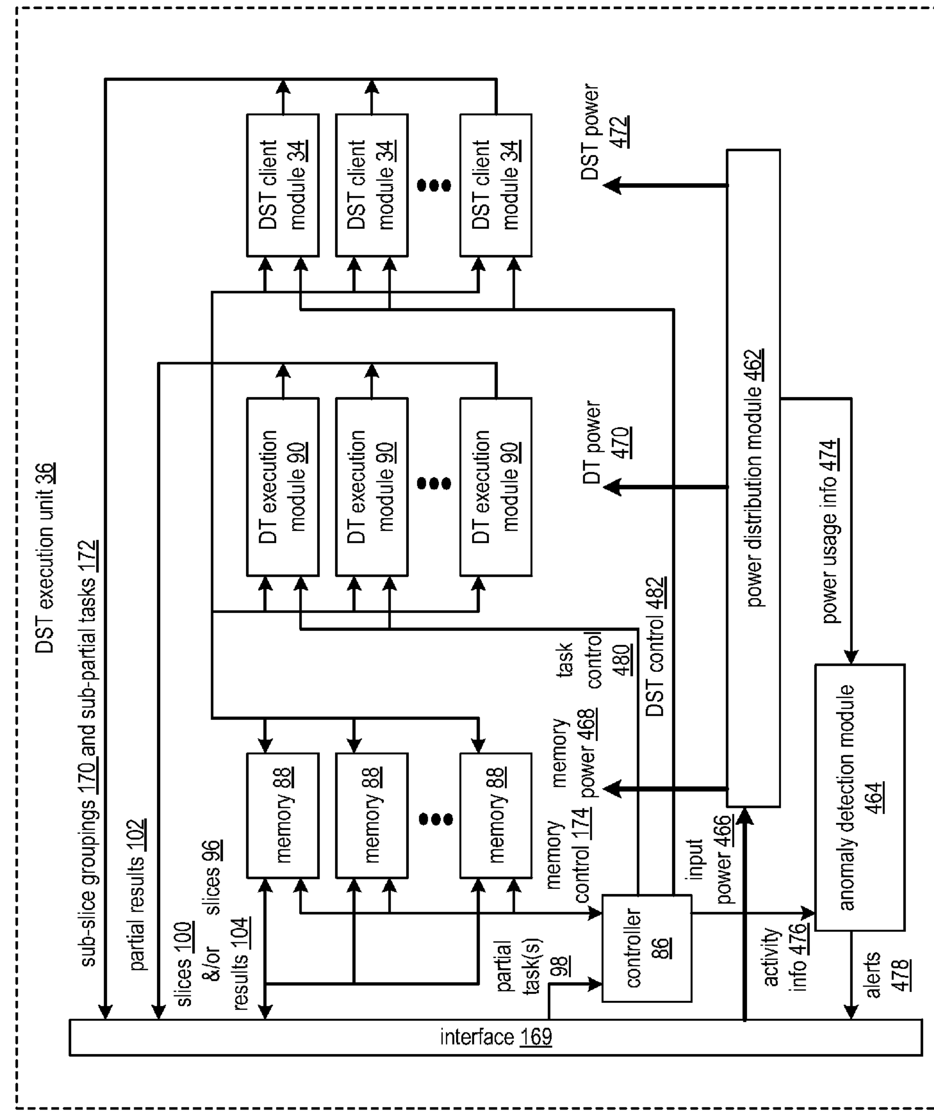
FIG. 42A is a schematic block diagram of another embodiment of a distributed storage and task execution unit in accordance with the present invention.

FIG. 42A is a schematic block diagram of another embodiment of a distributed storage and task (DST) execution unit 36 of FIG. 11. The DST execution unit 36 includes a variety of devices including the interface 169, a plurality of memories 88, the controller 86, a plurality of distributed task (DT) execution modules 90, and a plurality of DST client modules 34 of FIG. 11. The DST execution unit 36 further includes a power distribution module 462 and an anomaly detection module 464. The DST execution unit 36 functions to detect an anomaly associated with operation and control of the variety of devices as the variety of devices process partial task requests 98 to provide one or more of results 104, partial results 102, sub-slice groupings 170, and sub-partial task 172; store slices 96; and recover slices 100. The controller 86 controls the variety of devices. For example, the controller 86 issues a memory control 174 to control the plurality of memories 88. As another example, the controller 86 issues a task control 480 to control the plurality of DT execution modules 90. As yet another example, the controller 86 issues a DST control 482 to control the plurality of DST client modules 34.

The controller 86 monitors the operation of the variety devices and generates activity information 476 which includes, for each device of the DST execution unit 36, an identifier of the device, and an activity indicator by time. The activity information 476 further includes activity of the DST execution unit 36 (e.g., processing a partial task 98, storing a slice 96, retrieving a slice 100, etc.). As a specific example, the controller 86 indicates that a first memory 88 performs a series of write operations in response to a slice access request received by the DST execution unit 36 during a first timeframe and the first memory 88 is idle during a second timeframe. As another specific example, the controller 86 indicates that a first DT execution module 90 processed a partial task in response to a partial task execution request 98 during the first timeframe and was idle during the second timeframe. As yet another specific example, the controller 86 indicates that a second DST client module 34 and a third DST client module 34 where both idle during the first and second timeframes.

The power distribution module 462 receives input power 466, via the interface 169, and provides power to devices of the DST execution unit 36 . As a specific example, the power distribution module 462 provides memory power 468 to the plurality of memories 88, DT power 470 to the plurality of DT execution modules 90, and DST power 472 to the plurality of DST client modules 34. The power distribution module 462 determines power utilization (e.g., over time as associated with a representation of time) of each device of each of the pluralities of memories 88, DT execution modules 90, and the DST client modules 34. As a specific example, the power distribution module 462 determines power utilization of the first memory 88 to be 100 milliamps (mA) during the first timeframe and 25 mA during the second timeframe. As another specific example, the power distribution module 462 determines power utilization of the first DT execution module 90 of 75 mA during the first timeframe and 10 mA during the second timeframe. As yet another specific example, the power distribution module 462 determines power utilization of the second DST client module 34 of 110 mA during the first and second timeframes and power utilization of the third DST client module 34 of 5 mA during the first and second timeframes.

The power distribution module 462 generates power usage information 474 based on the determined power utilization. The power usage information 474 includes, for each device of the DST execution unit 36 , an identifier of the device, and a power utilization level of the device by time. The power distribution module 462 sends the power usage information to the anomaly detection module 464.

In an example of detecting the anomaly, the anomaly detection module 464 receives the activity information 476 and the power usage information 474. The anomaly detection module 464 stores the activity information 476 and the power usage information 474 to include common time references. The anomaly detection module 464 analyzes the activity information 476 and the power usage information 474 by common time frames of the common time references to produce trend information. The anomaly detection module 464 stores the trend information, which includes a correlation of the activity information 476 and the power usage information 474 over time. For example, the trend information indicates that the first memory device 88 utilizes 100 mA to perform the series of write operations during the first timeframe and utilizes 25 mA when idle during the second timeframe. As another example, the trend information indicates that the first DT execution module 90 utilizes 75 mA to process a partial task in the first timeframe and utilizes 10 mA when idle during the second timeframe. As yet another example, the trend information indicates that the second DST client module 34 utilizes 110 mA when idle and the third DST client module 34 utilizes 5 mA when idle.

The anomaly detection module 464 detects the anomaly based on the trend information to include comparing recent trend information to historical long-term trend information. In particular, the anomaly may be detected based on an indication that too much power or too little power is being utilized for a current activity of the activity information. As a specific example, the anomaly detection module detects the anomaly as the second DST client module utilizing more power (e.g., more than a power threshold level amount) than the third DST client module 34 when both are idle. When detecting the anomaly, the anomaly detection module issues one or more alerts 478 based on the anomaly. For example, the anomaly detection module 464 issues, via the interface 169, an alert 478 that indicates that the third DST client module 34 is utilizing too much power. As another example, the anomaly detection module 464 issues another alert 478 that indicates that a tenth DT execution module 90 is utilizing too little power when the tenth DT execution module 90 utilizes less power (e.g., by more than another power threshold level amount) than other DT execution modules 90 for a similar activity.

Figure 42B:
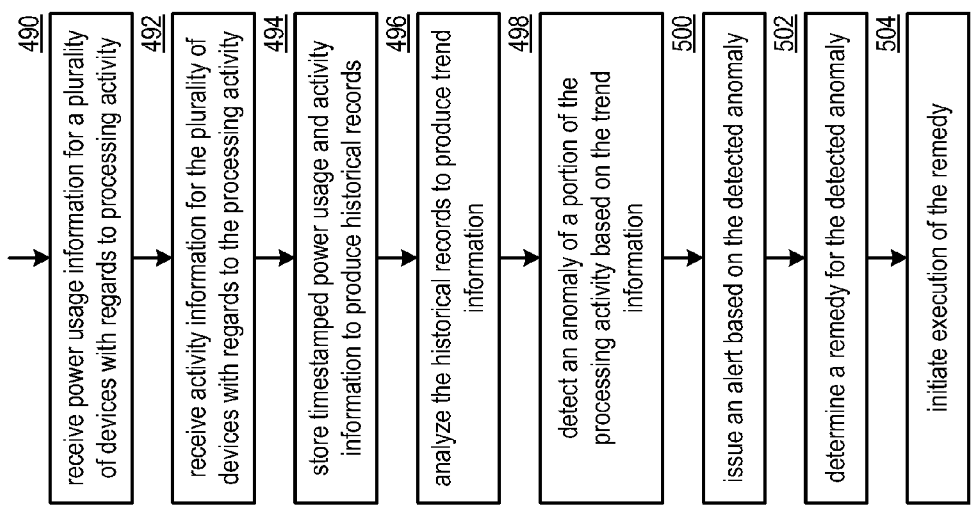
FIG. 42B is a flowchart illustrating an example of detecting a processing activity anomaly in accordance with the present invention.

FIG. 42B is a flowchart illustrating an example of detecting a processing activity anomaly. The method continues at step 490 where a processing module (e.g., of an anomaly detection module associated with a distributed storage and task (DST) execution unit) receives power usage information for a plurality of devices with regards to processing activity. The receiving includes one or more of issuing a query, receiving a query response, and receiving an error message. The method continues at step 492 where the processing module receives activity information for the plurality of devices with regards to the processing activity. The receiving includes one or more of issuing a query, receiving a query response, and receiving an error message. The method continues at step 494 where the processing module stores time stamped power usage and activity information to produce a historical record. As a specific example, the processing module obtains a current timestamp and generates the historical record to include the current timestamp and at least some of the power usage and activity information.

The method continues at step 496 where the processing module analyzes historical records to produce trend information. As a specific example, the processing module correlates activity with power usage to produce the trend information (e.g., by types of activities and by power usage by device). The method continues at step 498 where the processing module detects an anomaly of a portion of the processing activity based on the trend information. For example, the processing module, for a current activity, analyzes current power usage for one or more devices and identifies at least one device associated with power usage by activity that compares unfavorably to the trend information (e.g., power consumption too high, power consumption too low).

The method continues at step 500 where the processing module issues an alert based on the detected anomaly. The issuing includes generating the alert to include one or more of a device identifier of the at least one device, a current power usage level of the device, a current activity of the device, and an expected current power usage based on the trend information. The method continues at step 502 where the processing module determines a remedy for the detected anomaly. The determining includes one or more of identifying another device of the plurality devices to perform a task of the at least one device (e.g., selecting another device of the DST execution unit) and identifying another plurality devices where at least one device of the other plurality of devices can perform the task of the at least one device (e.g., selecting another DST execution unit). The method continues at step 504 where the processing module initiates execution of the remedy. As a specific example, the processing module extracts task processing information from the at least one device, sends the task processing information to the identified other device, and instructs the at least one device to cease processing of the task.

Figure 43A:
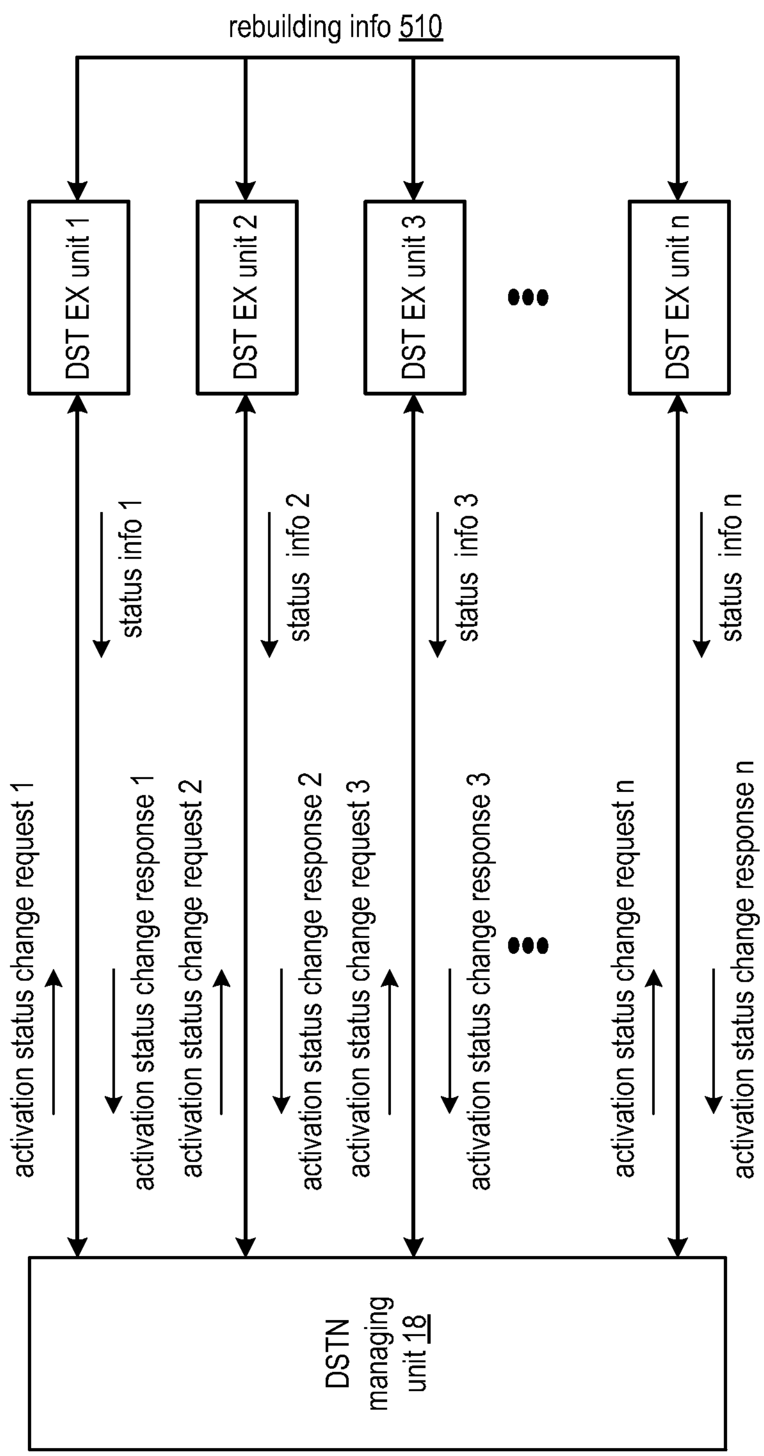
FIG. 43A is a schematic block diagram of another embodiment of a dispersed storage network in accordance with the present invention.

FIG. 43A is a schematic block diagram of another embodiment of a dispersed storage network (DSN) that includes the distributed storage and task network (DSTN) managing unit 18 of FIG. 1 and a set of DST execution units 1-n. Each DST execution unit may be implemented utilizing the DST execution unit 36 of FIG. 1. In an example of operation, the DSTN managing unit 18 obtains status information from the set of DST execution units 1-n as status information 1-n. The status information includes one or more of an availability indicator, an active indicator, a required for a rebuilding indicator, a requiring rebuilding indicator, identifiers of DST execution units required for rebuilding, the number of pending data access requests, a number of pending processing requests, and power utilization level information. The obtaining includes at least one of issuing a query, receiving a query response, receiving an error message, receiving an activation chain status response, and accessing a historical record.

The DSTN managing unit 18 selects a DST execution unit associated with an inactive status for reactivation in accordance with a rotation scheme and based on the status information, where a number of remaining DST execution units of the set of DST execution units is greater than or equal to a decode threshold number. The rotation scheme includes at least one of a round-robin scheme, an equal amount of downtime, and an equal amount of downtime. The selecting may be based on one or more of a power utilization level, a desired power utilization level, a number of desired active units, a desired reliability level, a desired availability level, and DST execution unit capabilities.

With the DST execution unit for reactivation selected, the DSTN managing unit 18 issues an activation status change request to the selected DST execution unit. The activation status change request includes one or more of a DST execution unit ID, a requested status (e.g., not active, active), and a status transition approach (e.g., immediately, at a scheduled future timeframe, when no current or pending data access request exists, when no current or pending rebuilding activity exists). As a specific example, the activation status change request includes a request to reactivate and a transition approach for immediate transition (e.g., alternatively for a scheduled transition in accordance with at least one of a transition schedule and a request).

The DSTN managing unit 18 receives a favorable activation status change response from the selected DST execution unit for reactivation. The activation status change response includes one or more of the DST execution unit identifier, the requested status, the actual status, a number of current or pending data access request, a number of current or pending rebuilding task, and an estimated time to status transition when not immediate. As a specific example, the activation status change response includes an indicator that the DST execution unit is now active.

With the DST execution units selected for reactivation now active, the DSTN managing unit 18 selects another DST execution unit associated with an active status for deactivation in accordance with the rotation scheme and based on the status information, where a number of remaining DST execution units of the set of DST execution units is greater than or equal to a decode threshold number. The selecting may be based on one or more of a power utilization level, a desired power utilization level, a number of desired active units, a desired reliability level, a desired availability level, DST execution unit capabilities, and identifying a DST execution unit associated with a number of pending tasks that is less than a low pending tasks threshold level (e.g., few or no pending partial task processing tasks, few or no pending data access tasks).

With the other DST execution units selected for deactivation, the DSTN managing unit 18 determines a transition approach for the other DST execution unit based on the status information (e.g., immediately, scheduled, after pending tasks are executed). As a specific example, the DSTN managing unit 18 determines the transition approach to be the immediate approach when a priority of estimated power savings is greater than all other priorities. As another specific example, the DSTN managing unit 18 determines the transition approach to be after the pending tasks are executed when the pending tasks include critical rebuilding tasks and the critical rebuilding tasks are associated with a priority that is greater than all other priorities. With the transition approach determined, the DSTN managing unit 18 issues and activation status change request to the other DST execution unit, where the activation status change request includes the transition approach and a request to deactivate. The method to change activation status is discussed in greater detail with reference to FIG. 43B.

From time to time, one or more of the DST execution units rebuilds encoded data slices associated with slice errors. The rebuilding includes scanning for errors and remedying the errors. The DST execution units share rebuilding information 510. The rebuilding information 510 includes one or more of a list slice request, a list of slice response, a read slice request, a read slice response, a partial slice request, and the partial slice response. The scanning for errors includes a DST execution unit associated with an active status issuing list slice requests other act of DST execution units and receiving list slice responses for comparison to identify slice errors. The remedying includes an active DST execution unit obtaining at least a decode threshold number of representations of encoded data slices of a set of encoded data slices where at least one encoded data slice is associated with a slice error. The obtaining includes issuing one or more of read slice requests and read partial slice requests to active DST execution units and receiving one or more of read slice responses and read partial slice responses. The obtaining further includes waiting for required DST execution units to become active prior to sending of the one or more of the read slice requests and the read partial slice requests. The method of rebuilding is discussed in greater detail with reference to FIG. 44.

Figure 43B:
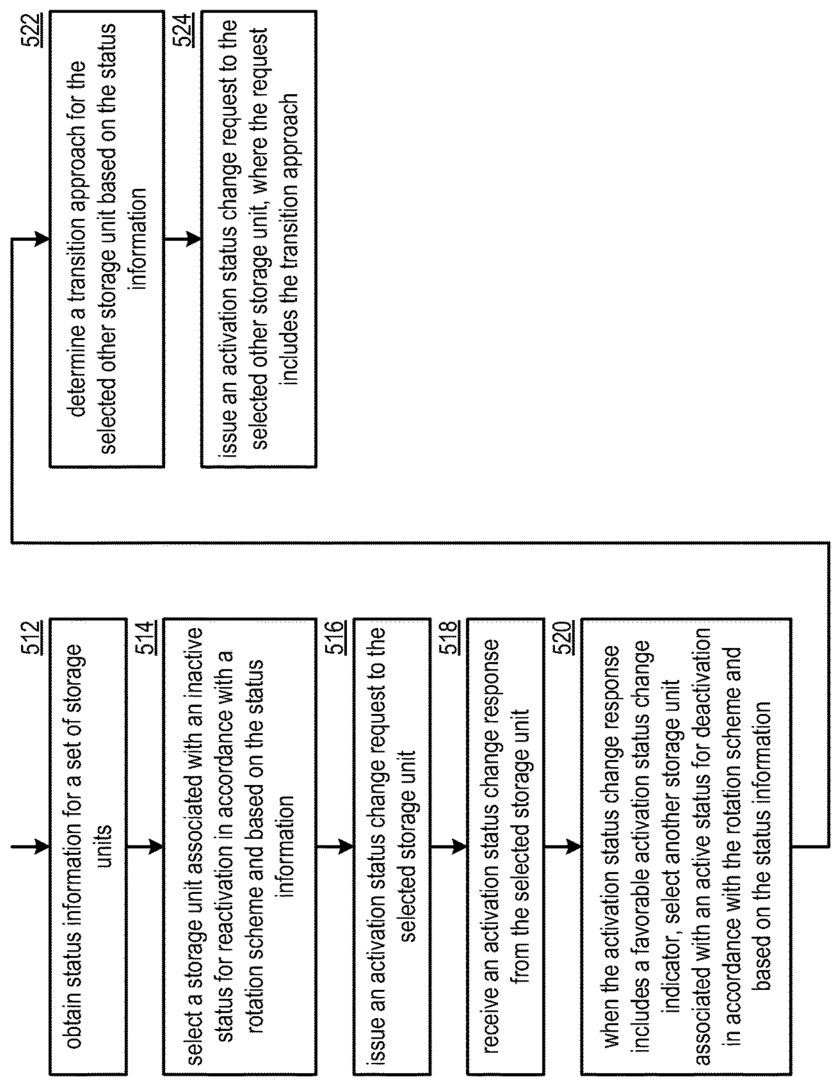
FIG. 43B is a flowchart illustrating an example of selecting active storage units in accordance with the present invention.

FIG. 43B is a flowchart illustrating an example of selecting active storage units. The method continues at step 512 where a processing module (e.g., of a distributed storage and task network (DSTN) managing unit) obtains status information for a set of storage units. The method continues at step 514 where the processing module selects a storage unit associated with an inactive status for reactivation in accordance with a rotation scheme and based on the status information. As a specific example, the processing module selects a next storage unit of a storage unit rotation list, where the storage unit is associated with an available and inactive status. The method continues at step 516 where the processing module issues and activation status change request to the selected storage unit to reactivate the storage unit. The method continues at step 518 where the processing module receives an activation status change response from the selected storage unit indicating that the storage unit has been reactivated.

When the activation status change response includes a favorable activation status change indicator (e.g., indicating that the selected storage unit has been reactivated), the method continues at step 520 where the processing module selects another storage unit associated with an active status for deactivation in accordance with the rotation scheme and based on the status information. As a specific example, the processing module selects the other storage unit where the other storage unit is associated with no pending storage or rebuilding tasks. The method continues at step 522 where the processing module determines a transition approach for the selected other storage unit based on the status information. As a specific example, the processing module determines the transition approach to include transitioning after pending tasks have been processed when the status information indicates that the other storage unit is associated with pending rebuilding or data access tasks. The method continues at step 524 where the processing module issues and activation status change request to the selected other storage unit, where the request includes the transition approach and an indicator to deactivate the selected other storage unit.

FIG. 44 is a flowchart illustrating an example of enabling slice rebuilding, which includes similar steps to FIG. 43B. The method continues with steps 512-516 of FIG. 43B where a processing module (e.g., of a distributed storage and task network (DSTN) managing unit) obtains status information for a set of storage units, selects a storage unit associated with an inactive status for reactivation in accordance with a rotation scheme and based on the status information, and issues an activation status change request to the selected storage unit.

The method continues at step 526 where the processing module receives an activation status change response from the selected storage unit that indicates detected slice errors and required candidate in active storage units to facilitate rebuilding encoded data slices associated with the detected slice errors. As a specific example, the selected storage unit scans for the slice errors and issues the activation status change response after determining that a decode threshold number of other storage units are not available to facilitate rebuilding.

The method continues at step 528 where the processing module selects one or more other storage units associated with an inactive status for reactivation based on the required candidate in active storage units and in accordance with a rotation scheme. As a specific example, the processing module selects a storage unit that is scheduled for reactivation soon in accordance with the rotation scheme that is included in the required candidate in active storage units. The method continues at step 530 where the processing module issues and activation status change request to the one or more other storage units requesting reactivation.

The method continues with step 518 of FIG. 43B where the processing module receives an activation status change response from the selected storage unit (e.g., after rebuilding). The method continues at step 532 where the processing module obtains updated status information for the set of storage units. When the activation status change response includes an indication that rebuilding has been completed, the method continues at step 534 where the processing module selects at least one of the one or more other storage units for deactivation in accordance with the rotation scheme and the updated status information. As a specific example, the processing module selects the other storage unit where the other storage unit is associated with no pending rebuilding tasks for the selected storage unit.

The method continues at step 536 where the processing module determines a transition approach for the selected at least one storage unit based on the updated status information. As a specific example, the processing module indicates the transition approach to be immediately since rebuilding has been completed for the selected storage unit. As another specific example, the processing module indicates the transition approach to be after processing of the rebuilding tasks associated with other storage units. The method continues at step 538 where the processing module issues an activation status change request of the at least one storage unit, where the request includes the transition approach.

Figure 45A:
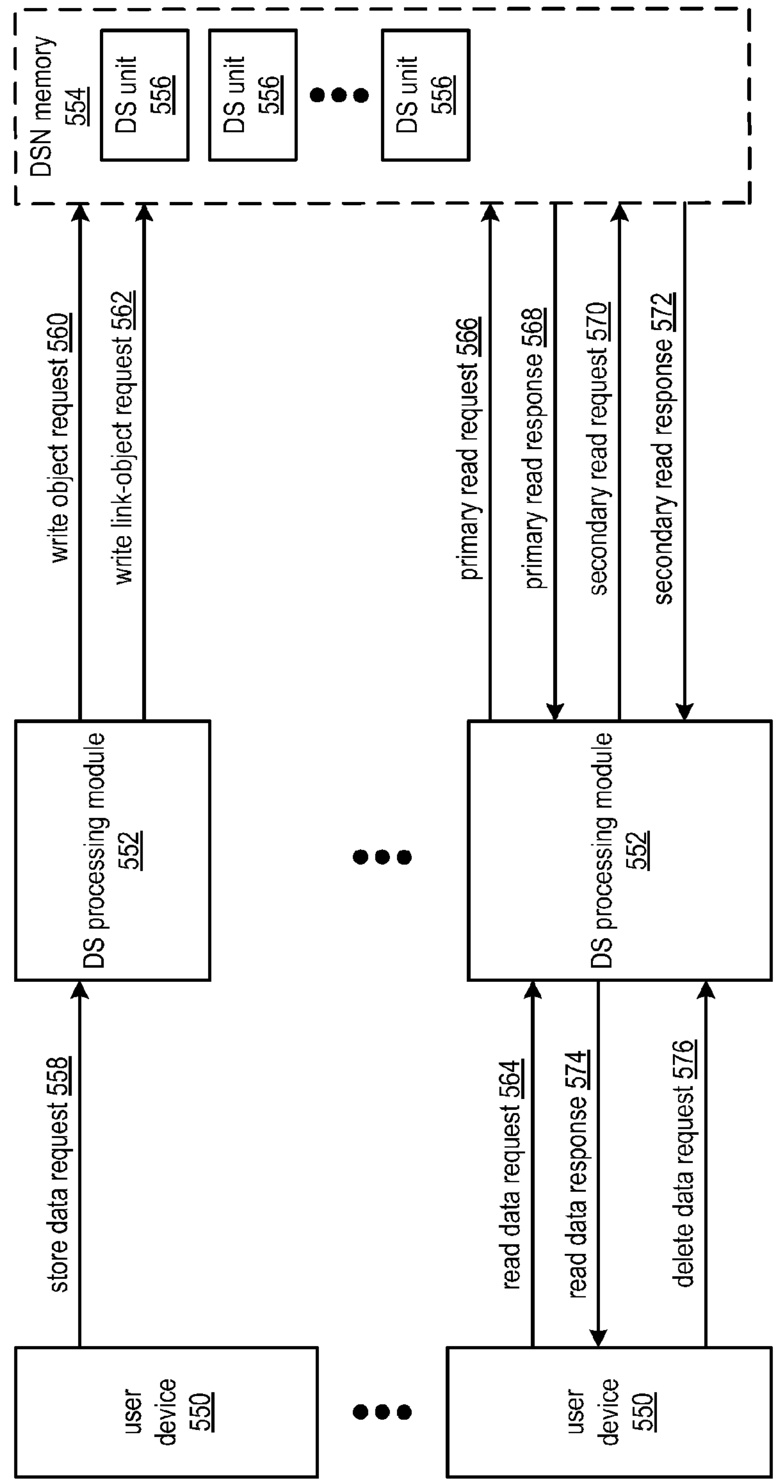
FIG. 45A is a schematic block diagram of another embodiment of a dispersed storage network in accordance with the present invention.

FIG. 45A is a schematic block diagram of another embodiment of a dispersed storage network (DSN) that includes a plurality of user devices 550, a plurality of dispersed storage (DS) processing modules 552, and a DSN memory 554. The DSN memory 554 includes a plurality of DS units 556. The DS units 556 may be organized into one or more sets of DS units. Each DS unit 556 may be implemented utilizing the distributed storage and task (DST) execution unit 36 of FIG. 1. Each DS processing module 552 may be implemented utilizing the DST processing unit 16 of FIG. 1 each user device 550 may be implemented utilizing one or more of the user device 14 and the user device 12 of FIG. 1.

The system functions to access a data object in the DSN memory 554 in accordance with a data de-duplication approach. The accessing includes storing, retrieving, and deleting. In an embodiment, the DS processing module 552, when operable within a computing device, causes the computing device to perform a series of steps. In an example of operation of the steps, when the accessing of the data object includes storing the data object, the user device 550 issues a store data request 558 to a DS processing module 552 to store the data object in the DSN memory 554, where the store data request 558 includes one or more of a data object, data identifier (ID) of a plurality of data IDs associated with the data object, and a data tag (e.g., a result of performing a deterministic function on at least a portion of the data object). For example, a subsequent store data request from another user device 550 of the plurality of user devices may also include the data object (e.g., identical to the data object from the user device) and another data ID associated with the data object.

Having received the store data request 558, the DS processing module 552 generates a source name (e.g., a DSN address) for the received data object based on one or more of the data ID, a vault ID, and a requesting entity ID. Having generated the source name, the DS processing module 552 determines whether the data object has already been stored in the DSN memory 554. The determining includes one or more of generating a data tag for the received data object, comparing the generated data tag to a list of data tags associated with data objects stored in the DSN memory 554, comparing the received data tag to the list of data tags, and comparing the received data object to data objects stored in the DSN memory 554.

When the data is not already stored in the DSN memory 554, the DS processing module 552 issues a write object request 560 to the DSN memory 554 using the source name to store the received data object in the DSN memory 554. The issuing of the write object request 560 includes encoding the data object using a dispersed storage error coding function to produce a plurality of sets of encoded data slices, generating a plurality of sets of slice names using the source name, generating one or more sets of write slice requests that includes the plurality of sets of encoded data slices and the plurality of sets of slice names, and outputting the one or more sets of write slice requests as the write object request 560 to a set of DS units 556 of the DSN memory 554. In addition, the DS processing module 552 may store the data tag and one or more of the data ID, the source name, the vault ID, and the requesting entity ID in one or more of the list of data tags, a hierarchical dispersed index, and a directory.

When the data object is already stored in the DSN memory 554, the DS processing module 552 obtains location information of a previously stored data object that compares favorably to the received data object and issues a write link-object request 562 to the DSN memory 554 that includes the location information. The location information includes at least one of a DSN address corresponding to the previously stored data object, a source name of the previously stored data object, and a plurality of sets of slice names corresponding to the previously stored data object. The issuing of the link-object request 562 includes encoding the link-object using the dispersed storage error coding function to produce a set of encoded link-object slices, generating a set of slice names using the source name, generating a set of write slice requests that includes the encoded link-object slices and the set of slice names, and outputting the set of write slice requests to the set of DS units 556 of the DSN memory 554. In addition, the DS processing module 552 may store the data tag and one or more of the data ID, the source name, the vault ID, and the requesting entity ID in one or more of the list of data tags, the hierarchical dispersed index, and the directory.

In accordance with the data de-duplication approach, when the accessing of the data object includes retrieving the data object, another user device 550 (e.g., any user device of the plurality of user devices) issues a read data request 564 to the DS processing module 552 to retrieve the data object stored in the DSN memory 554, where the read data request 564 includes another data ID associated with the data object. The DS processing module 552 retrieves another source name associated with the data object based on the other data ID. The regenerating includes retrieving the other source name from at least one of the hierarchical dispersed index, the directory, and the list of data tags. The DS processing module 552 issues a primary read request 566 to the DSN memory 554 using the other source name (e.g., generate a set of slice names using the other source name, generate a set of read slice requests that includes the set of slice names, output the set of read slice requests to the DSN memory as the primary read request 566). The DS processing module 552 receives a primary read response 568 from the DSN memory 554 (e.g., receiving at least a decode threshold number of slices, decoding the at least a decode threshold number of slices to produce a recovered object).

The DS processing module 552 determines whether the recovered object of the primary read response 568 includes a first data segment of the data object or of the link-object. The determining includes identifying a format of the recovered object (e.g., indicate data object when the recovered object includes data, indicate link-object when the object includes the location information. When the primary read response 568 includes the link-object, the DS processing module 552 issues a secondary read request 570 to the DSN memory 554 to retrieve the data object. The issuing includes generating a plurality of sets of slice names based on the source name of the previously stored data object, generating one or more sets of read slice requests that includes the plurality of sets of slice names, outputting the one or more sets of read slice requests as the secondary read request 570 to the set of DS units 556 of the DSN memory 554, receiving a secondary read response 572 that includes, for each data segment of a plurality of data segments of the data object, at least a decode threshold number of encoded data slices, for each data segment, decoding the at least a decode threshold number of encoded data slices to reproduced the data segment, and aggregating a plurality of reproduce data segments to reproduce the data object.

When the primary read response includes the first data segment of the data object, the DS processing module 552 issues the secondary read request 570 to the DSN memory 554 to retrieve subsequent data segments of the plurality of data segments of the data object. The issuing includes generating a remaining plurality of sets of slice names based on the source name of the previously stored data object, generating one or more sets of read slice requests that includes the remaining plurality of sets of slice names, outputting the one or more sets of read slice requests as the secondary read request 570 to the set of DS units 556 of the DSN memory 554, receiving a secondary read response 572 that includes, for each remaining data segment of the plurality of data segments of the data object, at least a decode threshold number of encoded data slices, for each remaining data segment, decoding the at least a decode threshold number of encoded data slices to reproduce the remaining data segment, and aggregating the first data segment of the data object with a plurality of reproduced remaining data segments to reproduce the data object. Having reproduced the data object, the DS processing module 552 issues a read data response 574 to the user device 550, where the read data response 574 includes the reproduced data object.

In accordance with the data de-duplication approach, when the accessing of the data object includes deleting the data object, the other user device 552 (e.g., any user device of the plurality of user devices) issues a delete data request 576 to the DS processing module 552 to delete the data object stored in the DSN memory 554, where the delete data request 576 includes any data ID associated with the data object. The DS processing module 552 identifies metadata associated with the data object and updates the metadata to indicate that one less copy is stored in the DSN memory 554. When the data ID is associated with a link-object, the DS processing module 552 deletes the link-object from the DSN memory 554. When no further copies are stored of the data object, a DS processing module 552 deletes the data object and the metadata from the DSN memory 554. The method to delete data is discussed in greater detail with reference to FIGS. 45B and 45C.

From time to time, the DS processing module 552 may perform a delete scanning operation to rationalize a number of copies of the data object and a number of link-objects stored in the DSN memory. For example, the metadata may indicate a higher number of copies of the data when a link-object previously stored in the DSN memory 554 is missing. The DS processing module 552 identifies the copies of the data object (e.g., by issuing primary read requests 566, receiving primary read responses 568, and interpreting the primary read responses 568 to identify link-objects as the copies). Next, the DS processing module 552 determines a number of copies of the data object based on a number of link-objects identified. The DS processing module 552 obtains the metadata of the data object of the data ID and compares a number of copies from the metadata to the number of link-objects identified. When the number of link-objects identified does not match the number of copies from the metadata, the DS processing module 552 indicates that a potential copy error has been detected. The method to detect the potential copy error is discussed in greater detail with reference to FIGS. 45B and 45C.

Figure 45B:
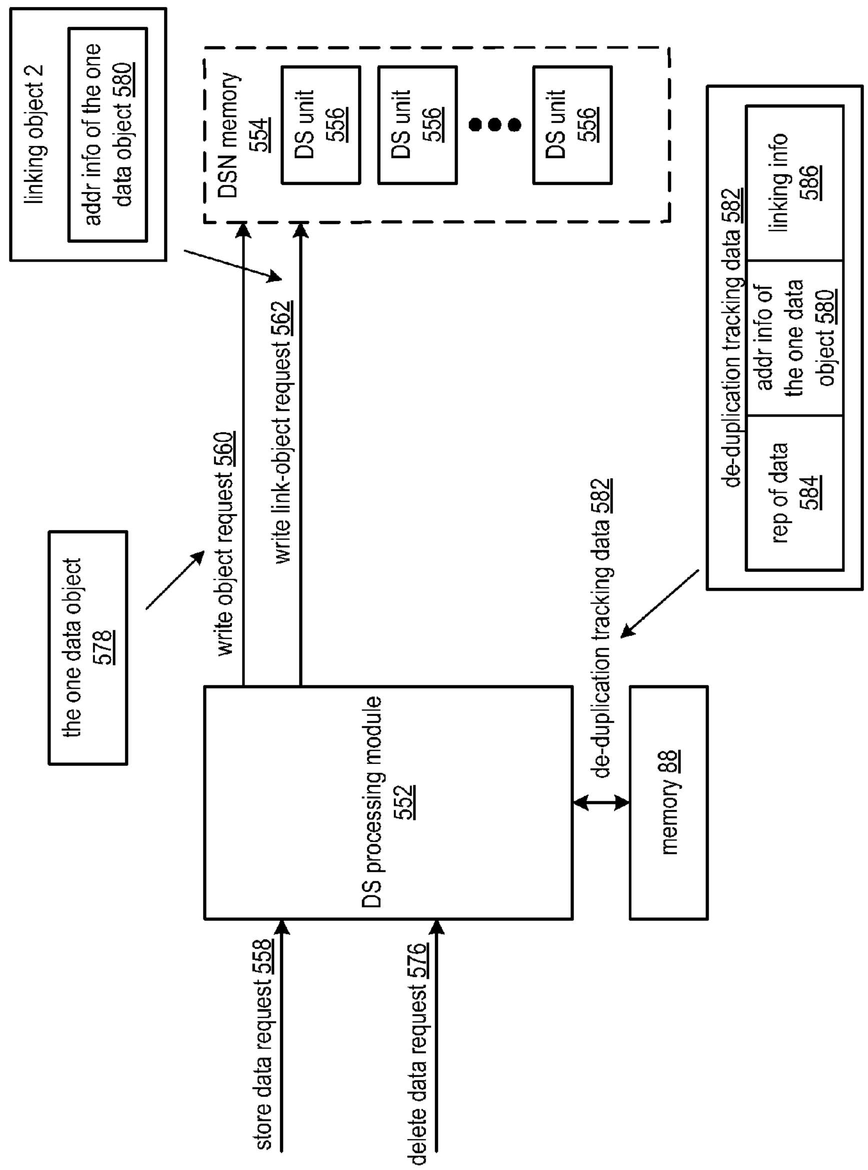
FIG. 45B is a schematic block diagram of another embodiment of a dispersed storage network in accordance with the present invention.

FIG. 45B is a schematic block diagram of another embodiment of a dispersed storage network that includes the dispersed storage (DS) processing module 552 of FIG. 45A, the memory 88 of FIG. 3, and the dispersed storage network (DSN) memory 554 of FIG. 45A. The DSN memory 554 includes the plurality of DS units 556 of FIG. 45A. Hereafter, each DS unit may be referred to interchangeably as a storage unit of a set of storage units.

The system functions to access a data object in the DSN memory 554 in accordance with a data de-duplication approach. In an embodiment, the DS processing module 552, when operable within a computing device, causes the computing device to perform a series of steps. In an example of operation of the steps, the DS processing module 552 determines whether a change has occurred to a data object of a set of data objects, where each data object of the set of data objects has substantially identical data to other data objects of the set of data objects and where only one plurality of sets of encoded data slices corresponding to one data object 578 of the set of data objects is stored in the DSN memory 554 using the right object request 560 of FIG. 45A.

The change includes at least one of addition of an identified data object of the set of data objects and deletion of the identified data object. The determining includes at least one of receiving the store data request 558 of FIG. 45A and receiving the delete data request 576 of FIG. 45A. For example, the DS processing module 552 indicates that the change includes the addition of the identify data object when receiving the store data request 558, where the store data request 558 includes the identified data object that has substantially identical data to other data objects stored in the DSN memory 554. As another example, the DS processing module 552 indicates that the change includes the deletion of the identified data object when receiving the delete data request 576.

When a change has occurred, the DS processing module 552 accesses de-duplication tracking data 582 for the set of data objects. For example, the DS processing module 552 retrieves the de-duplication tracking data 582 from the memory 88. As another example, the DS processing module 552 recovers the de-duplication tracking data 582 from the DSN memory 554. The de-duplication tracking data 582 includes a representation of the substantially identical data 584, addressing information 580 for the only one plurality of sets of encoded data slices (e.g., corresponding to the one data object 578), and linking information 586 that links the set of data objects to the addressing information 580. The representation of the substantially identical data 584 includes a hashed representation of the data object.

When the change is the addition of the identified data object of the set of data objects, the DS processing module 552 generates a linking object for linking DSN addressing of the identified data object to the addressing information 580. As a specific example, the DS processing module 552 extracts the identified data object from the store data request 588, generates a DSN address for the identified data object (e.g., a DSN address for accessing the linking object), and generates a linking object 2 that includes the addressing information of the one data object 580.

Having generated the linking object, the DS processing module 552 updates the linking information 586 to include a representation of the linking object. As a specific example, the DS processing module 552 increments a count of data objects in the set of data objects. As another specific example, the DS processing module 552 updates the linking information 586 to include the linking object 2. Having updated the linking information 586, the DS processing module 552 facilitate storage of the linking object in the DSN memory 554. For example, the DS processing module 552 issues the write link-object request 562 of FIG. 45A to the DSN memory 554, where the write link-object request 562 includes a set of encoded data slices generated based on the linking object 2.

When the change is deletion of the identified data object of the set of data objects, the DS processing module 552 determines whether the identified data object is the only data object in the set of data objects. For example, the DS processing module 552 identifies a number of copies from the linking information 586. When the identified data object is not the only data object in the set of data objects, the DS processing module 552 updates the linking information 586 to delete linking the identified data object to the addressing information 580. As a specific example, the DS processing module 552 decrements the number of copies of the link information 586. As another specific example, the DS processing module 552 deletes an associated linking object from the linking information 586. When the identified data object is the only data object in the set of data objects, the DS processing module 552 issues a command to delete the only one plurality of sets of encoded data slices and deletes the de-duplication tracking data 582 from the memory 88. For example, the DS processing module 552 issues another write object request 560 to the DSN memory 554, where the other write object request 560 includes a deletion instruction for the one data object 578.

The DS processing module 552 may, from time to time, rationalize the number of copies of the data object. In an example of operation, the DS processing module 552 identifies a plurality of linking objects stored in the DSN memory 554. The identifying includes at least one of searching a DSN directory, searching a dispersed hierarchical index, and interpreting the de-duplication tracking data 582. Having identified the plurality of linking objects stored in the DSN memory 554, the DS processing module 552 determines a count of linking objects of the plurality of linking objects that are associated with the set of data objects. For example, the DS processing module 552 increments a temporary count by one for each identified linking object.

Having determined the count of linking objects, the DS processing module 552 compares the count of linking objects to a count of the linking objects of the linking information 586. When the count of linking objects compares unfavorably to the count of the linking objects of the linking information 586, the DS processing module 552 updates the linking information based on a discrepancy between the count of linking objects and the count of the linking objects of the linking information 586.

The method described above in conjunction with the DS processing module 552 can alternatively be performed by other modules of the dispersed storage network, of a distributed storage and task network or by other devices. In addition, at least one memory section that stores operational instructions that can, when executed by one or more processing modules of one or more computing devices of a dispersed storage network (DSN), cause the one or more computing devices to perform any or all of the method steps described above.

FIG. 45C is a flowchart illustrating an example of updating de-duplication tracking data. The method continues at step 600 where a processing module (e.g., of one or more processing modules of one or more computing devices of a dispersed storage network (DSN)) determines whether a change has occurred to a data object of a set of data objects. Each data object of the set of data objects has substantially identical data to other data objects of the set of data objects. Only one plurality of sets of encoded data slices corresponds to one data object of the set of data objects is stored in memory of the DSN.

When a change has occurred, the method continues at step 602 where the processing module accesses de-duplication tracking data for the set of data objects. The de-duplication tracking data includes a representation of the substantially identical data, addressing information for the only one plurality of sets of encoded data slices, and linking information that links the set of data objects to the addressing information. The method branches to step 608 when the change includes deletion. The method continues to step 604 when the change includes addition.

When the change is addition of an identified data object of the set of data objects, the method continues at step 604 where the processing module generates a linking object for linking DSN addressing of the identified data object to the addressing information. The method continues at step 606 where the processing module updates the linking information to include a representation of the linking object. For example, the processing module increments a count of data objects in the set of data objects. As another example, the processing module updates the linking information to include the linking object. The method branches to step 614.

When the change is deletion of an identified data object of the set of data objects, the method continues at step 608 where the processing module determines whether the identified data object is the only data object in the set of data objects. The method branches to step 612 when the identified data object is the only data object. The method continues to step 610 when the identified data object is not the only data object.

When the identified data object is not the only data object in the set of data objects, the method continues at step 610 where the processing module updates the linking information to delete linking the identified data object to the addressing information. The method branches to step 614. When the identified data object is the only data object in the set of data objects, the method continues at step 612 where the processing module issues a command to delete the only one plurality of sets of encoded data slices and deletes the de-duplication tracking data. The method branches to step 614.

The method continues at step 614 where the processing module identifies a plurality of linking objects stored in the memory of the DSN. The method continues at step 616 where the processing module determines a count of linking objects of the plurality of linking objects that are associated with the set of data objects. The method continues at step 618 where the processing module compares the count of linking objects to a count of the linking objects of the linking information. When the count of linking objects compares unfavorably to the count of the linking objects of the linking information, the method continues at step 620 where the processing module updates the linking information based on a discrepancy between the count of linking objects and the count of the linking objects of the linking information.

Figure 46A:
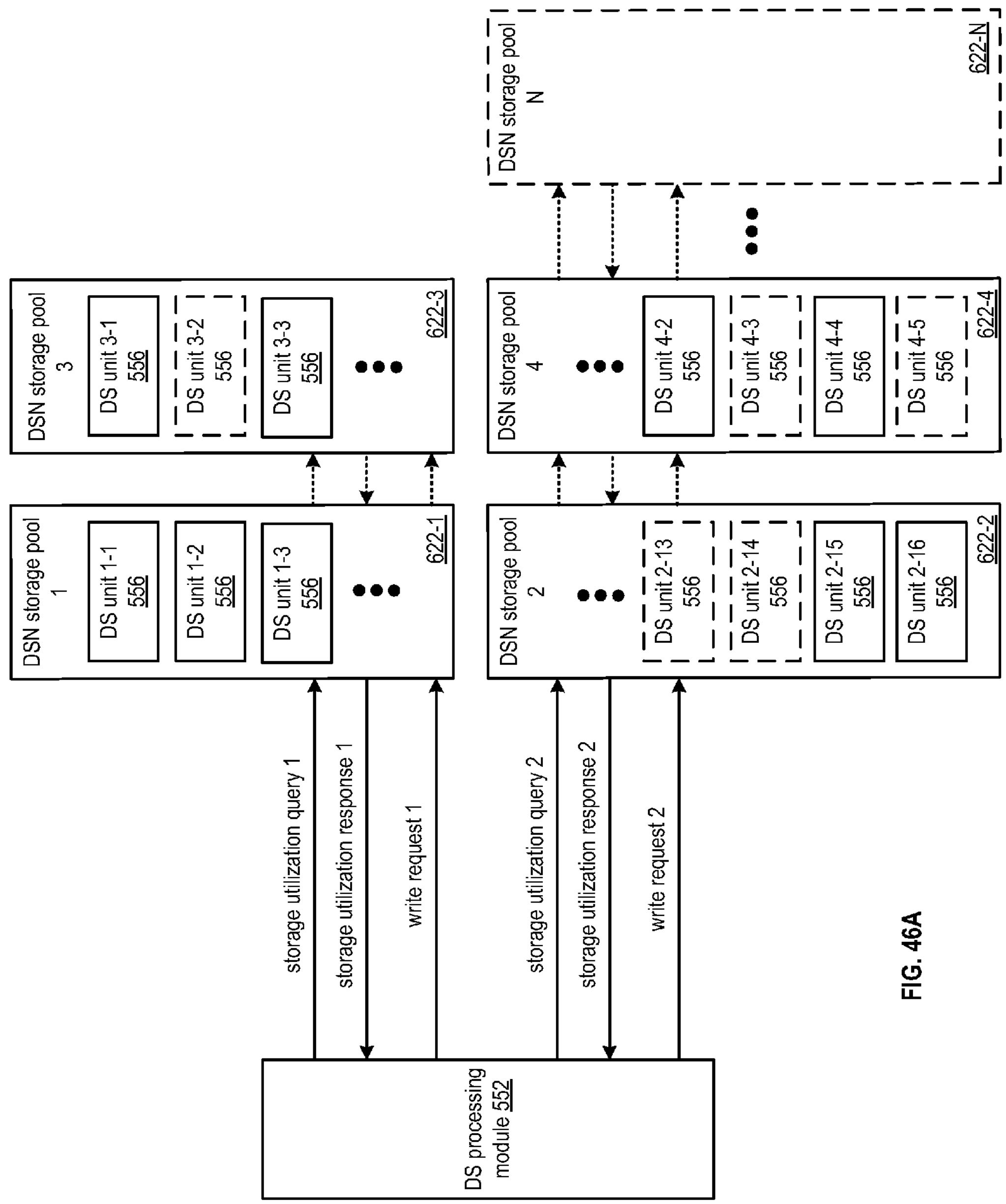
FIG. 46A is a schematic block diagram of another embodiment of a dispersed storage network in accordance with the present invention.

FIG. 46A is a schematic block diagram of an embodiment of a dispersed storage network that includes a dispersed storage (DS) processing module 552 and two or more dispersed storage network (DSN) storage pools (e.g., 622-1, 622-2, 622-3 and 622-4). Each DSN storage pool 622 includes a set of DS units 556. Each DS unit 556 may be the distributed storage and task (DST) execution unit 36 of FIG. 1 and further contain memory 88 (e.g., hard drives or flash memory as shown in, for example, FIG. 3 and FIG. 11). The DS processing module 552 may be the DST processing unit 16 of FIG. 1. The system functions to store data in any of the DSN storage pools 622 with selection of specific storage pool DS units 556 based on a logical mapping (e.g., first four units in each of storage pool 1 and storage pool 2 with enough capacity for the storage group). In alternate embodiments, selection of specific storage pool DS units 556 may be based on a specific methodology or criteria of mapping DS units within the storage pool groups (e.g., needed speed, type of memory, type of data, DS unit capacities, frequency of access, generation of storage drives, number of users within storage group, etc.)

In an example of operation, the DS processing module issues storage utilization queries 1-2 to the DSN storage pools 1-2. At least one DS unit 556 of each DSN storage pool 622 issues a storage utilization response to the DS processing module that includes an indication of one or more of unutilized storage space (e.g., free space) for each storage group, utilized storage space for each storage group, total utilized storage space, total unutilized storage space as well as, in one embodiment, metadata about one or more storage units serviced by one or more DS units 556. The storage group includes an association with one or more of a vault, a portion of a vault, and a vault region, where the vault includes a logical association of virtual storage, mapped DS units and of storage utilization entities.

In one example, a storage group requires very fast, high capacity storage (e.g., ultra high definition (UHD) video data). A combination of utilization information retrieved (available capacity) during the storage utilization queries as well as available metadata describing specific DS unit storage (average access speed, generation, etc.) will assist in selection of specific DS units 556 for one or more pools. As shown, storage pool 1 includes four DS units (1-1, 1-2, 1-3 and 1-4) with storage/access to memory 88 (e.g., hard drives-FIG. 11) matching the requirements. storage pool 2 includes two DS units (2-15 and 2-16) with storage/access to memory 88 (e.g., hard drives-FIG. 11) matching the same requirements. Therefore, the first four DS units in storage pool 1 (1-1, 1-2, 1-3 and 1-4) and the last two DS units in storage pool 2 (2-15 and 2-16) are selected to support the storage group. Specific allocation of future write requests (i.e., write proportions) in the six mapped DS units (1-1, 1-2, 1-3, 1-4, 2-15 and 2-16 ) of the storage group will be described in greater detail in association with FIGS. 46C and 46D.

In another example, a storage group includes logically interlaced data for storage/retrieval (e.g., television image data). FIG. 46C includes a storage group mapping of odd DS units of storage pool 3 and even DS units for storage pool 4. For example, the odd numbered DS units in storage pool 3 (1-1, 1-3, etc.) and the even numbered units in storage pool 4 (4-2, 4-4, etc.) are selected to support the storage group. Specific allocation of future write requests (i.e., write proportions) will follow the described systems and methods as shown and described in association with FIGS. 46C and 46D.

While the above examples include specific DS unit selections, the mapping of a specific number (e.g., 4, 5, 10, 16, etc.) of DS units for a storage group is not limiting as disclosed herein. Any combination of DS units (e.g., all, zero, or a subset combination), from one or more storage pools, is envisioned without departing from the scope of the present invention.

Figure 46B:
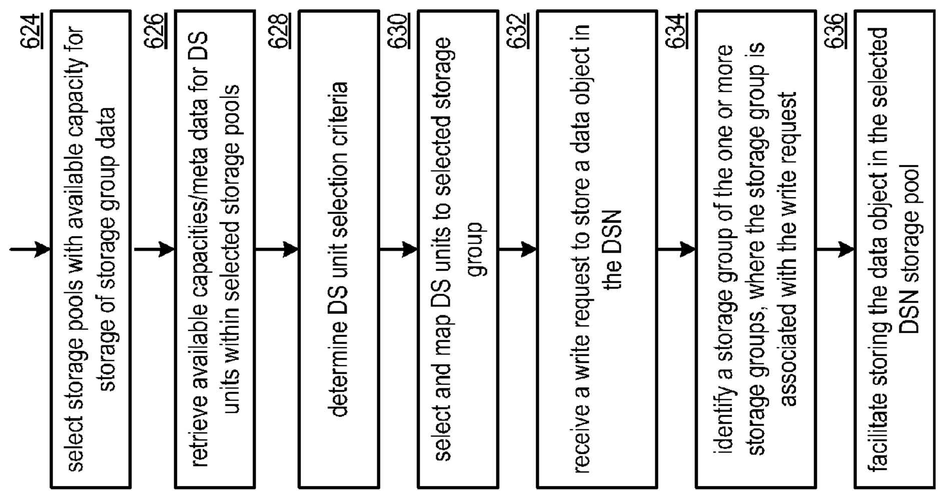
FIG. 46B is a flowchart illustrating an example of selecting dispersed storage units within a storage pool in accordance with the present invention.
Figure 46C:
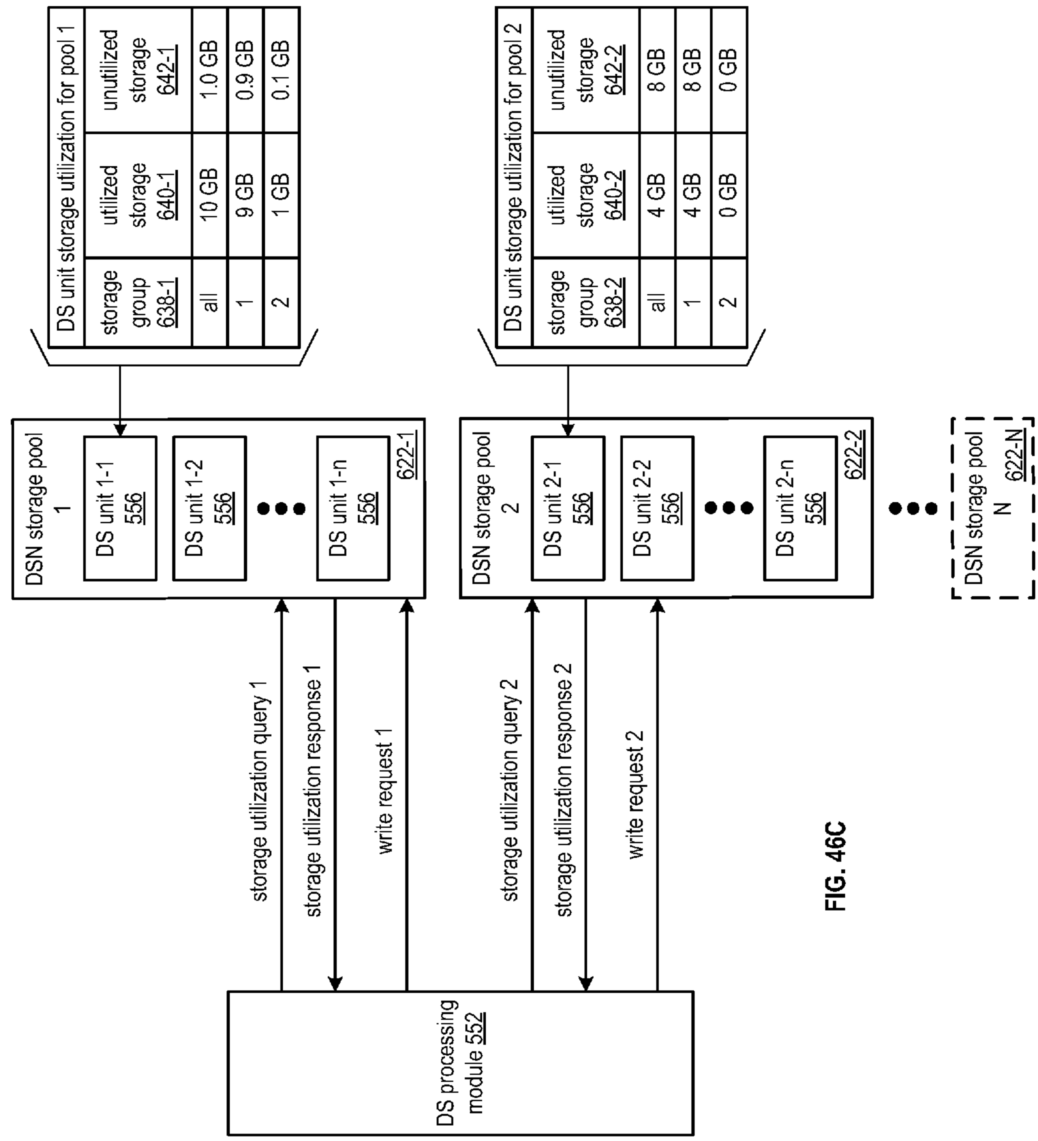
FIG. 46C is a schematic block diagram of another embodiment of a dispersed storage network in accordance with the present invention.

FIG. 46B is a flowchart illustrating an example of selecting and mapping DS units within two or more storage pools of a storage group. The method begins at step 624 where a processing module (e.g., of a dispersed storage (DS) processing module) selects storage pools within the DSN with available capacity for storage of storage group data. Capacities are determined, for example, by queries to two or more dispersed storage network (DSN) storage pools of a DSN, where each DSN storage pool includes a set of DS units as will be described in greater detail hereafter.

The method continues in step 626, where the available capacities and metadata (if available) of the DS units within storage pools is collected by DS processing module 552. The method continues at step 628, where DS unit selection criteria is determined. DS unit selection criteria may be determined by the DS processing module 552 processing information associated with a storage group such as, but not limited to, one or more of: data type; capacity requirements; access frequency; data storage retrieval formats; data retrieval sequencing; required speed; and number of users within storage group; and information associated with the one or more DS units including one or more of: type of memory (disk/flash/tape); error rates; age of memory; and maintenance history of memory, etc.

The method continues in step 630, where DS units are selected and mapped to a storage group based on the determined DS unit selection criteria and one or more DS units meeting the selection criteria (e.g., 6 DS units from one pool and 10 DS units from a second pool meet the criteria).

The method continues at step 632 where the processing module receives a write request to store a data object in the DSN. In step 634, the processing module identifies a storage group of the one or more storage groups, where the storage group is associated with a write request. The DS processing module identifies the storage group based on one or more of a data type, a requesting entity identifier, a data identifier, a vault identifier associated with the data identifier, and a vault region identifier associated with the data identifier.

The method continues at step 636 where the processing module facilitates storing the data object in the selected DSN storage pool and mapped DS units.

FIG. 46C is a schematic block diagram of another embodiment of a dispersed storage network that includes a dispersed storage (DS) processing module 552 and two or more dispersed storage network (DSN) storage pools 622-1, 622-2, 622-N. Each DSN storage pool 622 includes a set of DS units 556. Each DS unit 556 may be the distributed storage and task (DST) execution unit 36 of FIG. 1. The DS processing module 552 may be the DST processing unit 16 of FIG. 1. The system functions to store data in the DSN storage pools 622.

In an example of operation, the DS processing module issues storage utilization queries 1-2 to the DSN storage pools 1-2. At least one DS unit 556 of each DSN storage pool 622 issues a storage utilization response to the DS processing module that includes an indication of one or more of unutilized storage space for each storage group, utilized storage space for each storage group, total utilized storage space, and total unutilized storage space. The storage group includes an association with one or more of a vault, a portion of a vault, and a vault region, where the vault includes a logical association of virtual storage, mapped DS units and storage utilization entities. For example, the DSN storage pools stored data associated with a first and second storage group.

The issuing of the storage utilization response includes determining utilized storage 640 and unutilized storage 642 space for each storage group 638. The DS unit sums slice lengths of all encoded data slices that are stored in the DS unit associated with each storage group to determine utilized storage space for each storage group. As a specific example, a first DS unit (1-1) of DSN storage pool 1 (622-1) identifies 9 GB of utilized storage associated with a first storage group and 1 GB of utilized storage associated with a second storage group. As another specific example, a first DS unit (2-1) of DSN storage pool 2 (622-2) identifies 4 GB of utilized storage associated with the first storage group and 0 GB of utilized storage associated with the second storage group (e.g., storage group 2 is not stored in the DSN storage pool 2).

The DS unit identifies total unutilized storage space (e.g., a difference between storage capacity and total utilized storage space of all storage groups) and pro-rates the total unutilized storage space amongst each storage group proportionate to the utilized storage space for each storage group to determine the unutilized storage space for each storage group. As a specific example, the first DS unit (1-1) of DSN storage pool 1 (622-1) identifies 1 GB of total unutilized storage space (e.g., a capacity of 11 GB-10 GB of total utilize storage space) and multiplies a ratio of 9 GB/10 GB times the 1 GB=0.9 GB of unutilized storage space for storage group 1 and multiplies a ratio of 1 GB/10 GB times the 1 GB=0.1 GB of unutilized storage space for storage group 2 for DSN storage pool 1. As another specific example, the first DS unit of DSN storage pool 2 identifies 8 GB of total unutilized storage space (e.g., a capacity of 12 GB-4 GB of total utilize storage space) and multiplies a ratio of 4 GB/4 GB times the 8 GB=8 GB of unutilized storage space for storage group 1 and multiplies a ratio of 0 GB/4 GB times the 8 GB=0 GB of unutilized storage space for storage group 2 for DSN storage pool 2.

The DS processing module receives at least one storage utilization response from each DSN storage pool. The DS processing module updates a write proportion value based on the received storage utilization responses. The updating includes reestablishing the write proportion based on an amount of unutilized storage space for each storage group such that new writes to a given storage group are directed to a DSN storage pool in proportion to the amount of unutilized storage space. As a specific example, for storage group 1, the write proportion value is updated to select DSN storage pool 1 0.9/(0.9+8) % of the time and to select DSN storage pool 2 8/(0.9+8) % of the time period.

The DS processing module receives a write request to store a new data object in the DSN. The DS processing module identifies a storage group for the write request based on one or more of a data type of the new data object, a requesting entity identifier, a DSN address, a vault identifier, and a vault region identifier. As a specific example, the DS processing module identifies storage group 1 based on the requesting entity identifier. Having identified the storage group, the DS processing module selects a DSN storage pool based on the write proportion value and a recent write pattern of previous DSN storage pool selections. As a specific example, the DS processing module identifies DSN storage pool 2 based on the recent write pattern and the write proportion value of 8/(0.9+8) %. The DS processing module facilitates storing the new data object in the selected DSN storage pool. As a specific example, the DS processing module encodes the new data object using a dispersed storage error coding function to produce sets of encoded data slices and issues sets of write slice requests 1 to the DSN storage pool 1, where the sets of write slice requests 1 includes the sets of encoded data slices. The method of operation to store the encoded data slices based on the write proportion value is discussed in greater detail with reference to FIG. 46B.

The DS processing module may receive a storage utilization response that indicates that a storage group is fully utilized within a particular DSN storage pool. The DS processing module may indicate that no unutilized storage space for the storage group is available to prevent further storing of new encoded data slices to the DSN storage pool for the storage group. Alternatively, the DS processing module may indicate that a predetermined minimum amount of unutilized storage space for the storage group is available to enable processing of write slice requests without encoded data slices by DS units of the DSN storage pool to facilitate deletion of previously stored encoded data slices while preventing further storing of new encoded data slices to the DSN storage pool for the storage group. The method of operation to enable deletion of previously stored encoded data slices is discussed in greater detail with reference to FIG. 47.

Figure 46D:
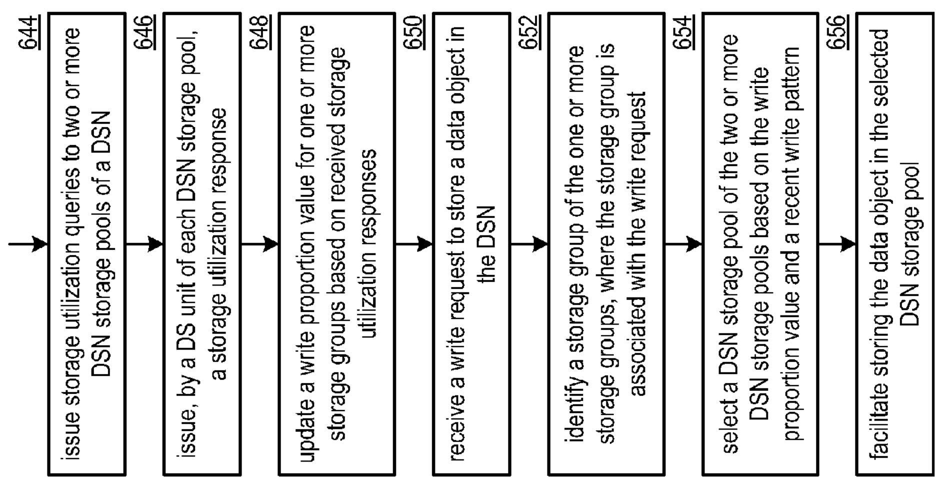
FIG. 46D is a flowchart illustrating an example of selecting a storage pool in accordance with the present invention.

FIG. 46D is a flowchart illustrating an example of selecting a storage pool. The method begins at step 644 where a processing module (e.g., of a dispersed storage (DS) processing module) issues storage utilization queries to two or more dispersed storage network (DSN) storage pools of a DSN, where each DSN storage pool includes a set of DS units (e.g., previously mapped). The issuing includes generating and sending. The method continues at step 646 where at least one DS unit of each DSN storage pool issues a storage utilization response. The issuing includes, for each storage group, the DS unit determining unutilized storage space for the storage group in accordance with a formula: unutilized storage space for the storage group=unutilized storage space for all storage groups*(utilized storage space for the storage group/utilize storage space for all storage groups). The DS unit generates the storage utilization response to include one or more of the unutilized storage space and utilize storage space of each storage group and sends the storage utilization response to the processing module.

The method continues at step 648 where the processing module updates a write proportion value for one or more storage groups based on received storage utilization responses. As a specific example, the processing module updates the write proportion value for a particular storage group to include an indication to select a storage pool in accordance with a selection formula of: select a storage pool as a percentage of all selections=unutilized space for the storage group of the storage pool/all unutilized space for the storage group of all storage pools.

The method continues at step 650 where the processing module receives a write request to store a data object in the DSN. In step 652, the processing module identifies a storage group of the one or more storage groups, where the storage group is associated with a write request. The DS processing module identifies the storage group based on one or more of a data type, a requesting entity identifier, a data identifier, a vault identifier associated with the data identifier, and a vault region identifier associated with the data identifier.

The method continues at step 654 where the processing module selects a DSN storage pool of the two or more DSN storage pools based on the write proportion value and a recent write pattern. The selecting includes identifying the recent write pattern, selecting the DSN storage pool in accordance with the write pattern so that the DSN storage pool is selected at the write proportion value for the storage group over previous writes. The selecting may further include verifying that sufficient unutilized space is greater than space required facilitates storing the data object. The method continues at step 656 where the processing module facilitates storing the data object in the selected DSN storage pool.

Figure 47:
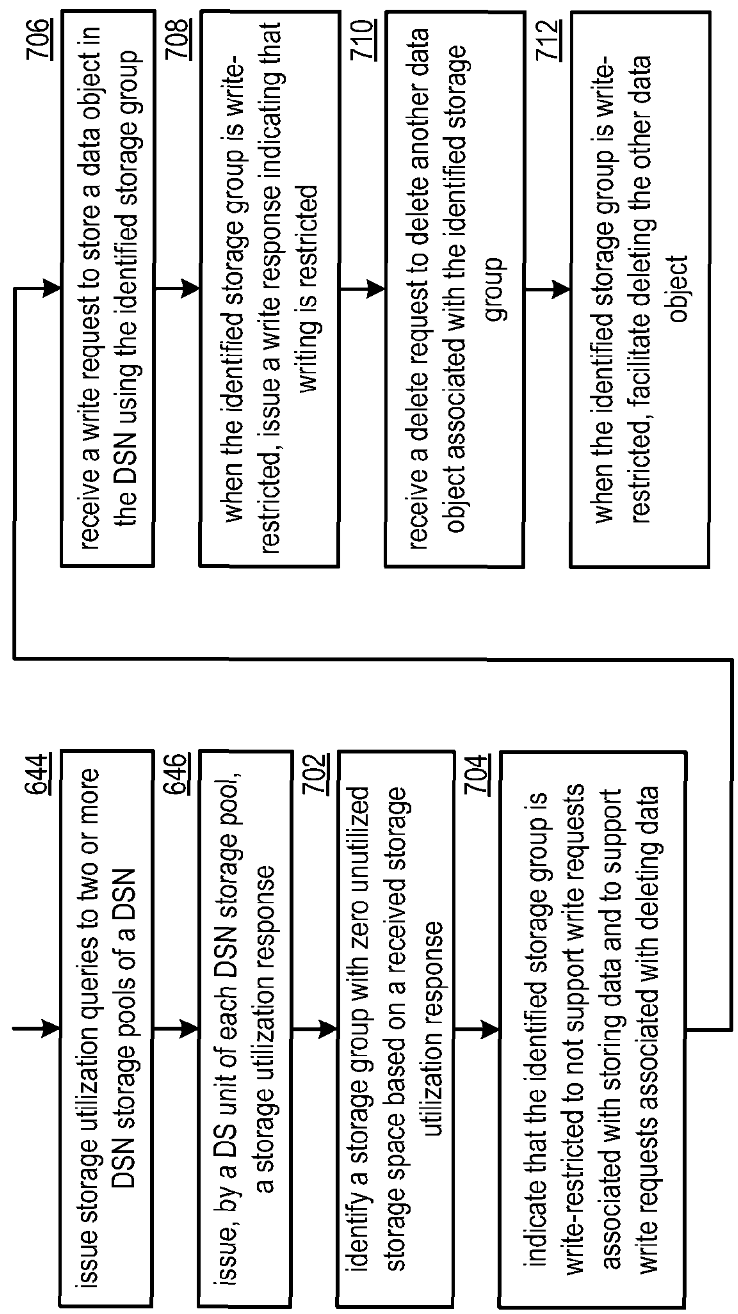
FIG. 47 is a flowchart illustrating an example of facilitating deleting a data object in accordance with the present invention.

FIG. 47 is a flowchart illustrating an example of facilitating deleting a data object, which includes similar steps to FIG. 46D. The method begins with step 644 of FIG. 46D where a processing module (e.g., of a dispersed storage (DS) processing module) issues a storage utilization queries to two or more dispersed storage network (DSN) storage pools of a DSN, where each DSN storage pool includes a set of DS units. The method continues with step 646 where a DS unit of each DSN storage pool issues a storage utilization response. The method continues at step 702 where the processing module identifies a storage group of an associated DSN storage pool with zero unutilized storage space based on a received storage utilization response.

The method continues at step 704 where the processing module indicates that the identified storage group is write-restricted for the DSN storage pool to not support write requests associated with storing data and to support write requests associating with deleting data. The indicating includes updating a locally stored copy of the received storage utilization response to indicate that the storage group has a predetermined minimal amount of unutilized storage space to facilitate deletion of data but not to facilitate storing of new data.

The method continues at step 706 where the processing module receives a write request to store a data object in the DSN using the identified storage group. As a specific example, the processing module receives a store data request and identifies the storage group associated with the data of the request. When the identified storage group is write-restricted, the method continues at step 708 where the processing module issues a write response indicating that writing is restricted to the DSN storage pool. Alternatively, or in addition to, the processing module identifies an alternative DSN storage pool associated with the storage group that is write-restricted. The issuing includes verifying the identified storage group is restricted for the DSN storage pool, and generating and sending the write response to a requesting entity.

The method continues at step 710 where the processing module receives a delete request to delete another data object associated with the identified storage group associated with the DSN storage pool. When the identified storage group is write-restricted for the DSN storage pool, the method continues at step 712 where the processing module facilitates deleting the other data object. The facilitating includes generating write slice requests that includes slice names associated with the other data object but does not include encoded data slices (e.g., a null in an encoded data slice field of each write slice request). The facilitating further includes sending the write slice requests for deleting the other data object to the DSN storage pool associated with the write-restriction of the storage group.

Figure 48A:
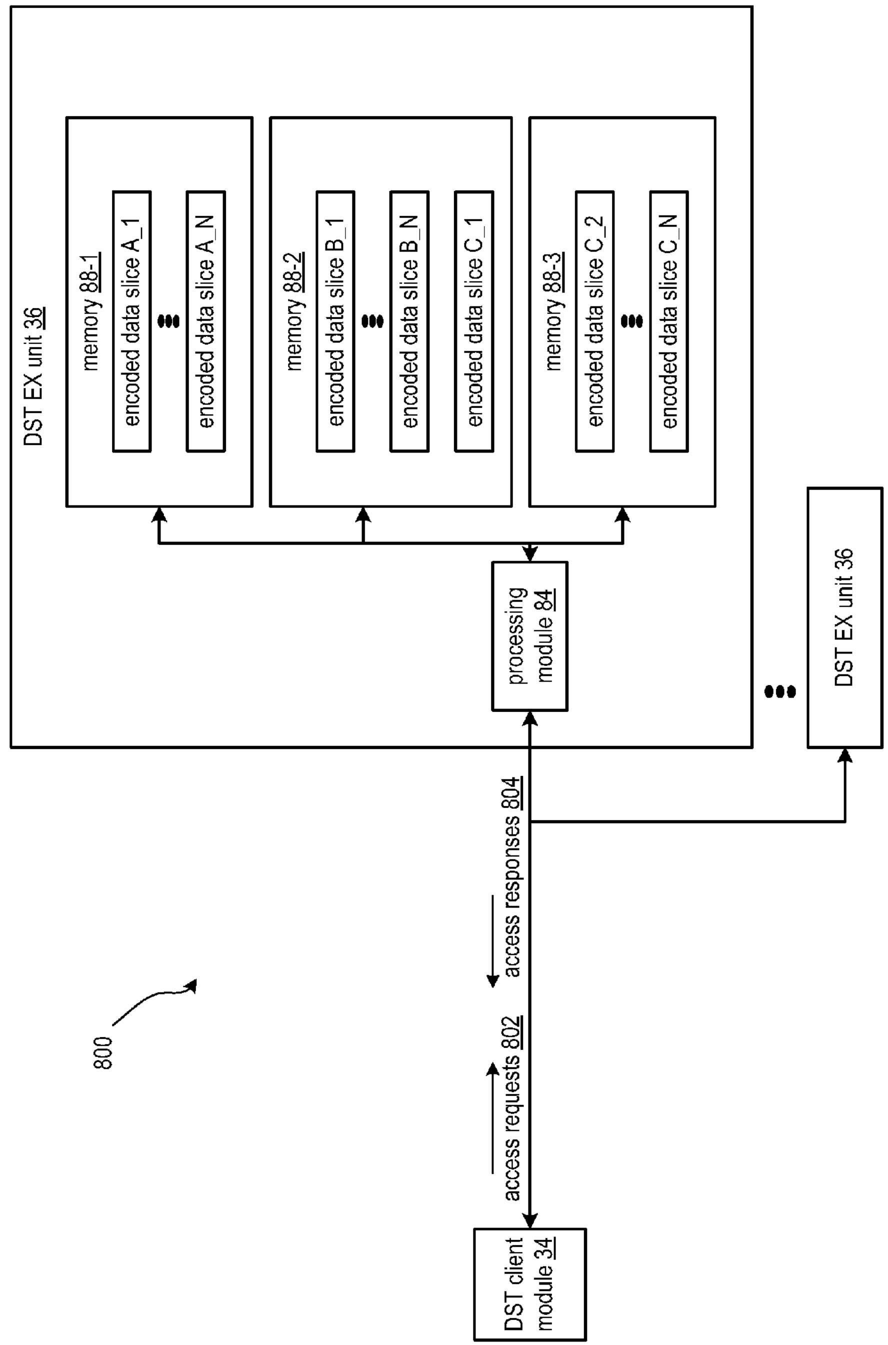
FIG. 48A is a schematic block diagram of another embodiment of a dispersed storage network in accordance with the present invention.

FIG. 48A is a schematic block diagram of another embodiment of a dispersed storage network that includes a distributed storage and task (DST) client module 34 and a set of DST execution units 36 of the DST execution units 36 of FIG. 1. Each DST execution unit 36 includes the processing module 84 and one or more memories 88 of FIG. 3. The network functions to store data in the set of DST execution units 36. The DST execution units 36 function to store the data as sets of encoded data slices in the memories 88 of the DST execution units 36 in accordance with a slice location optimization.

In an example of operation utilizing the slice location optimization, a processing module 84 of a first DST execution unit 36 receives a series of slice access requests 802, processes the series of slice access requests, and issues slice access responses 804 to the DST client module 34. Each access request includes one of a write request, a read request, a delete request or a list request.

The processing the series of slice access requests includes the processing module 84 generating time stamped slice access records to include identities of encoded data slices and identities of associated memories 88 of the series of processed slice access requests. As a specific example, the processing module 84 generates a first slice access record to include encoded data slice identifiers A_1 through A_N (e.g., data A, common pillar slices of segments 1-N) were accessed in a first memory 88-1 in a first timeframe. As yet another specific example, the processing module 84 generates a second slice access record to include encoded data slice identifiers B_1 through B_N were accessed in a second memory 88-2 in a second timeframe. As a still further specific example, the processing module 84 generates a third slice access record to include encoded data slice identifier C_1 was accessed in the second memory 88-2 in a third timeframe and also encoded data slice identifiers C_2 through C_N were accessed in a third memory 88-3 in the third timeframe.

With the access records stored, the processing module 84 determines correlation of two or more slice access sequences (e.g., request-response) based on the access records. As a specific example, the processing module 84 identifies a correlation of the accessing of encoded data slice C_1 and encoded data slices C_2 through C_N in the third timeframe. As another specific example, the processing module 84 identifies that there is a 95% probability that encoded data slice C_1 will be accessed from the second memory 88-2 within 5 seconds of accessing encoded data slices C_2 through C_N from the third memory 88-3. The processing module 84 determines whether the correlation of the two or more slice access sequences is greater than a correlation threshold level. As a specific example, the processing module indicates that the correlation is greater than the correlation threshold level when the correlation is 95% and the correlation threshold level is 70%.

When the correlation of the two or more slice access sequences is greater than the correlation threshold level, the processing module 84 identifies two or more encoded data slices for co-location. The co-location includes one or more of storing the two or more encoded data slices within a common memory device, in adjacent storage locations within the common memory device, in similar storage locations within the common memory device, in a common virtual storage container to facilitate co-reading, in a common stripe across at least two memory devices, etc. The processing module 84 determines whether the two or more encoded data slices for co-location are not co-located (e.g., by comparing associated memory devices and storage locations). As a specific example, the processing module 84 determines that the encoded data slice C_1 is not co-located with encoded data slices C_2 through C_N.

When the two or more encoded data slices for co-location are not co-located, the processing module 84 selects one or more of the two or more encoded data slices for migration to a new storage location associated with the co-location. The selecting may be based on one or more of current storage locations, memory device associations of the one or more encoded data slices for migration, available memory device capacity, and available storage locations. As a specific example, the processing module 84 selects encoded data slice C_1 for migration when encoded data slices C_2 through C_N are already stored together on the third memory device 88-3.

With the one or more encoded data slices selected for migration, the processing module 84 selects a co-location method to support the co-location. The selecting may be based on one or more of the correlation of the two or more encoded data access sequences, the correlation threshold level, the available memory capacity, the available storage locations, a memory device performance level, DST execution unit processing resource availability, a DST execution unit loading level, a predetermination, the current storage locations, and the memory device associations of the one or more encoded data slices for migration. For example, the processing module 84 selects the co-location method to include storing the two or more encoded data slices within similar storage locations of a common memory device. As a specific example, the processing module 84 selects storing encoded data slices slice C_1 and encoded data slices C_2 through C_N within adjacent as possible storage sectors of the third memory device 88-3 (e.g., when memory device 88-3 is implemented using a magnetic disk storage technology).

With the co-location method selected, the processing module 84 facilitates migration of the selected one or more encoded data slices in accordance with the co-location method. As a specific example, the processing module 84 moves encoded data slice C_1 from the second memory 88-2 to a storage sector of the third memory 88-3 that is substantially adjacent to storage sectors utilized for storage of encoded data slices C_2 through C_N. The processing module 84 updates a slice name to storage location table to associate encoded data slice C_1 with the storage sector of the third memory 88-3.

Figure 48B:
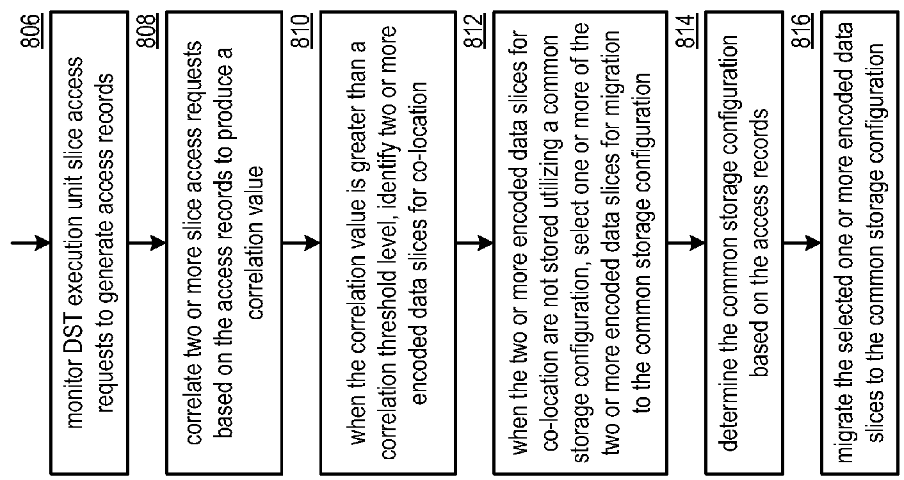
FIG. 48B is a flowchart illustrating an example of co-locating associated encoded data slices in accordance with the present invention.

FIG. 48B is a flowchart illustrating an example of co-locating associated encoded data slices. The method begins at step 806 where a processing module (e.g., of a distributed storage and task (DST) execution unit) monitors DST execution unit slice access requests to generate access records. The monitoring includes receiving access requests, generating timestamps to associate with access records, and generating the access records to include associating identities of the encoded data slices of the access requests and the timestamps. The method continues at the step 808 where the processing module correlates two or more slice access requests based on the access records to produce a correlation value. For example, the processing module determines a probability of processing two or more slice access requests within a given timeframe to produce a probability as the correlation value. The processing module determines whether the correlation value is greater than a correlation threshold level.

When the correlation value is greater than the correlation threshold level, the method continues at step 810 where the processing module identifies two or more encoded data slices for co-location. The identifying includes identifying the two or more encoded data slices associated with a correlation value greater than a selection threshold. The processing module determines whether the two or more encoded data slices for co-location are not stored utilizing a common storage configuration. The common storage configuration includes one or more of a common memory device, adjacent sectors on a magnetic disk drive, similar sectors on the magnetic disk drive, and a common virtual storage container, a common stripe across two or more memory devices, etc.

When the two or more encoded data slices for co-location are not stored utilizing the common storage configuration, the method continues at step 812 where the processing module selects one or more of the two or more encoded data slices for migration to the common storage configuration. The selecting includes at least one of identifying a fewest number of encoded data slices requiring migration and identifying a greatest number of encoded data slice not requiring migration that are already associated with the common storage configuration.

The method continues at step 814 where the processing module determines the common storage configuration based on the access records. The determining includes at least one of identifying the common storage configuration of the greatest number of encoded data slices not requiring migration, utilizing a predetermination, and determining a new storage configuration to facilitate sufficient storage capacity for all of the two or more encoded data slices. The method continues at step 816 where the processing module migrates the selected one or more encoded data slices to the common storage configuration. As a specific example, the processing module moves encoded data slices to adjacent sectors of a common magnetic disk memory device.

Figure 48C:
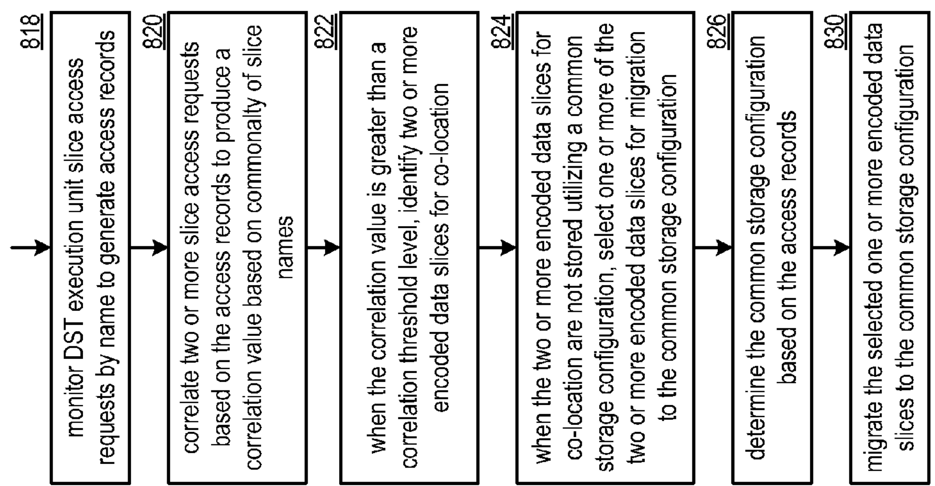
FIG. 48C is a flowchart illustrating another example of co-locating associated encoded data slices in accordance with the present invention.

FIG. 48C is a flowchart illustrating an example of co-locating associated encoded data slices. The method begins at step 818 where a processing module (e.g., of a distributed storage and task (DST) execution unit) monitors DST execution unit slice access requests to generate access records. The monitoring includes receiving access requests and generating the access records to include associating common slice names (identities) of the encoded data slices of the access requests. The method continues at the step 820 where the processing module correlates two or more slice access requests based on the access records to produce a correlation value. For example, the processing module determines a probability of processing two or more slice access requests with slice name commonality to produce a probability as the correlation value. The processing module determines whether the correlation value is greater than a correlation threshold level.

When the correlation value is greater than the correlation threshold level, the method continues at step 822 where the processing module identifies two or more encoded data slices for co-location. The identifying includes identifying the two or more encoded data slices associated with a correlation value greater than a selection threshold. The processing module determines whether the two or more encoded data slices for co-location are not stored utilizing a common storage configuration. The common storage configuration includes one or more of a common memory device, adjacent sectors on a magnetic disk drive, similar sectors on the magnetic disk drive, and a common virtual storage container, a common stripe across two or more memory devices, etc.

When the two or more encoded data slices for co-location are not stored utilizing the common storage configuration, the method continues at step 824 where the processing module selects one or more of the two or more encoded data slices for migration to the common storage configuration. The selecting includes at least one of identifying a fewest number of encoded data slices requiring migration and identifying a greatest number of encoded data slice not requiring migration that are already associated with the common storage configuration.

The method continues at step 826 where the processing module determines the common storage configuration based on the access records. The determining includes at least one of identifying the common storage configuration of the greatest number of encoded data slices not requiring migration, utilizing a predetermination, and determining a new storage configuration to facilitate sufficient storage capacity for all of the two or more encoded data slices. The method continues at step 830 where the processing module migrates the selected one or more encoded data slices to the common storage configuration. As a specific example, the processing module moves encoded data slices to adjacent sectors of a common magnetic disk memory device.

While the embodiments of FIGS. 48B and 48C describe time and name commonality, respectively, as elements which associate data which could be co-located, other elements which establish an association (relationship) between slices of data which are not co-located can be, in other embodiments, be substituted without departing from the scope of the present invention.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:

determining whether a change has occurred to a data object of a set of data objects, wherein each data object of the set of data objects has substantially identical data to other data objects of the set of data objects and wherein only one plurality of sets of encoded data slices corresponding to one data object of the set of data objects is stored in memory of the DSN; and when a change has occurred:

accessing deduplication tracking data for the set of data objects, wherein the deduplication tracking data includes a representation of the substantially identical data, addressing information for the only one plurality of sets of encoded data slices, and linking information that links the set of data objects to the addressing information, wherein the linking information includes the number of copies of data objects having substantially identical data;

when the change is deletion of an identified data object of the set of data objects:

determining whether the identified data object is the only data object in the set of data objects; and when the identified data object is not the only data object in the set of data objects, updating the linking information to delete linking the identified data object to the addressing information.

2. The method of claim 1 further comprises:

when the identified data object is the only data object in the set of data objects:

issuing a command to delete the only one plurality of sets of encoded data slices; and deleting the deduplication tracking data.

3. The method of claim 1 further comprises:

when the change is addition of an identified data object of the set of data objects:

generating a linking object for linking DSN addressing of the identified data object to the addressing information; and updating the linking information to include a representation of the linking object.

4. The method of claim 3 further comprises:

updating the linking information by incrementing a count of data objects in the set of data objects; or updating the linking information to include the linking object.

5. The method of claim 1, wherein the representation of the substantially identical data comprises:

a hashed representation of the data object.

6. The method of claim 1 further comprises:

identifying a plurality of linking objects stored in the memory of the DSN;

determining a count of linking objects of the plurality of linking objects that are associated with the set of data objects;

comparing the count of linking objects to a count of the linking objects of the linking information; and when the count of linking objects compares unfavorably to the count of the linking objects of the linking information, updating the linking information based on a discrepancy between the count of linking objects and the count of the linking objects of the linking information.

7. A dispersed storage (DS) processing module of a dispersed storage network (DSN), the DS module comprises:

a first module, when operable within a computing device, causes the computing device to:

determine whether a change has occurred to a data object of a set of data objects, wherein each data object of the set of data objects has substantially identical data to other data objects of the set of data objects and wherein only one plurality of sets of encoded data slices corresponding to one data object of the set of data objects is stored in memory of the DSN; and a second module, when operable within the computing device, causes the computing device to:

when a change has occurred:

access deduplication tracking data for the set of data objects, wherein the deduplication tracking data includes a representation of the substantially identical data, addressing information for the only one plurality of sets of encoded data slices, and linking information that links the set of data objects to the addressing information, wherein the linking information includes the number of copies of data objects having substantially identical data;

when the change is deletion of an identified data object of the set of data objects:

determine whether the identified data object is the only data object in the set of data objects; and when the identified data object is not the only data object in the set of data objects, update the linking information to delete linking the identified data object to the addressing information.

8. The DS processing module of claim 7 further comprises:

the second module, when operable within the computing device, further causes the computing device to:

when the identified data object is the only data object in the set of data objects:

issue a command to delete the only one plurality of sets of encoded data slices; and delete the deduplication tracking data.

9. The DS processing module of claim 7 further comprises:

the second module, when operable within the computing device, further causes the computing device to:

when the change is addition of an identified data object of the set of data objects:

generate a linking object for linking DSN addressing of the identified data object to the addressing information; and update the linking information to include a representation of the linking object.

10. The DS processing module of claim 9 further comprises:

the second module, when operable within the computing device, further causes the computing device to:

update the linking information by incrementing a count of data objects in the set of data objects; or update the linking information to include the linking object.

11. The DS processing module of claim 7, wherein the representation of the substantially identical data comprises:

a hashed representation of the data object.

12. The DS processing module of claim 7 further comprises:

a third module, when operable within the computing device, causes the computing device to:

identify a plurality of linking objects stored in the memory of the DSN;

determine a count of linking objects of the plurality of linking objects that are associated with the set of data objects;

compare the count of linking objects to a count of the linking objects of the linking information; and when the count of linking objects compares unfavorably to the count of the linking objects of the linking information, update the linking information based on a discrepancy between the count of linking objects and the count of the linking objects of the linking information.

13. A computer readable storage medium comprises:

at least one memory section that stores operational instructions that, when executed by one or more processing modules of one or more computing devices of a dispersed storage network (DSN), causes the one or more computing devices to:

determine whether a change has occurred to a data object of a set of data objects, wherein each data object of the set of data objects has substantially identical data to other data objects of the set of data objects and wherein only one plurality of sets of encoded data slices corresponding to one data object of the set of data objects is stored in memory of the DSN; and when a change has occurred:

access deduplication tracking data for the set of data objects, wherein the deduplication tracking data includes a representation of the substantially identical data, addressing information for the only one plurality of sets of encoded data slices, and linking information that links the set of data objects to the addressing information, wherein the linking information includes the number of copies of data objects having substantially identical data;

when the change is deletion of an identified data object of the set of data objects:

determine whether the identified data object is the only data object in the set of data objects; and when the identified data object is not the only data object in the set of data objects, update the linking information to delete linking the identified data object to the addressing information.

14. The computer readable storage medium of claim 13 further comprises:

the at least one memory section stores further operational instructions that, when executed by the one or more processing modules, causes the one or more computing devices of the DSN to:

when the identified data object is the only data object in the set of data objects:

issue a command to delete the only one plurality of sets of encoded data slices; and delete the deduplication tracking data.

15. The computer readable storage medium of claim 13 further comprises:

the at least one memory section stores further operational instructions that, when executed by the one or more processing modules, causes the one or more computing devices of the DSN to:

when the change is addition of an identified data object of the set of data objects:

generate a linking object for linking DSN addressing of the identified data object to the addressing information; and update the linking information to include a representation of the linking object.

16. The computer readable storage medium of claim 15 further comprises:

the at least one memory section stores further operational instructions that, when executed by the one or more processing modules, causes the one or more computing devices of the DSN to:

update the linking information by incrementing a count of data objects in the set of data objects; or update the linking information to include the linking object.

17. The computer readable storage medium of claim 13, wherein the representation of the substantially identical data comprises:

a hashed representation of the data object.

18. The computer readable storage medium of claim 13 further comprises:

the at least one memory section stores further operational instructions that, when executed by the one or more processing modules, causes the one or more computing devices of the DSN to:

identify a plurality of linking objects stored in the memory of the DSN;

determine a count of linking objects of the plurality of linking objects that are associated with the set of data objects;

compare the count of linking objects to a count of the linking objects of the linking information; and when the count of linking objects compares unfavorably to the count of the linking objects of the linking information, update the linking information based on a discrepancy between the count of linking objects and the count of the linking objects of the linking information.

* * * * *

UNITED STATES PATENT AND TRADEMARK OFFICE

CERTIFICATE OF CORRECTION

PATENT NO. : 9,661,074 B2
APPLICATION NO. : 14/320547
DATED : May 23, 2017
INVENTOR(S) : Andrew G. Peake It is certified that error appears in the above-identified patent and that said Letters Patent is hereby corrected as shown below:

On the Title Page

Item (73), please replace the Assignee "INTERNATIONAL BUSINESS MACHINES CORPORATION, Armond, NY (US)" with -- INTERNATIONAL BUSINESS MACHINES CORPORATION, Armonk, NY (US) --

Signed and Sealed this
Fourth Day of February, 2020

Andrei Iancu
*Director of the United States Patent and Trademark Office*